(12) United States Patent
Pike et al.

(10) Patent No.: US 7,571,925 B2
(45) Date of Patent: Aug. 11, 2009

(54) STROLLER WITH CHILD BARRIER AND PIVOTABLE CUP HOLDER

(75) Inventors: Robert T. Pike, Reading, PA (US); Todd D. Sorzano, Atglen, PA (US); Gregory S. Sellers, Christiana, PA (US); Dmitriy Faktorovich, West Chester, PA (US)

(73) Assignee: Graco Children's Products Inc., Exton, PA (US)

( * ) Notice: Subject to any disclaimer, the term of this patent is extended or adjusted under 35 U.S.C. 154(b) by 0 days.

(21) Appl. No.: 12/170,945

(22) Filed: Jul. 10, 2008

(65) Prior Publication Data

US 2008/0290631 A1  Nov. 27, 2008

Related U.S. Application Data

(62) Division of application No. 11/104,657, filed on Apr. 13, 2005, now Pat. No. 7,413,213.

(60) Provisional application No. 60/651,518, filed on Apr. 13, 2004, provisional application No. 60/609,842, filed on Sep. 15, 2004.

(51) Int. Cl.
  *B62B 7/06* (2006.01)
(52) U.S. Cl. ............... 280/642; 280/47.38; 280/647; 297/154; 297/162
(58) Field of Classification Search ............. 280/47.38, 280/47.34, 47.36, 47.371, 47.39, 47.4, 47.41, 280/79.2, 642, 643, 647, 648, 650; 297/154, 297/155, 160, 161, 162
See application file for complete search history.

(56) References Cited

U.S. PATENT DOCUMENTS

| 4,317,581 | A | 3/1982 | Kassai |
| 4,346,912 | A | 8/1982 | Habib |
| 4,435,012 | A | 3/1984 | Kassai |
| 4,491,335 | A | 1/1985 | Evron |
| 4,542,916 | A | 9/1985 | Kassai |
| 4,610,460 | A | 9/1986 | Kassai |
| 4,616,844 | A | 10/1986 | Kassai |
| 4,626,030 | A | 12/1986 | Kassai |

(Continued)

FOREIGN PATENT DOCUMENTS

EP    0 483 042 A1    4/1992

(Continued)

OTHER PUBLICATIONS

Photographs of Cosco Lightweight Eddie Bauer Stroller, 3 pp., Dorel Juvenile Group, Inc., stroller available prior to Apr. 13, 2005.

(Continued)

*Primary Examiner*—Christopher P Ellis
*Assistant Examiner*—John D Walters
(74) *Attorney, Agent, or Firm*—Lempia Braidwood LLC

(57) ABSTRACT

A stroller has a stroller frame with a child seat positioned on the stroller frame. The stroller further includes a child barrier that can be coupled to the stroller frame forward of a seat bight of the child seat. The child barrier also includes a cup holder with a central longitudinal axis. When the child barrier moves relative to the stroller frame, the cup holder pivots about the central longitudinal axis.

20 Claims, 44 Drawing Sheets

U.S. PATENT DOCUMENTS

| | | | |
|---|---|---|---|
| 4,645,229 | A | 2/1987 | Kassai |
| 4,697,823 | A | 10/1987 | Kassai |
| 4,763,919 | A | 8/1988 | Nakao et al. |
| 4,779,879 | A | 10/1988 | Kassai |
| 4,795,209 | A * | 1/1989 | Quinlan et al. ............... 297/153 |
| 4,817,982 | A | 4/1989 | Kassai |
| 4,828,278 | A | 5/1989 | Shinroku et al. |
| 4,844,504 | A | 7/1989 | Bigo |
| D305,218 | S | 12/1989 | Nakao et al. |
| 4,921,261 | A | 5/1990 | Sadler, Jr. et al. |
| 4,923,208 | A | 5/1990 | Takahashi et al. |
| 4,930,697 | A | 6/1990 | Takahashi et al. |
| 4,953,887 | A | 9/1990 | Takahashi et al. |
| 4,993,743 | A | 2/1991 | Takahashi et al. |
| 5,087,066 | A | 2/1992 | Mong-Hsing |
| 5,106,116 | A | 4/1992 | Chen |
| 5,110,150 | A | 5/1992 | Chen |
| 5,178,444 | A | 1/1993 | May et al. |
| 5,205,579 | A | 4/1993 | Kato et al. |
| 5,427,402 | A | 6/1995 | Huang |
| 5,454,584 | A | 10/1995 | Haut et al. |
| 5,482,311 | A | 1/1996 | Huang |
| 5,499,831 | A | 3/1996 | Worth et al. |
| 5,503,297 | A | 4/1996 | Frankel et al. |
| 5,513,864 | A | 5/1996 | Huang |
| 5,605,409 | A | 2/1997 | Haut et al. |
| 5,622,377 | A | 4/1997 | Shamie |
| 5,645,293 | A | 7/1997 | Cheng |
| 5,718,444 | A | 2/1998 | Huang |
| 5,741,021 | A | 4/1998 | Saint et al. |
| 5,816,648 | A * | 10/1998 | Baccili et al. ............ 297/159.1 |
| 5,845,924 | A | 12/1998 | Huang |
| 5,855,384 | A | 1/1999 | Pike et al. |
| 5,876,046 | A | 3/1999 | Courtney et al. |
| 5,882,030 | A | 3/1999 | Haut |
| 5,893,577 | A | 4/1999 | Takahashi |
| 5,938,230 | A | 8/1999 | Huang et al. |
| 5,954,404 | A | 9/1999 | Suzuki |
| 5,984,791 | A * | 11/1999 | Fair et al. .................. 472/118 |
| 5,988,669 | A | 11/1999 | Freese et al. |
| 5,988,670 | A | 11/1999 | Song et al. |
| 6,045,145 | A | 4/2000 | Lan |
| 6,062,588 | A | 5/2000 | Cheng |
| 6,062,589 | A | 5/2000 | Cheng |
| 6,068,284 | A | 5/2000 | Kakuda |
| 6,073,957 | A | 6/2000 | Lan |
| 6,095,548 | A | 8/2000 | Baechler |
| 6,099,019 | A | 8/2000 | Cheng |
| 6,102,432 | A | 8/2000 | Cheng |
| 6,105,998 | A | 8/2000 | Baechler et al. |
| 6,116,624 | A | 9/2000 | Hu |
| 6,120,041 | A | 9/2000 | Gehr et al. |
| 6,135,487 | A | 10/2000 | Flannery et al. |
| 6,139,046 | A | 10/2000 | Aalund et al. |
| 6,152,340 | A | 11/2000 | Chen et al. |
| 6,155,592 | A | 12/2000 | Hsia |
| 6,155,740 | A | 12/2000 | Hartenstine |
| 6,189,914 | B1 | 2/2001 | Worth et al. |
| 6,241,273 | B1 | 6/2001 | Gehr |
| 6,267,404 | B1 * | 7/2001 | Yang et al. .................. 280/642 |
| 6,267,406 | B1 | 7/2001 | Huang |
| 6,273,451 | B1 | 8/2001 | Julien et al. |
| 6,276,709 | B1 | 8/2001 | Chen et al. |
| 6,286,844 | B1 | 9/2001 | Cone, II et al. |
| 6,361,056 | B1 | 3/2002 | Chen et al. |
| 6,464,244 | B1 | 10/2002 | Cheng |
| 6,478,327 | B1 | 11/2002 | Hartenstine et al. |
| 6,626,451 | B1 | 9/2003 | Song |
| 6,666,473 | B2 | 12/2003 | Hartenstine et al. |
| 6,669,225 | B2 * | 12/2003 | Greger et al. ............... 280/648 |
| 6,698,773 | B2 * | 3/2004 | Hsia ........................ 280/47.38 |
| 6,877,761 | B2 * | 4/2005 | Hsia ........................... 280/642 |
| 6,910,708 | B2 * | 6/2005 | Sack et al. .................. 280/642 |
| 7,017,922 | B2 * | 3/2006 | Hartenstine et al. ...... 280/47.38 |
| 7,273,224 | B2 * | 9/2007 | Wang ......................... 280/647 |
| 2001/0013688 | A1 | 8/2001 | Warner, Jr. et al. |
| 2001/0013689 | A1 | 8/2001 | Cone, II et al. |
| 2001/0040357 | A1 | 11/2001 | Barrett et al. |
| 2002/0005628 | A1 | 1/2002 | Hartenstine et al. |
| 2002/0084626 | A1 | 7/2002 | Ageneau |
| 2002/0093178 | A1 | 7/2002 | Turner et al. |
| 2002/0109321 | A1 | 8/2002 | Turner et al. |
| 2002/0175498 | A1* | 11/2002 | Yang et al. .................. 280/648 |
| 2003/0057682 | A1 | 3/2003 | Yoshie et al. |
| 2003/0062710 | A1* | 4/2003 | Greger et al. ............... 280/650 |
| 2003/0094791 | A1 | 5/2003 | Hartenstine et al. |
| 2003/0122351 | A1 | 7/2003 | Yeh |
| 2003/0201625 | A1 | 10/2003 | Espenshade et al. |
| 2003/0201626 | A1 | 10/2003 | Hartenstine et al. |
| 2004/0026895 | A1 | 2/2004 | Cheng |
| 2004/0046364 | A1 | 3/2004 | Chen |
| 2004/0090046 | A1 | 5/2004 | Hartenstine et al. |
| 2004/0124611 | A1 | 7/2004 | Gong et al. |
| 2005/0168023 | A1 | 8/2005 | Gangadharan et al. |

FOREIGN PATENT DOCUMENTS

| | | |
|---|---|---|
| EP | 1 069 022 A1 | 1/2001 |
| EP | 1 153 817 A1 | 11/2001 |
| EP | 1 160 145 | 12/2001 |
| WO | WO 03/035448 A | 5/2003 |

OTHER PUBLICATIONS

Photographs of Aprica Stroller, 4 pp., Aprica Kassai Inc., stroller available prior to Apr. 13, 2005.

Photographs of Combi Stroller. 3 pp., Combi International Corporation, stroller available prior to Apr. 13, 2005.

Product literature Prince Lionheart Click 'n Go stroller cup holder, 2004, 1 page. — Admitted Prior Art.

Photograph of Graco Duo Glider stroller cup holder. — Admitted Prior Art.

Photograph of Graco Glider stroller cup holder. — Admitted Prior Art.

Photograph of Graco Literider stroller cup holder. — Admitted Prior Art.

Photograph of Graco Metrolite stroller cup holder. — Admitted Prior Art.

Photograph of Graco Quattro Tour stroller cup holder. — Admitted Prior Art.

Prince Lionheart-Travel-#6528, www.princelionheart.com/site/t-str-6528.html; 1 page. — Admitted Prior Art.

* cited by examiner

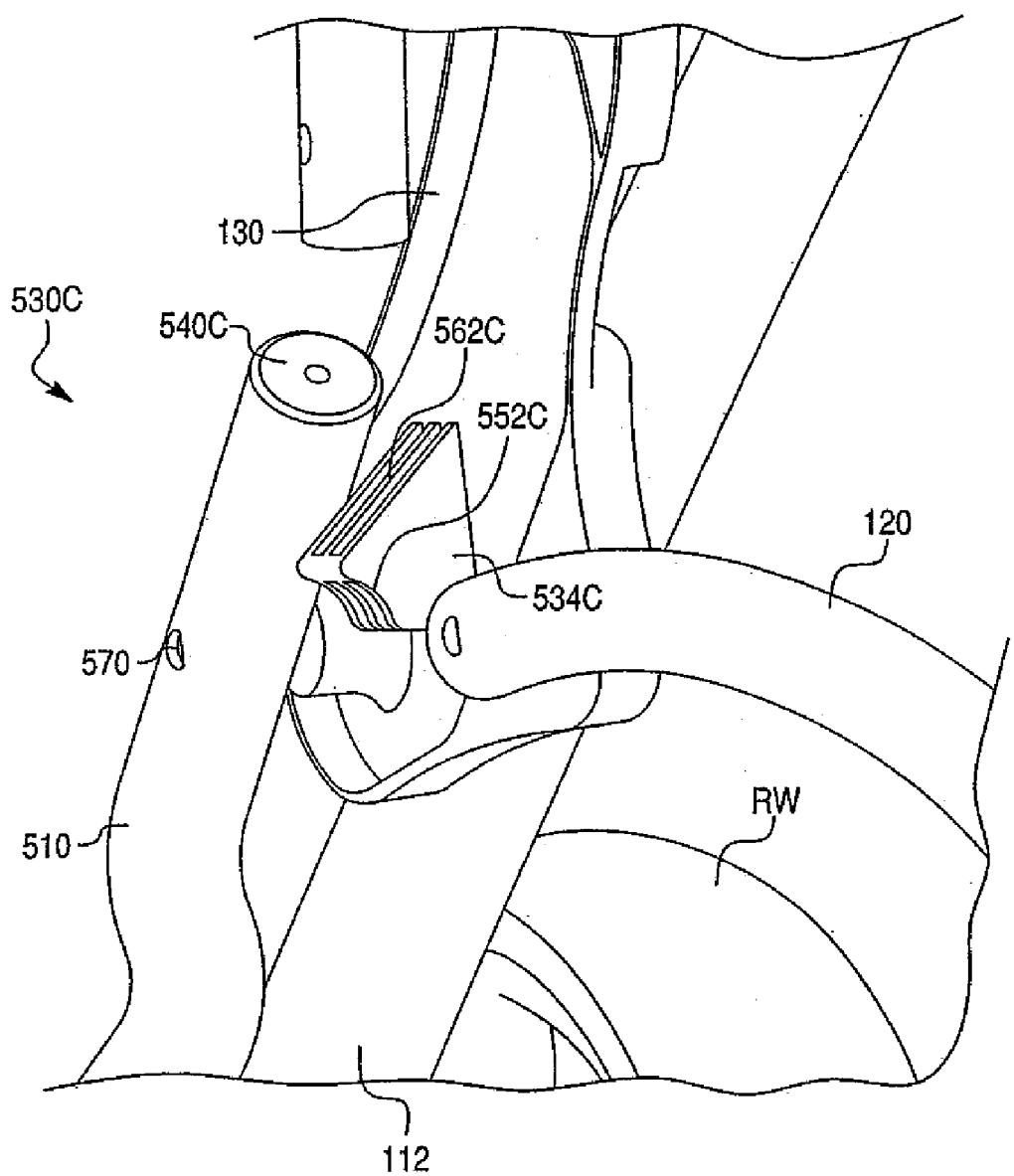

US 7,571,925 B2

STROLLER WITH CHILD BARRIER AND PIVOTABLE CUP HOLDER

RELATED APPLICATION DATA

This patent is a division of U.S. patent application Ser. No. 11/104,657, filed on Apr. 13, 2005, which claims priority benefit of both U.S. Provisional Application Ser. Nos. 60/561,518, filed on Apr. 13, 2004, and 60/609,842, filed on Sep. 15, 2004, all of which are hereby incorporated by reference in their entirety.

FIELD OF THE DISCLOSURE

The present disclosure relates to strollers with a child barrier, and more specifically to a stroller with a movable child barrier and a cup holder that can pivot when the child barrier moves relative to the stroller.

BACKGROUND

Strollers often are equipped with a child tray positioned in front of the seat back of the child seat and above the seat bottom of the child seat. The child tray generally is movably mounted to the stroller frame so that the child tray can be pivoted or slid away from the child seat to facilitate removal of the child from, or placement of the child into, the seat. The child tray can include a built-in cup holder for holding a sippy cup, a juice box, snacks, or other items. An older child seated in the stroller can reach the item(s) contained in the cup holder himself and, thus, remain content in the stroller for longer periods of time. When a caregiver needs to move the child tray, however, item(s) in the cup holder may spill out of the cup holder.

Thus, there is a need in the art for a stroller with a cup holder that is accessible to a child seated in the stroller and that can remain stationary as the child tray is moved relative to the stroller frame.

SUMMARY OF THE DISCLOSURE

An aspect of the invention relates to a stroller that includes a stroller frame, a child seat positioned on the stroller frame and including a seat back, a seat bottom, and a seat bight, and a child barrier movably coupled to the stroller frame forward of the seat bight. The stroller frame includes a cup holder forward of the seat bight. The cup holder remains stationary relative to the stroller frame while the child barrier moves relative to the stroller frame.

Another aspect of the invention relates to a stroller that includes a stroller frame including first and second arm supports and a cup holder integrally formed with the first arm support, and a child seat positioned on the stroller frame between the first and second arm supports.

Another aspect of the invention relates to a stroller that includes a stroller frame having first and second arm supports, a child seat positioned on the stroller frame between the first and second arm supports, a cup holder mounted to the first arm support, and a child barrier movably coupled to the second arm support and releasably coupled to at least one of the first arm support and the cup holder. The cup holder remains stationary relative to the stroller frame while the child barrier moves relative to the stroller frame.

Another aspect of the invention relates to a stroller that includes a stroller frame including a cup holder, a child seat positioned on the stroller frame, and a child barrier having first and second ends, the first end of the child barrier being movably coupled to the cup holder to move the child barrier between an open, access position, in which the second end of the child barrier is detached and moved away from the stroller frame, and a closed, in-use position, in which the second end of the child barrier is coupled to the stroller frame.

Another aspect of the invention relates to a stroller that includes a stroller frame, a child seat positioned on the stroller frame and including a seat back, a seat bottom, and a seat bight, and a child barrier movably coupled to the stroller frame forward of the seat bight. The child barrier includes a cup holder with a central longitudinal axis. When the child barrier moves relative to the stroller frame, the cup holder pivots about the central longitudinal axis.

Another aspect of the invention relates to a stroller that includes a stroller frame, a child seat positioned on the stroller frame and including a seat back, and a child barrier movably coupled to the stroller frame forward of the seat back. The stroller frame includes a cup holder forward of the seat back. The cup holder remains stationary relative to the stroller frame while the child barrier moves relative to the stroller frame.

Another aspect of the invention relates to a stroller that includes a stroller frame, a child seat positioned on the stroller frame and including a seat back, and a child barrier movably coupled to the stroller frame forward of the seat back. The child barrier includes a cup holder with a central longitudinal axis. When the child barrier moves relative to the stroller frame, the cup holder pivots about the central longitudinal axis.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 26B is a front perspective side view of the latch assembly of FIG. 26A supporting the basket frame in an access position.

DETAILED DESCRIPTION OF THE DISCLOSURE

Reference will now be made in detail to presently preferred embodiments of the invention, examples of which are illustrated in the accompanying drawings. An effort has been made to use the same reference numbers throughout the drawings to refer to the same or like parts.

Figure 1:
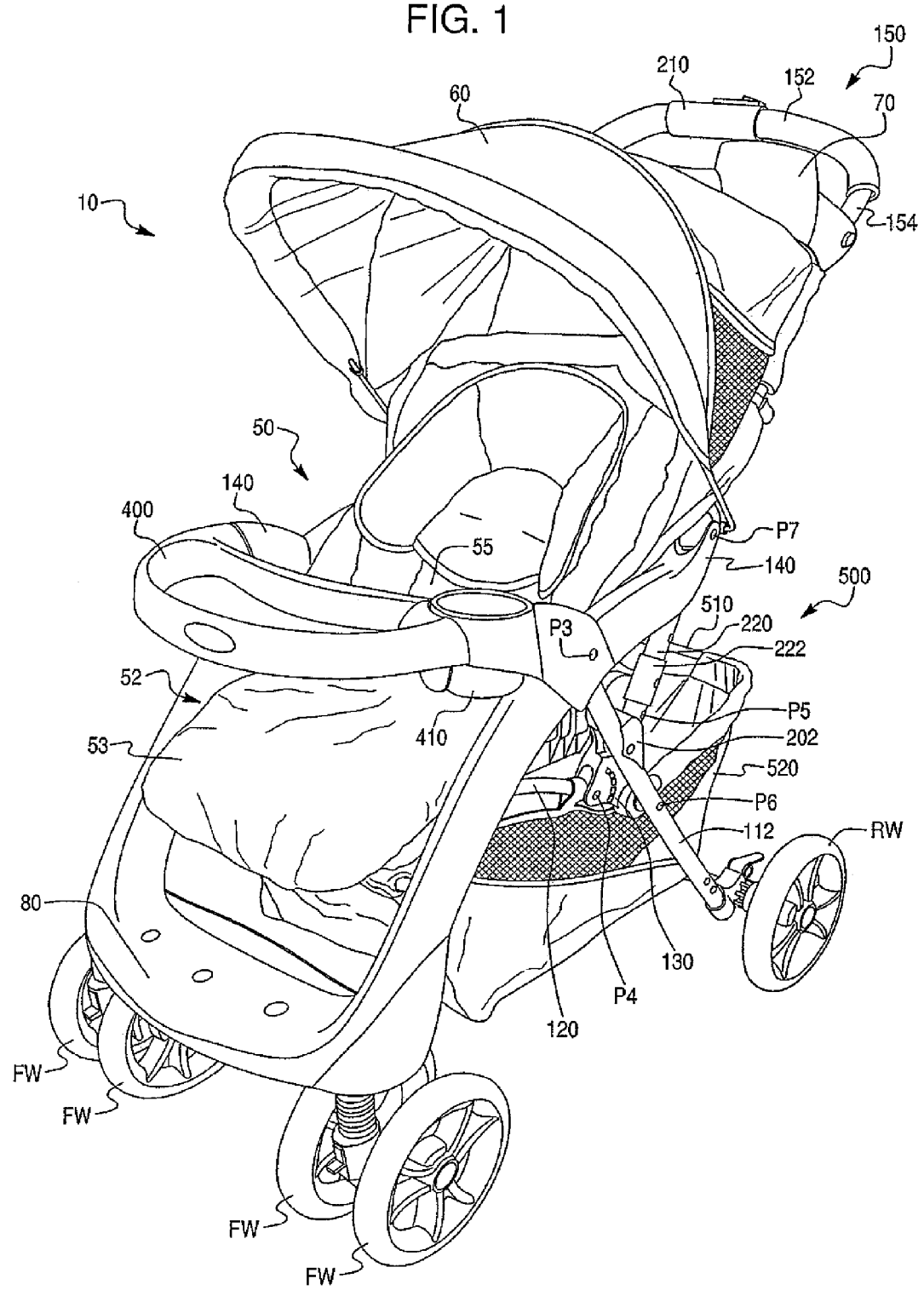
FIG. 1 is a front perspective view of a stroller according to an embodiment of the invention.
Figure 5:
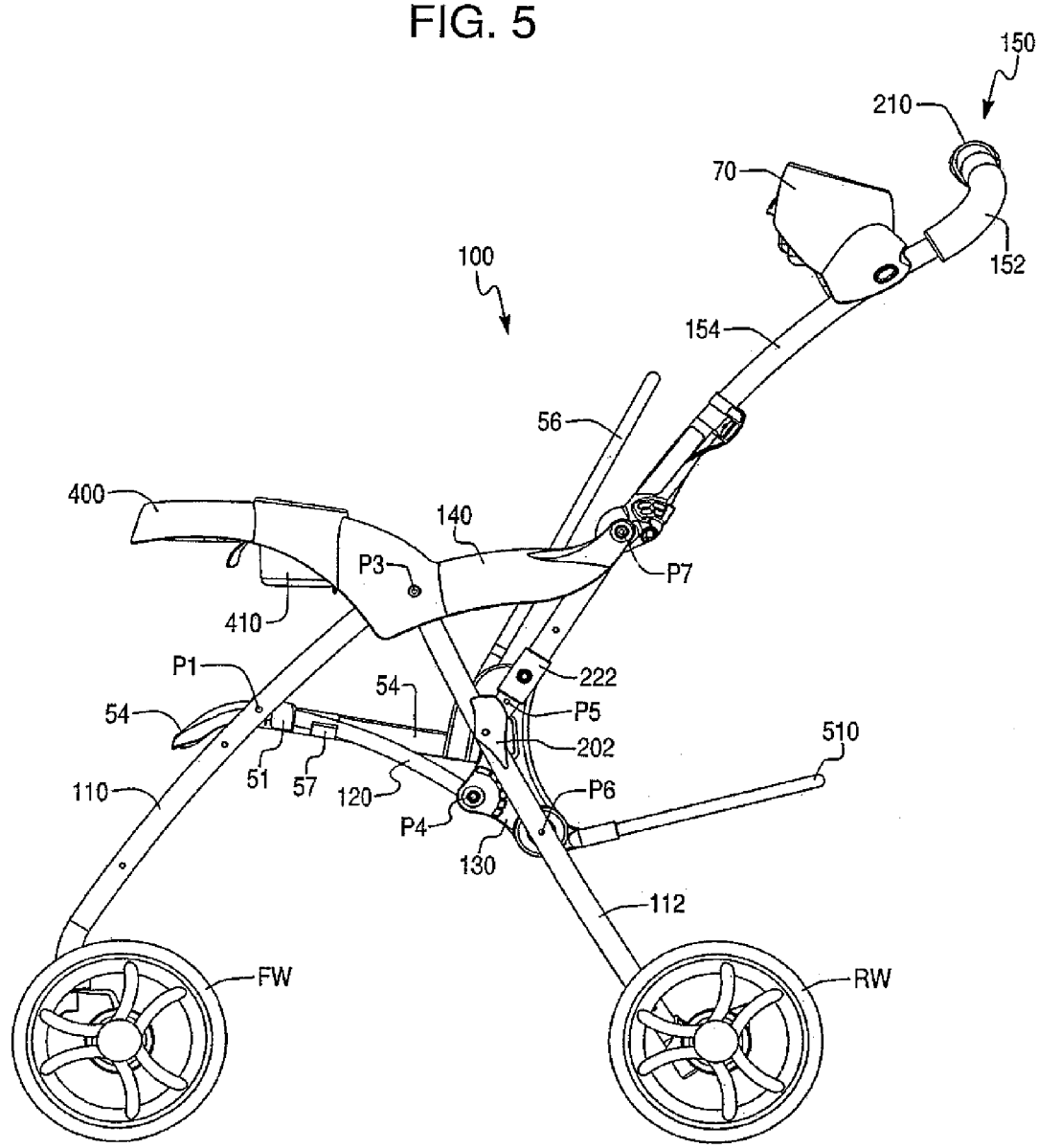
FIG. 5 is a side elevation view of the stroller shown in FIG. 4.
Figure 13A:
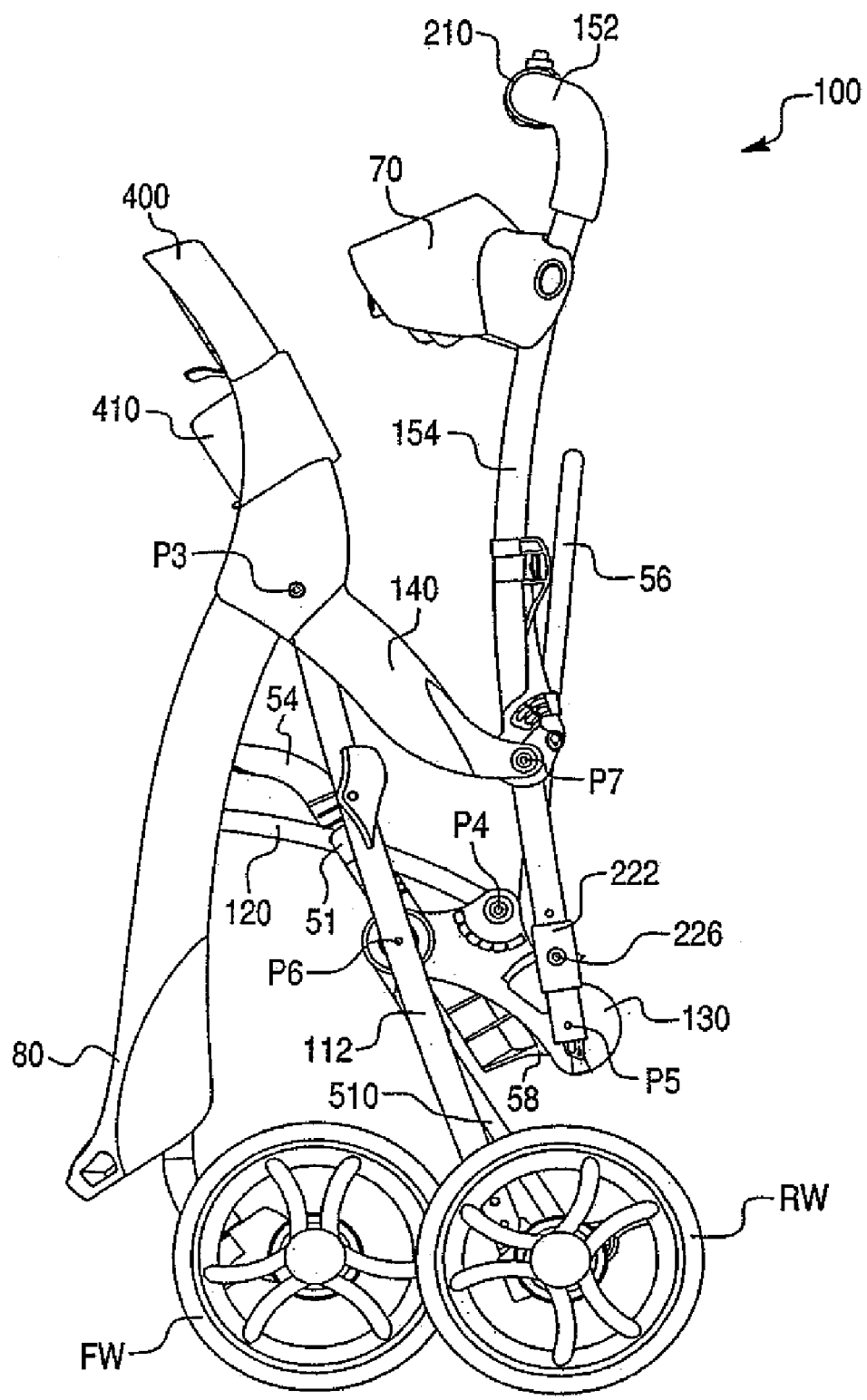
FIG. 13A is a side elevation view of the stroller shown in FIG. 4, in which the stroller is fully collapsed.

FIG. 1 shows a perspective view of an embodiment of a stroller 10 in accordance with the invention. The stroller 10 includes a stroller frame 100 that is movable between an in-use configuration and a folded configuration. FIG. 5 shows the stroller frame 100 in the in-use configuration, and FIG. 13A shows the stroller frame 100 in the compact, folded configuration. As can be understood from FIGS. 5 and 13A, the stroller frame 10 folds to a very compact size relative to its in-use size due to the unique fold geometry of the stroller 10.

The stroller 10 can include a child barrier, such as child tray 400 or arm bar 490, movably coupled to the stroller frame 100 and a cup holder 410 mounted either to the stroller frame 100 or to the child barrier. The cup holder can be arranged on the stroller frame 100 such that, as the child barrier moves relative to the stroller frame 100, the cup holder can remain stationary relative to the stroller frame 100. The cup holder also can be arranged on the child barrier such that, as the child barrier moves relative to the stroller frame 100, the cup holder pivots about its central longitudinal axis. Accordingly, when a caregiver needs to move the child barrier, for example, to remove a child from the stroller seat, the caregiver need not worry about spillage of items stored in the cup holder.

The stroller 10 also can include a basket assembly 500 including a basket frame 510 and a basket 520 suspended from the basket frame 510. The basket frame 510 is arranged relative to the stroller frame 100 such that application of downward force on the basket frame 510 moves the basket frame 510 from an in-use position to an access position. Upon removal of the downward force, the basket frame 510 can remain in the access position. The basket assembly 500 does not include an actuator; a simple downward application of force on the basket frame 510 will move the basket frame 510 to its access position. In addition, once in the access position, a caregiver can release the basket frame 510 and use both hands to load items into, or unload items from, the basket 520.

The stroller 10, its frame components, and its fold geometry now will be described in connection with FIGS. 1-13C. The stroller 10 is generally intended for transporting children, but the inventive principles can be applied to all types of wheeled transports, including carts or carriages having a foldable frame.

The stroller 10 generally includes the stroller frame 100 and a seat assembly 50 mounted to the stroller frame 100, The seat assembly 50 includes a cushioned seat 52 made of a fabric material, a seat support 54 movably mounted to the stroller frame 100, and a seat back frame member 56 pivotally mounted to the seat support 54. The seat 52 itself has a seat bottom 53, which is secured to the seat support 54, and a seat back 55, which is secured to the seat back frame member 56. The seat bottom 53 and the seat back 55 can create a child seating area to receive a child. The seat back 55 can include side bolsters that curve slightly forward at either side of the seat back 55, as well as a removable head bolster for use with smaller children. The seat assembly 50 also can include a canopy 60 that is pivotally connected to the stroller frame 100.

The stroller 10 further can include a parent tray or console 70 and a footrest 80. The footrest 80 can be a generally U-shaped plastic molded structure that extends over the front legs of the stroller frame 100, as shown in FIG. 1.

Figure 4:
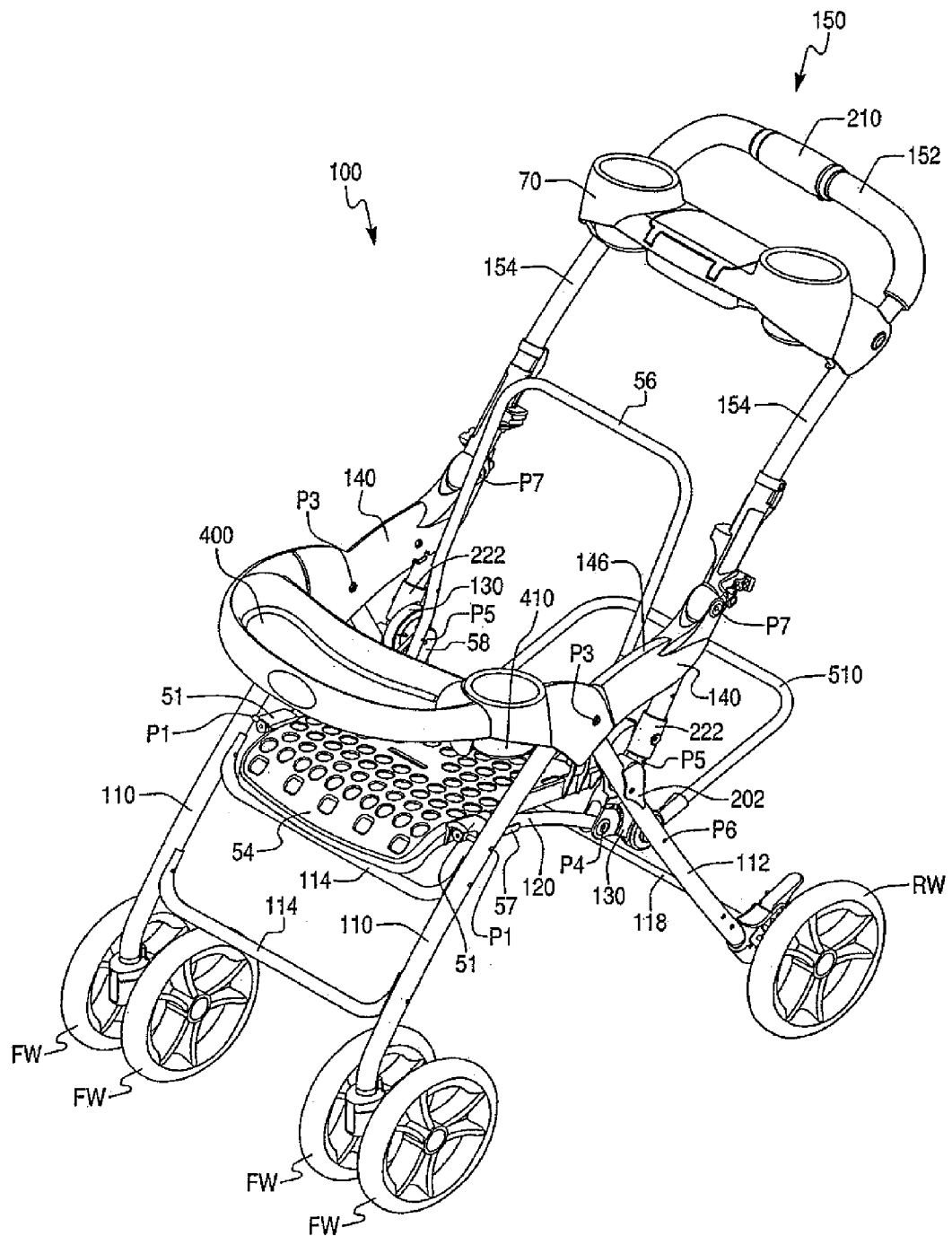
FIG. 4 is a front perspective view of the stroller shown in FIG. 1, absent the soft goods.
Figure 6:
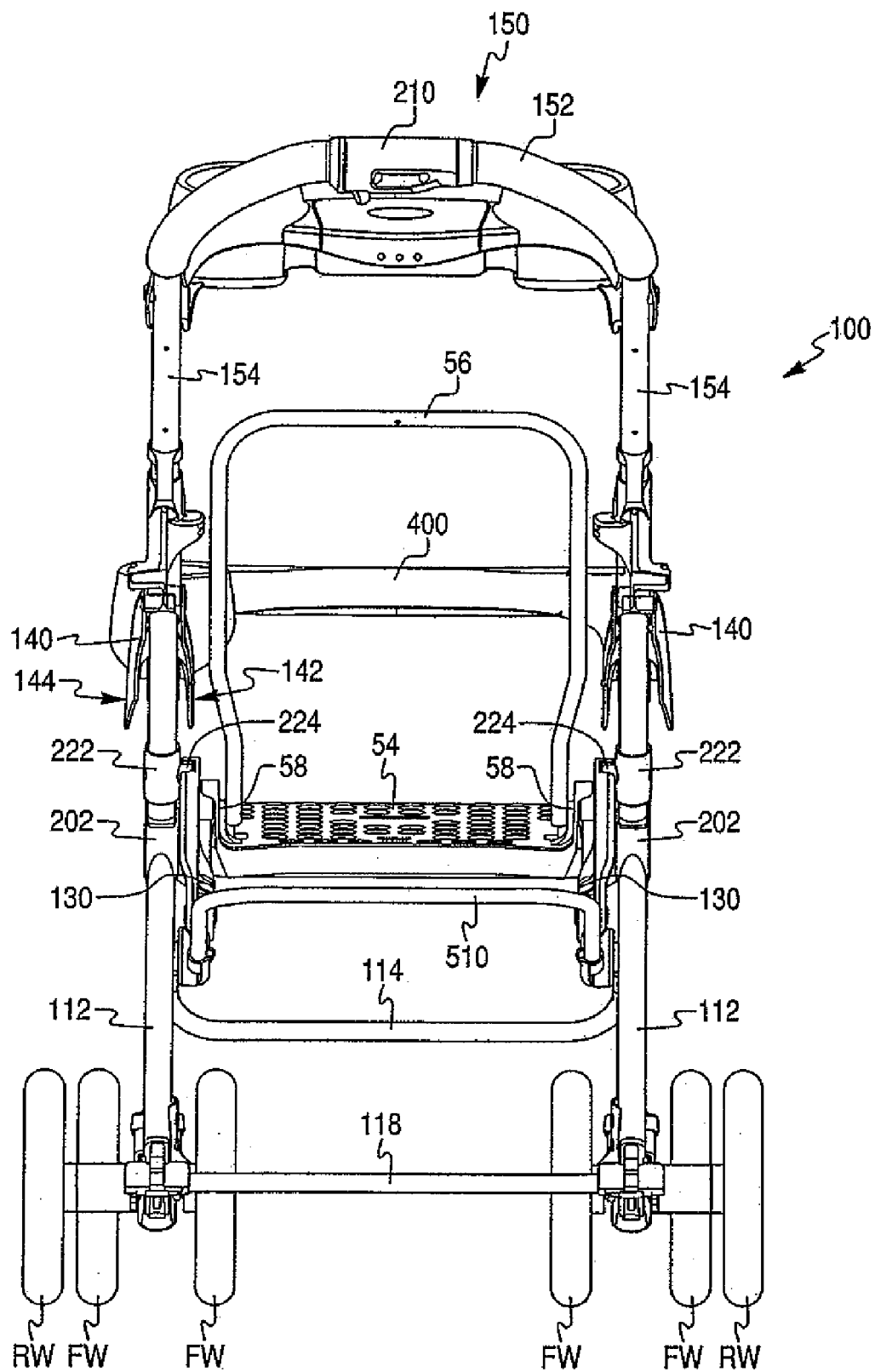
FIG. 6 is a rear elevation view of the stroller shown in FIG. 4.
Figure 7:
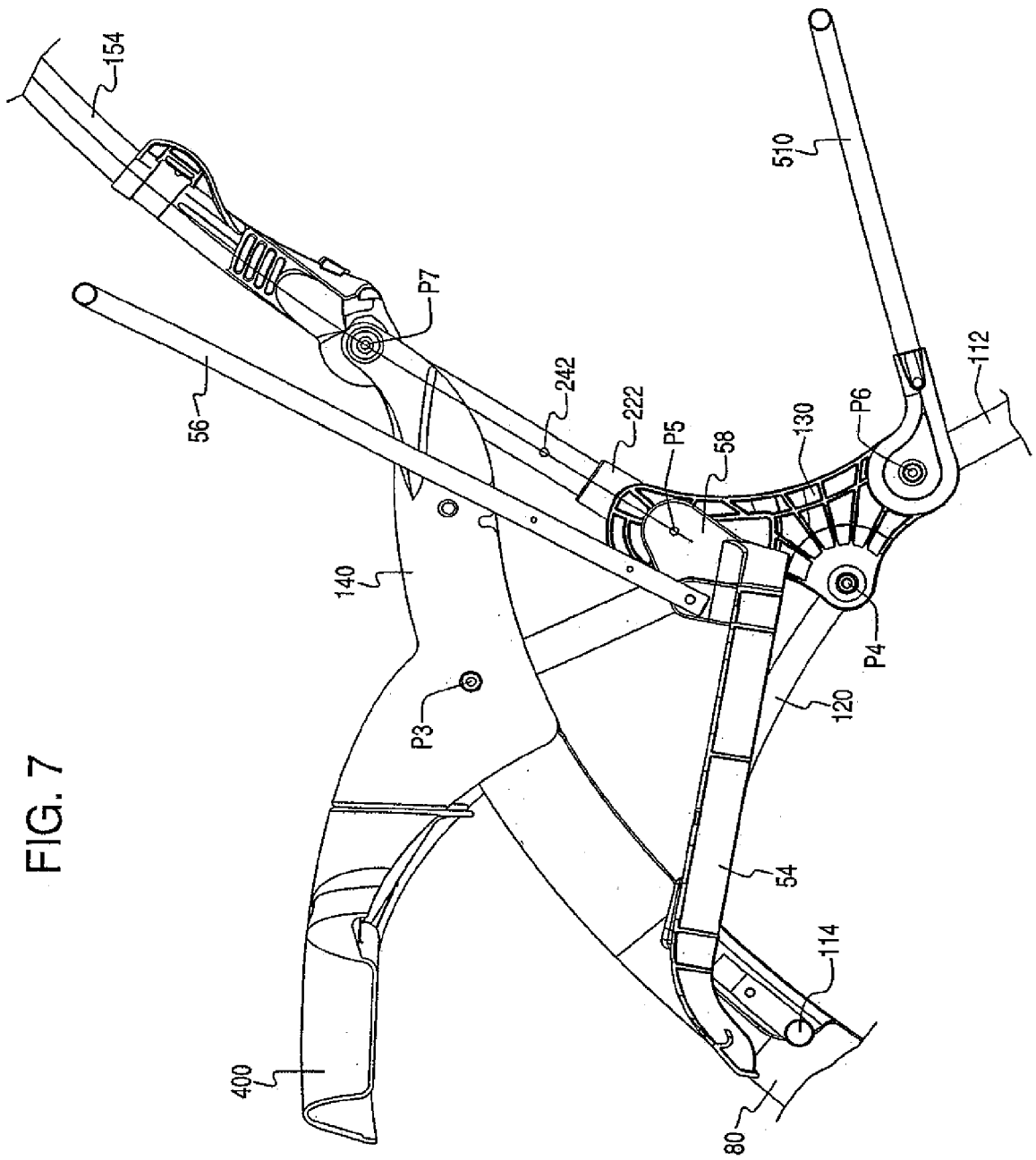
FIG. 7 is a detail, side elevation view, in partial cross section, of certain stroller components, including a fold link that facilitates folding of the stroller, taken from inside of the stroller.
Figure 13B:
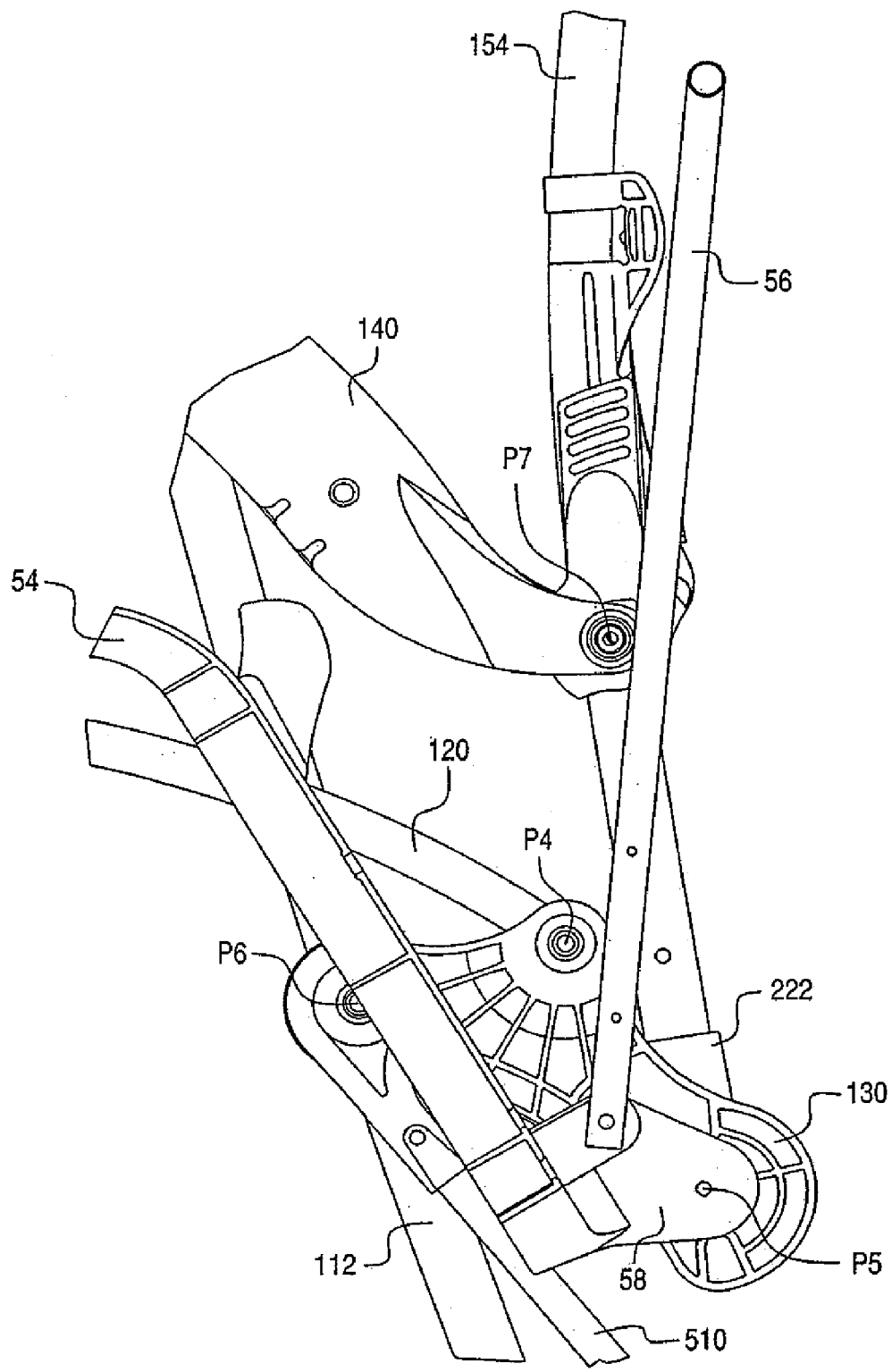
FIG. 13B is a side elevation view of the fold link and surrounding stroller components of the stroller of FIG. 13A, taken from an inboard side of the fold link.
Figure 13C:
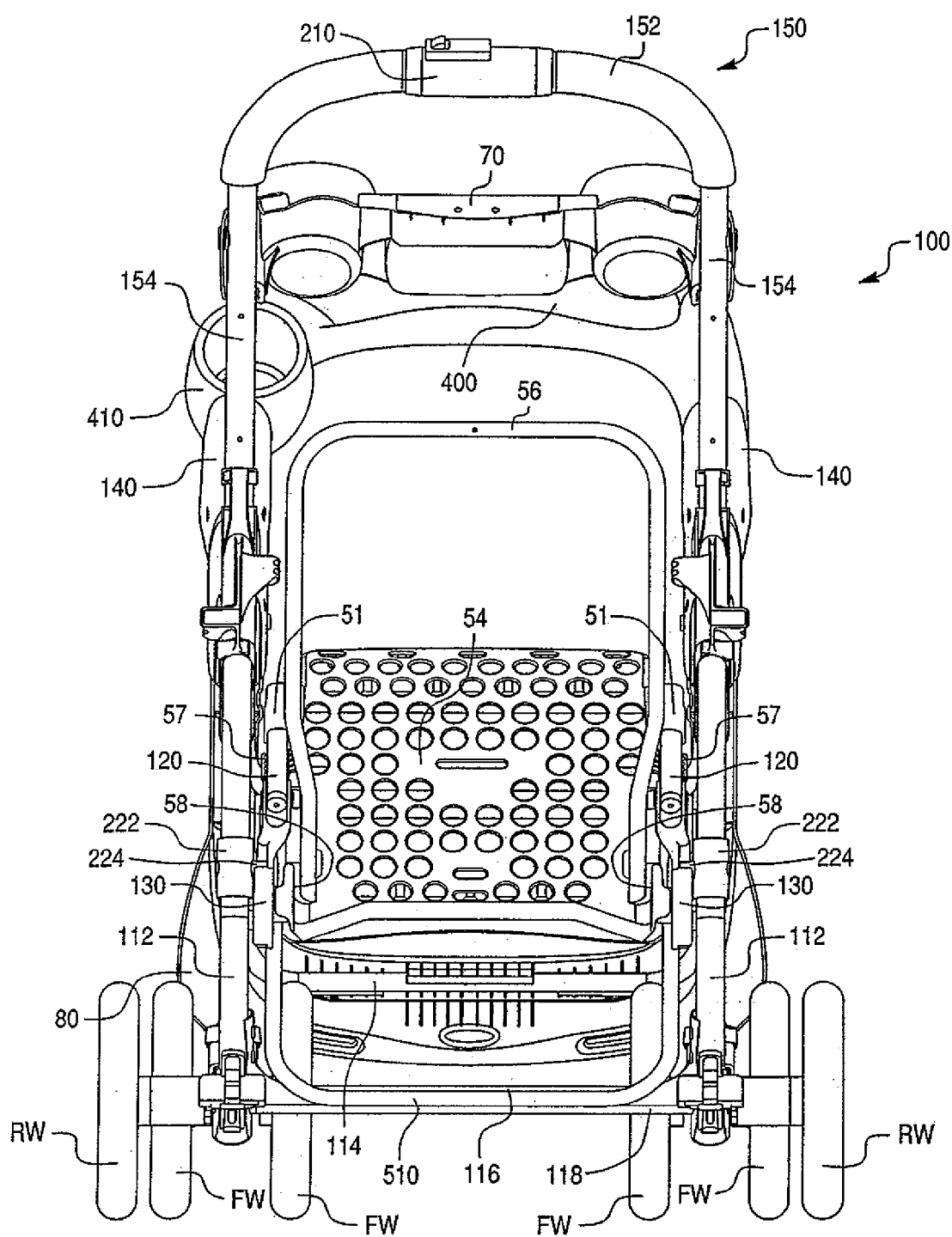
FIG. 13C is a rear elevation view of the stroller shown in FIG. 13A.

The stroller frame 100 is convertible between an operating, in-use configuration, as shown, for example, in FIGS. 4-6, and a stowed or folded configuration, as shown, for example, in FIGS. 13A-13C. In the in-use configuration, the stroller 10 can receive and transport a child in a manner well understood by those skilled in the art. In the folded configuration, the stroller 10 can be stored upright on its front wheels FW and its rear wheels RW in a compact arrangement.

To more clearly reveal the stroller frame 100 and some components of the seat assembly 50, the stroller 10 is shown in FIGS. 4-6 without certain soft goods, such as the seat 52, the canopy 60, and the basket 520, and without certain plastic molding, such as the footrest 80. The stroller frame 100 can include right and left front legs 110, right and left rear legs 112, right and left seat support frame members 120, right and left link members 130 that function as fold links, and right and left arm supports 140. The stroller frame 100 also can include a generally U-shaped handlebar frame 150 that includes a handle bar 152 and push arms 154 on each side of the stroller 10 that extend from the handlebar 152 to the respective rear legs 112. One or more front cross braces 114 can extend between the front legs 110 to reinforce the front legs 110. Similarly, a rear cross member 116 can extend between the rear legs 112 to reinforce the rear legs 112.

Front wheels FW can be mounted to the lower ends of the front legs 110, and rear wheels RW can be mounted to the lower ends of the rear legs 112. A rear axle 118 can extend between the rear wheels RW.

Figure 5A:
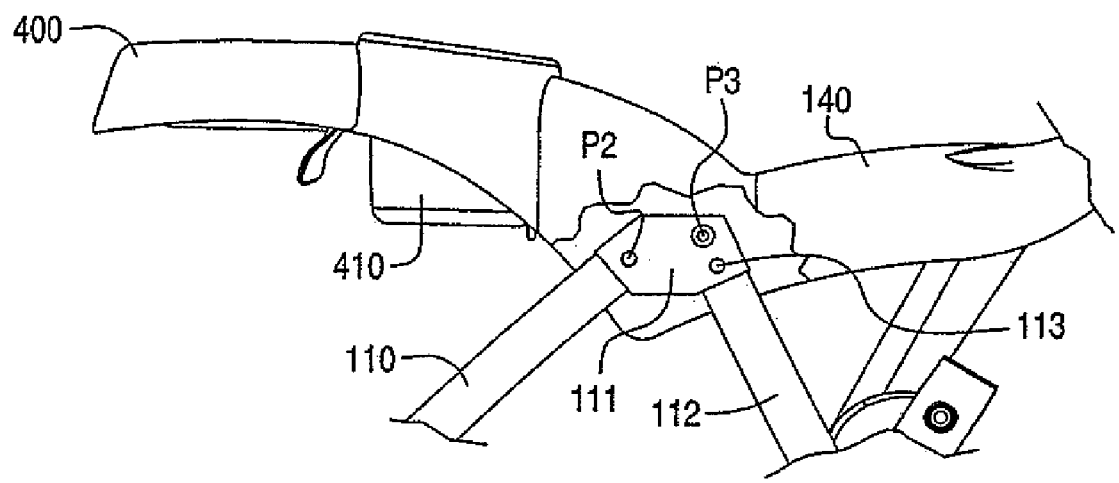
FIG. 5A is a cut-away, side view of an arm support of the stroller shown in FIG. 4.

Each front leg 110 of the stroller frame 100 is pivotally connected to a respective seat support frame member 120 at pivot P1, as best seen in FIG. 5. This pivot P1 and all other pivots designated "Px", where x represents a number, designates a pivotal connection, a pivot, or a pivotal mount, or any conventional pivoting configuration, which can include pins, shafts, bolts, rivets, bearings, and the like. Each front leg 110 also is pivotally connected by pivot P2 to a generally triangular tie frame member 111 that itself is pivotally mounted to an inside surface of the respective arm support 140 at pivot P3, as shown in FIG. 5A. In this regard, the front legs 110 can pivot relative to the arm supports 140.

Each rear leg 112 is fixedly connected to the tie frame member 111 by a fixed pin 113. The rear leg 112 can pivot relative to the respective arm support 140 by pivoting of the tie frame member 111 about pivot P2. The rear legs 112 also are releasably coupled to the respective push arms 152 at braces 202.

Figure 3:
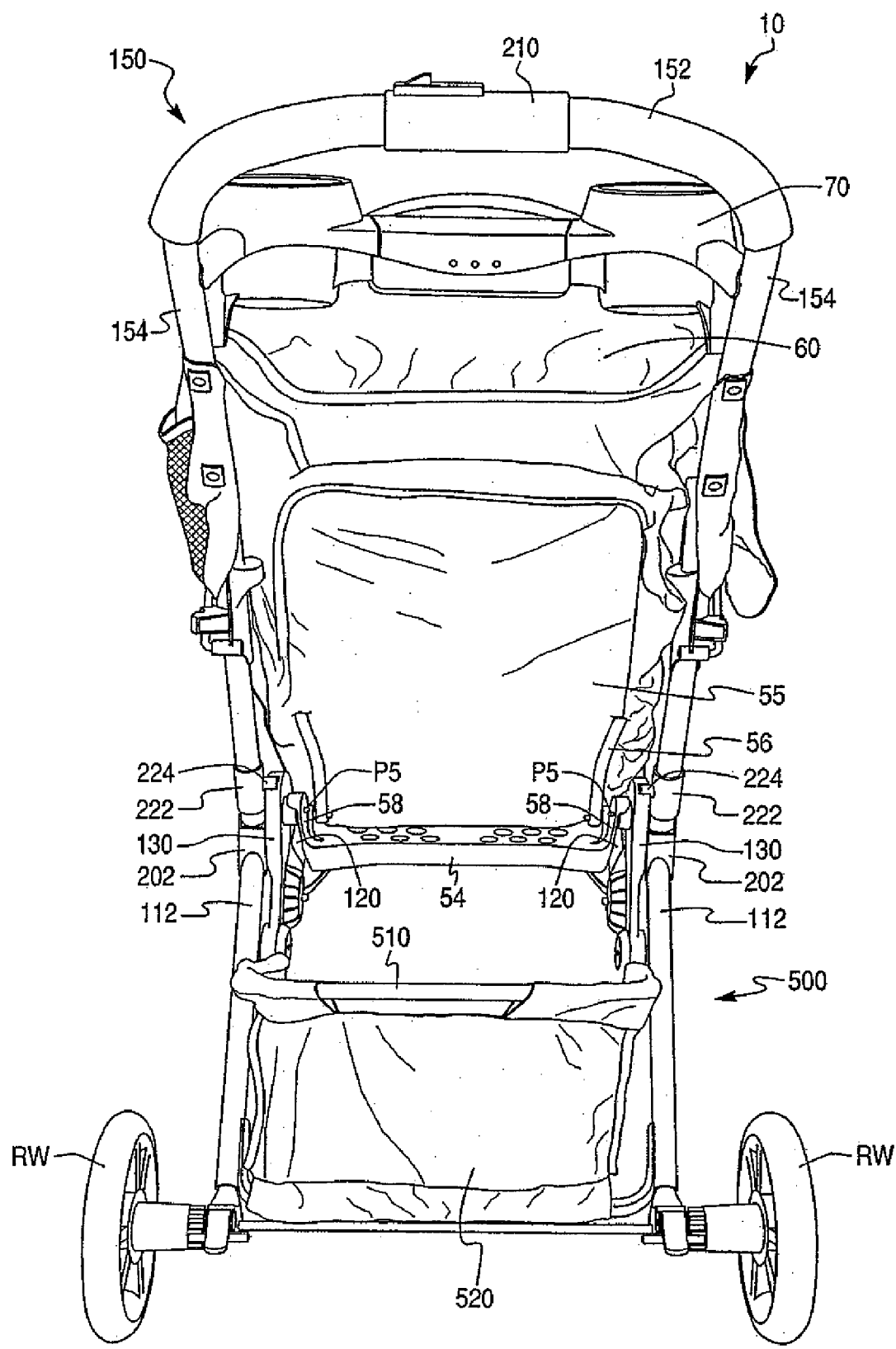
FIG. 3 is a rear elevation view of the stroller shown in FIG. 1.

The seat support frame members 120 each extend between the respective front legs 110 and the respective fold links 130. As mentioned above, the seat support frame members 120 are pivotally connected to the respective front leg 110 at pivot P1. The seat support frame members 120 also are pivotally connected to the respective fold links 130 at pivots P4. The seat support frame members 120 and the fold links 130 of the illustrated embodiment are disposed inward of the front and rear legs 110, 112 (that is, closer to the central longitudinal axis of the stroller 10 than the rear legs 110), as can be seen in FIGS. 3 and 6.

The fold links 130 each have three pivot points, which allow the fold links 130 to pivot and drive the stroller frame 100 from its in-use configuration to its compact, folded configuration. In this regard, the fold links 130 each are pivotally connected to the respective seat support frame member 120 at pivot P4 (first pivot on fold link), to the respective push arm 154 at pivot P5 (second pivot on fold link), and to the respective rear leg 112 at pivot P6 (third pivot on fold link). The position of pivots P4, P5, P6 on fold links 130 is optimized to provide a smooth folding motion to achieve a compact, folded configuration of the stroller, as will be described below. In addition, because pivot P5 is forward of pivot P6 in the stroller's in-use configuration, as seen in FIG. 5, the weight of a child seated in the seat 52 prevents the stroller frame 100 from folding if the fold actuator 210 is actuated inadvertently. Further, because the seat support 54 is pivoted to the fold links 130 at the same pivot as the push arms 152, the weight of a child seated on the seat support 54 will force the push arms 152 into engagement with the braces 202.

Figure 8:
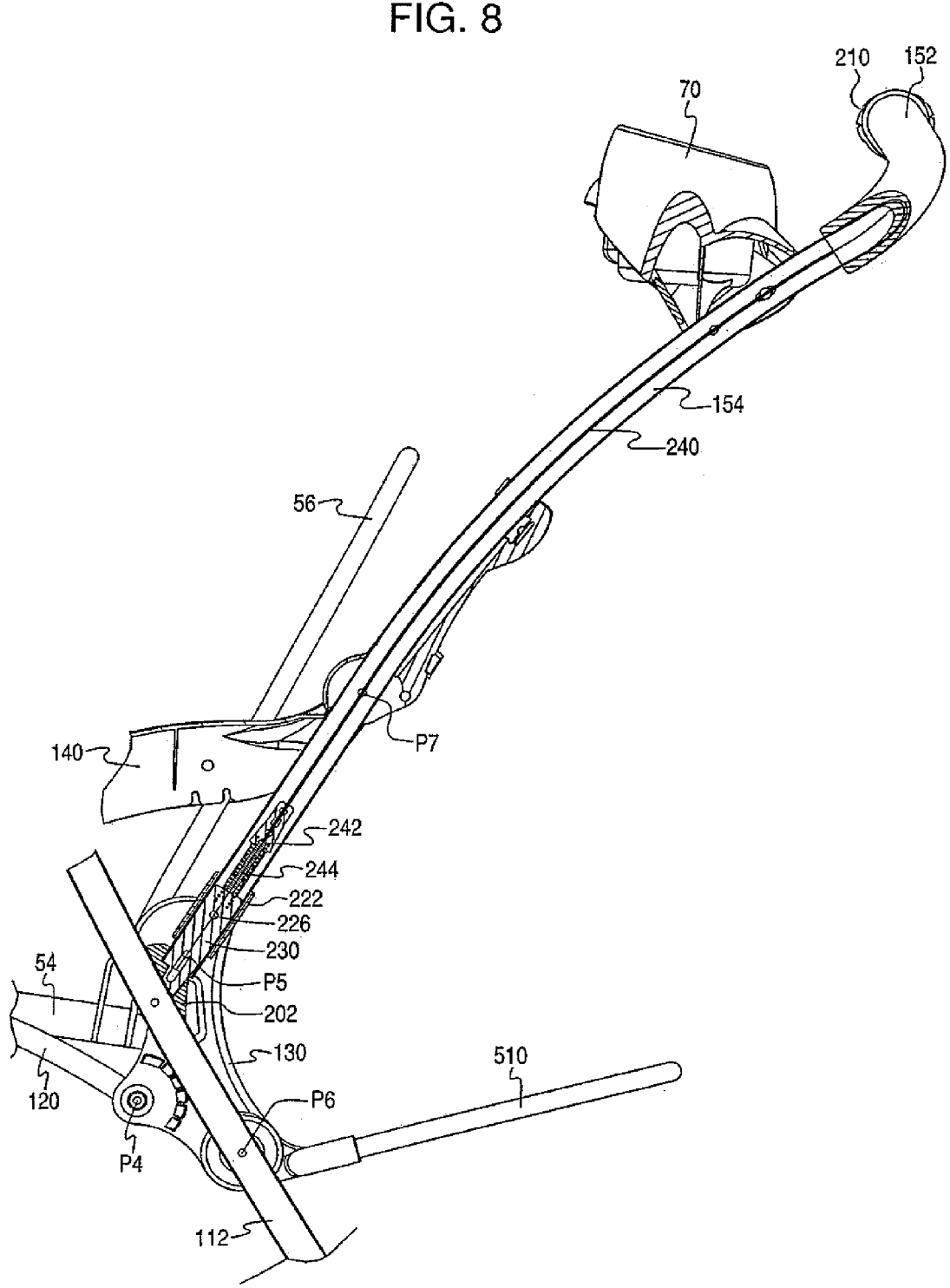
FIG. 8 is a cut-away, side view, in partial cross section, of a handle bar assembly and the fold link region of the stroller shown in FIG. 4, looking from outside the stroller, in which the fold actuator assembly is shown in a non-actuated state.
Figure 8A:
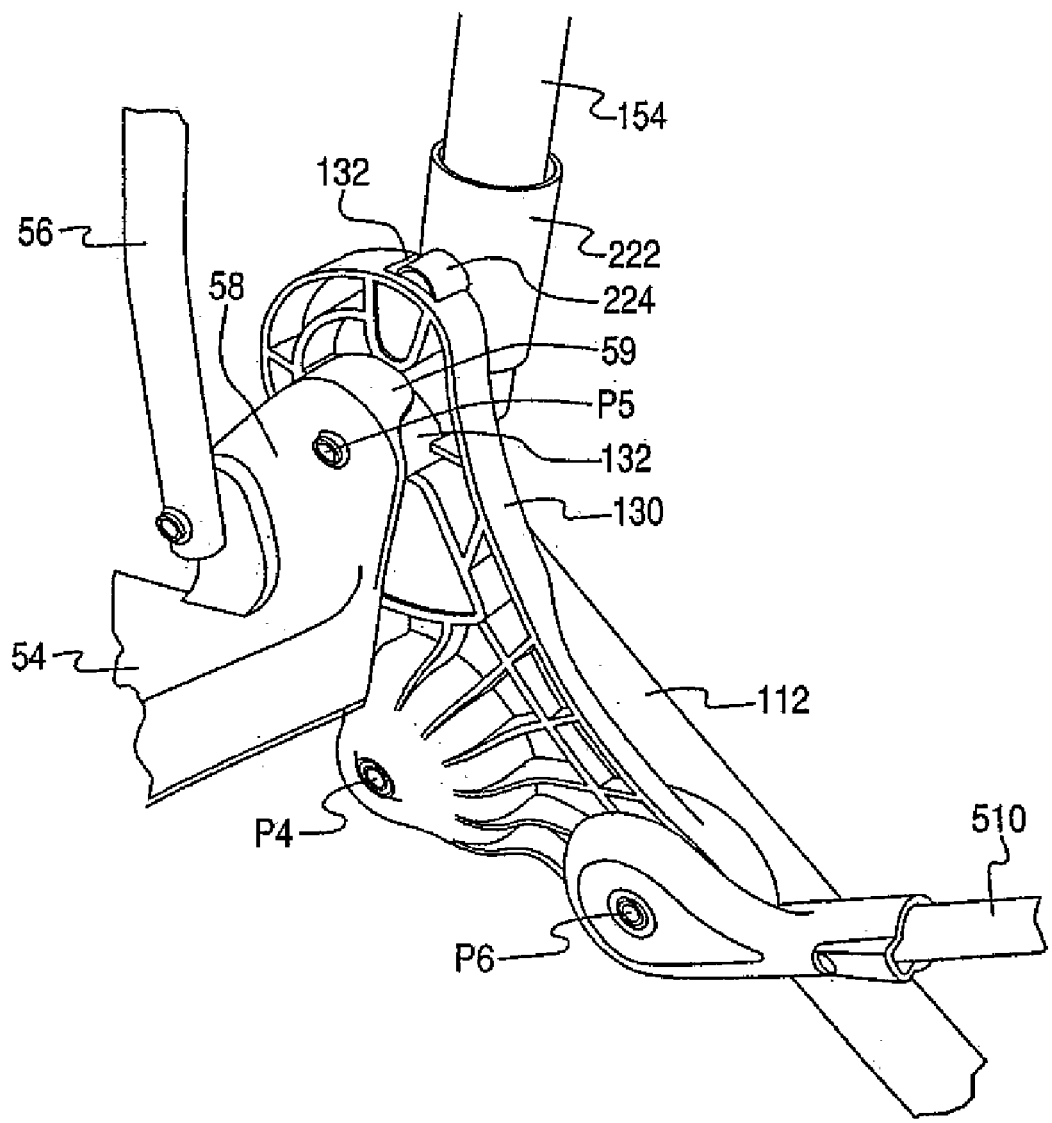
FIG. 8A is a detail perspective view of the fold link and surrounding stroller structure of the stroller shown in FIG. 4, in which the fold actuator assembly is in a non-actuated state
Figure 9:
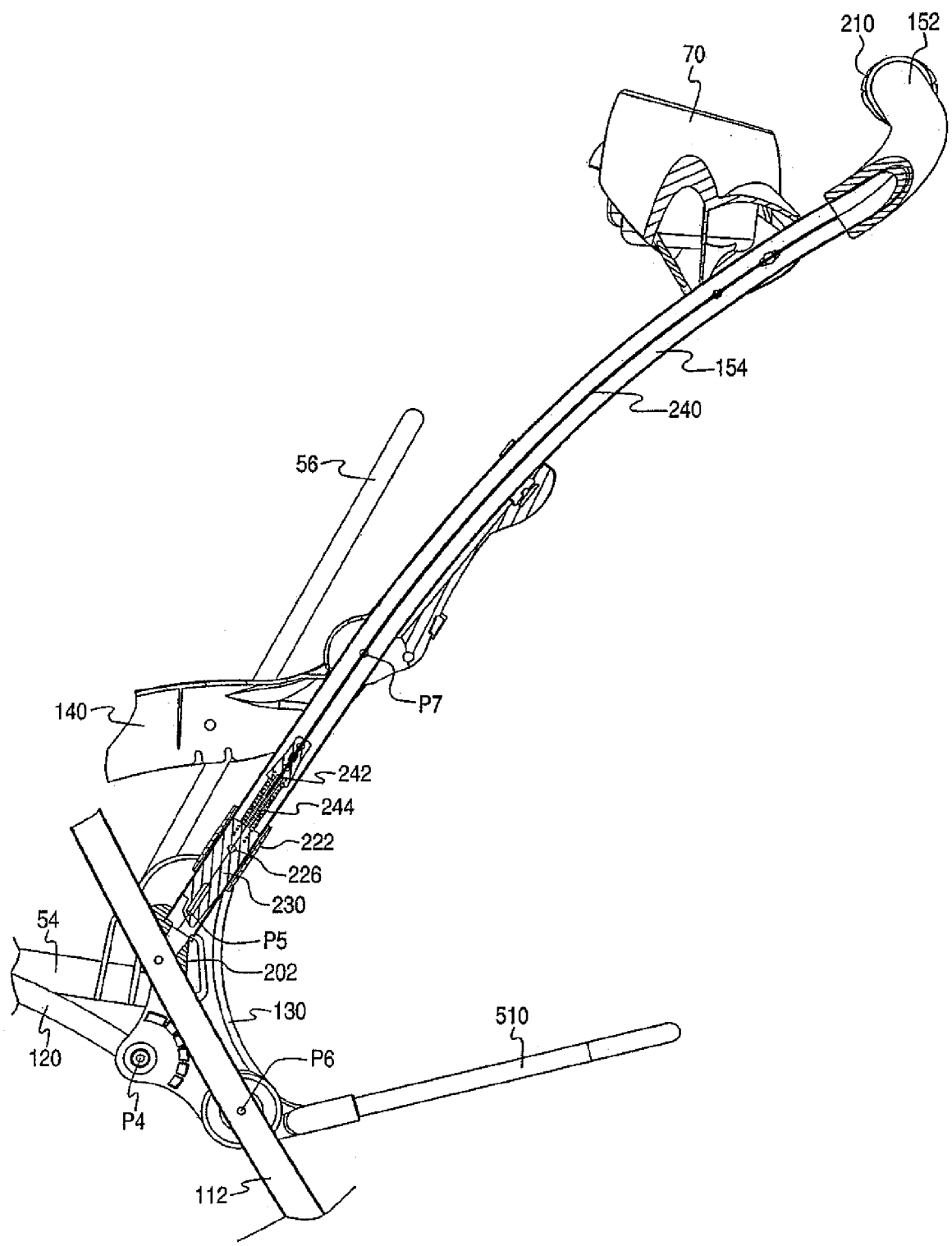
FIG. 9 is a cut-away, side view, in partial cross section, of the handle bar assembly and the fold link region of the stroller shown in FIG. 4, looking from outside the stroller, in which the fold actuator assembly is shown in an actuated state.
Figure 9A:
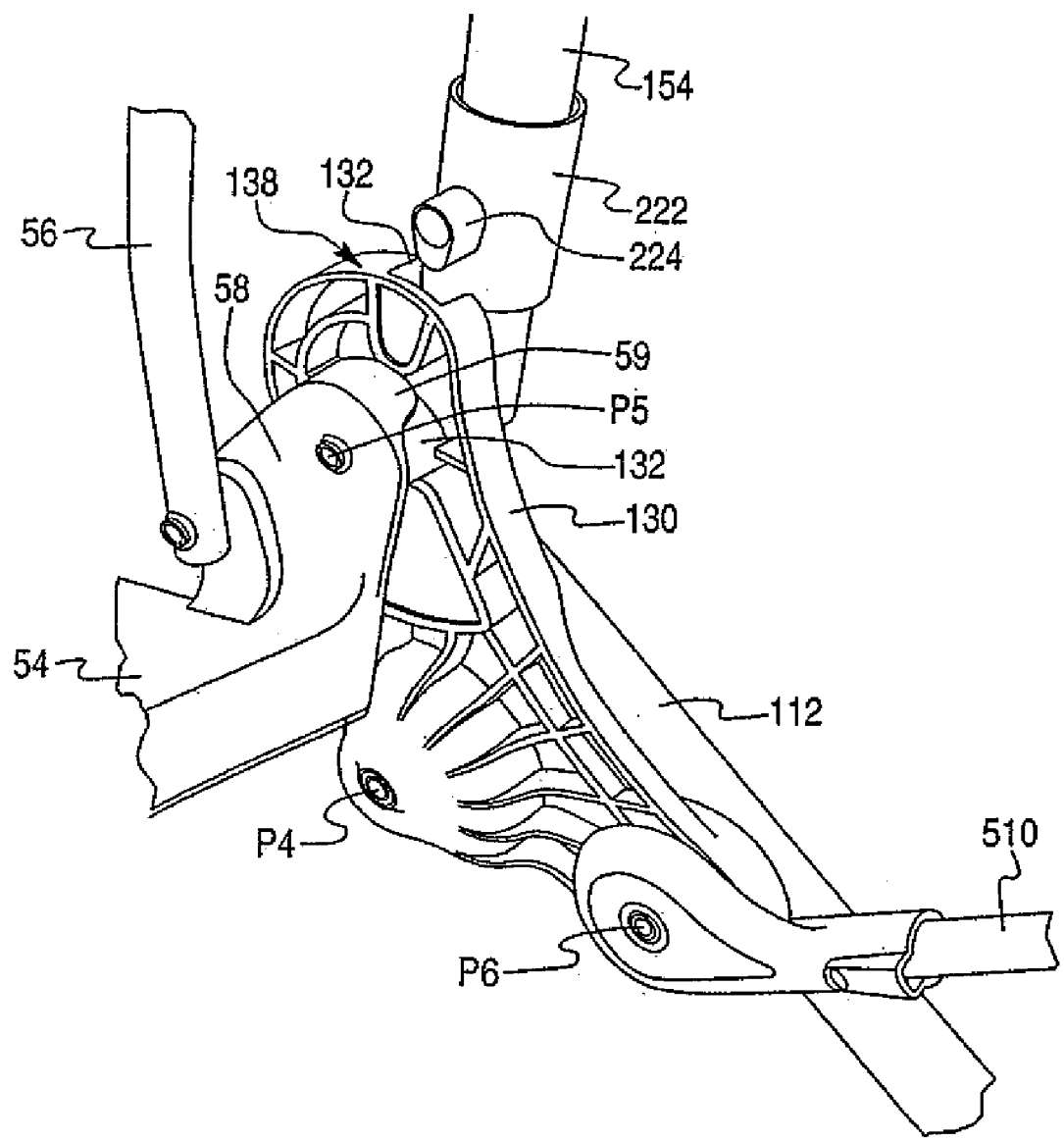
FIG. 9A is a detail perspective view of the fold link and surrounding stroller structure of the stroller shown in FIG. 4, in which the fold actuator assembly is in an actuated state.

In addition to stroller frame components 112, 120, and 154, the seat support 54 is pivotally connected to the right and left fold links 130 at pivots P5. In this regard, the seat support 54 can include right and left extensions 58 that are adapted to pivotally connect to the fold links 130 at pivots P5. The extensions 158 can curve upward and generally perpendicularly from an upper surface of the seat support 54 to intersect with pivot P5. The seat back frame member 56 can be pivotally connected to these wing extensions 58, as shown, for example, in FIG. 3. The extensions 58 can include an arcuate cap 59 that can smoothly slide over a hub 132 formed on an inner surface of the fold link 130, as shown in FIGS. 8A and 9A.

Figure 2:
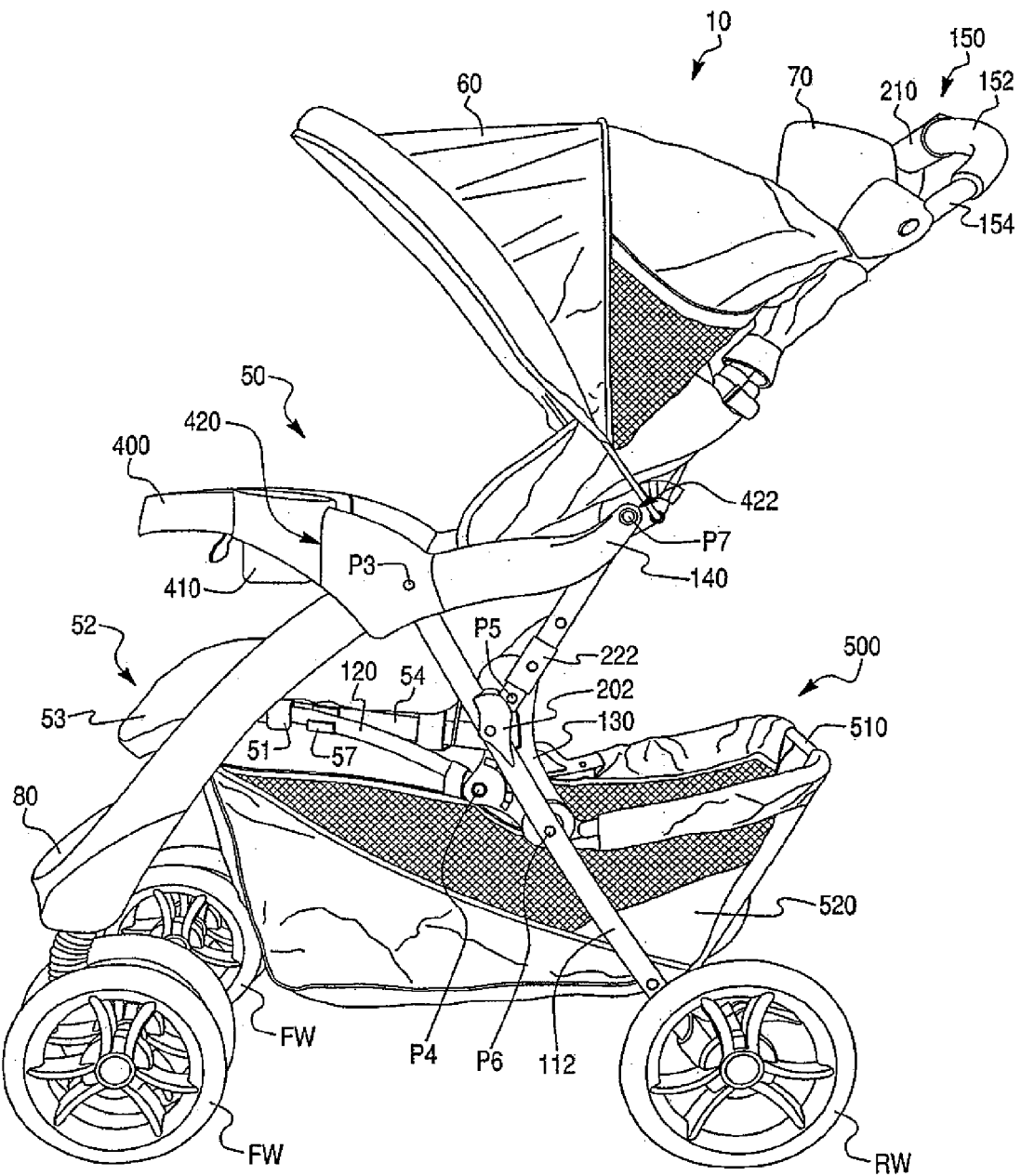
FIG. 2 is a side elevation view of the stroller shown in FIG. 1.

The seat support 54 also has at least one bracket per side edge, and, in the illustrated embodiment, a pair of brackets 51, 57 per side edge, as shown in FIG. 2. One of the brackets 51 curls over the respective seat support frame member 120, and the other of the brackets 57 curls under the respective seat support frame member 120. The brackets 51, 57 are configured to loosely grip the respective seat support frame members 120 so that, as the stroller 10 is moved between its in-use configuration and its folded configuration, the seat support 54 can translate (that is, rotate and/or slide) relative to the seat support frame members 120, as will be described below, with the brackets 51, 57 guiding the movement of the seat support 54 along the seat support frame members 120. Since the seat back frame member 56 is pivotally connected to the extensions 58, the seat back frame member 56 can fold with the seat support 54.

The arm supports 140 of the stroller frame 100, which are positioned on either side of the seat assembly 50, are arranged relative to the front and rear legs 110, 112 so that the front and rear legs 110, 112 can pivot relative to the arm supports 14. The arm supports 140 also are pivotally connected to the respective push arms 154 at pivot P7. The arm supports 140 can be formed of molded plastic. In addition, the arm supports 140 can be generally U-shaped in cross section to have an inner segment 142 (see FIG. 6) and an outer segment 144 (see FIG. 6) connected by a smoothly contoured upper section 146 (see FIG. 4).

In order to initiate folding of the stroller 10 from the in-use configuration to the folded configuration, the stroller 10 also includes a fold actuator assembly. As seen in FIGS. 3, 8, and 9, the fold actuator assembly generally can include a handle actuator 210 movably mounted to the handle bar 152, left and right locks 220 slidably mounted to the push arms 154, spring-biased plungers 230 coupled to the locks 220, braces 202 on the rear legs 112 that engage the plungers 230, and cables 240 that extend from the handle actuator 210 to the spring-biased plungers 230. The left and right locks 220 can engage the respective fold links 130 to lock the stroller 10 in the in-use configuration. Upon actuation of the handle actuator 210, the left and right locks 220 can disengage from the respective fold links 130 to permit the stroller frame 10 to move to the folded configuration, as will be described below.

Many types of handle actuators could be employed in the fold actuator assembly of stroller 10. For example, the handle actuator 210 could be a push-button-type actuator or a slide-type actuator, such as those that are shown and described in U.S. patent application Ser. No. 10/999,148, which is incorporated herein by reference in its entirety. The handle actuator alternatively could comprise a twisting or rotating actuator, such as the one described in U.S. Pat. No. 6,068,284, which is also incorporated herein by reference in its entirety.

The left and right locks 220 can comprise collars 222 that are slidably mounted to the push arms 154. Each of the locks 220 also can comprise a protuberance 224 extending from the respective collar 220. The protuberances 224 can engage a first notch 132 (see FIGS. 8A, 8B) in the fold link 130 when the stroller is in the in-use configuration and a second notch 134 (see FIG. 12B) in the fold link 130 when the stroller is in the folded configuration.

The collars 222 are fixed to the spring-biased plungers 230, which are housed within the push arms 124. In this regard, pins 126 can extend through the plungers 230, the push arms 124, and the collars 222. The pins 226 are configured to slide in the axial direction of the push arms 154 within slots (obscured by the collars 222) formed in the push arms 154. As a result of this engagement between the plungers 230 and the collars 220, when the plungers 230 slide within the push arms 154, the collars 220 slide along the outside of the push arms 154 in the same direction as the plungers 230.

Cables 240 couple the handle actuator 210 to the plungers 230, as shown in FIGS. 8 and 9. The proximal ends of the cables 240 attach to the handle actuator 210. The distal ends of the cables 240 (i.e., the ends farthest from the handle actuator 210) attach to the respective plungers 230. Referring to FIGS. 8 and 9, a spring 244 is located in an intermediate section of the plunger 230, one end of the spring 244 mounted to the plunger 230 and the other end of the spring 244 mounted to a rivet 242 (see FIG. 7) passing through and fixedly secured to the respective push arm 154. The location of the rivet 242 is generally indicated in FIGS. 8 and 9.

The springs 244 bias the plungers 230 into engagement with the braces 202 on the rear legs 112 to lock the push arms 154 in place relative to the rear legs 112. The springs 244 also bias the collars 222 of locks 220, which are coupled to the plungers 230, away from the fold actuator 210, and into engagement with the notches 132, 134 of the fold links 130.

Figure 10:
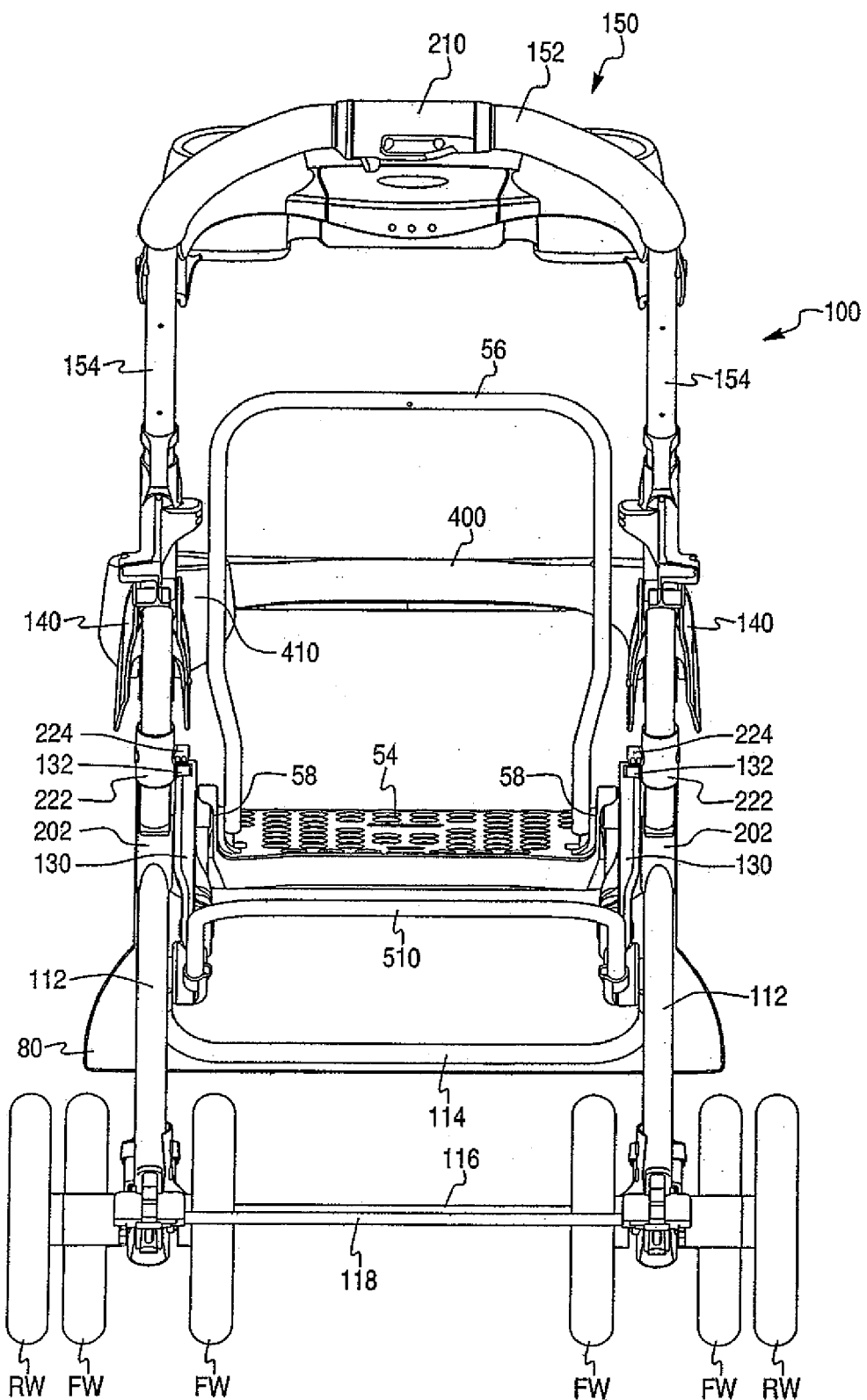
FIG. 10 is a detail, rear elevation view of the stroller shown in FIG. 4, illustrating the fold actuator assembly in an actuated state.

FIGS. 8 and 8A show the fold actuator assembly on one side of the stroller 10 in an un-actuated state, and FIGS. 9 and 9A show the fold actuator assembly in an actuated state. In FIGS. 8 and 8A, the plunger 230 is engaged with the brace 202, and the protuberance 224 is engaged in first notch 132 of the fold link 130. When the handle actuator 210 is actuated, the cables 240 pull the plungers 230 toward the fold actuator 210, against the bias of the spring 244, and out of engagement with braces 202. FIG. 9 shows the spring 244 in a compressed state. The collars 222 follow the movement of the plungers 230, and protuberances 224 are drawn out of first notches 132, as shown in FIG. 8B. FIG. 10 provides a rear view of the stroller 10 with the fold actuator assembly in an actuated state. When the fold actuator assembly is in an actuated state, the handle bar assembly 150 can be moved relative to the rear legs 112 and the fold links 130 to commence the stroller fold sequence.

Figure 11A:
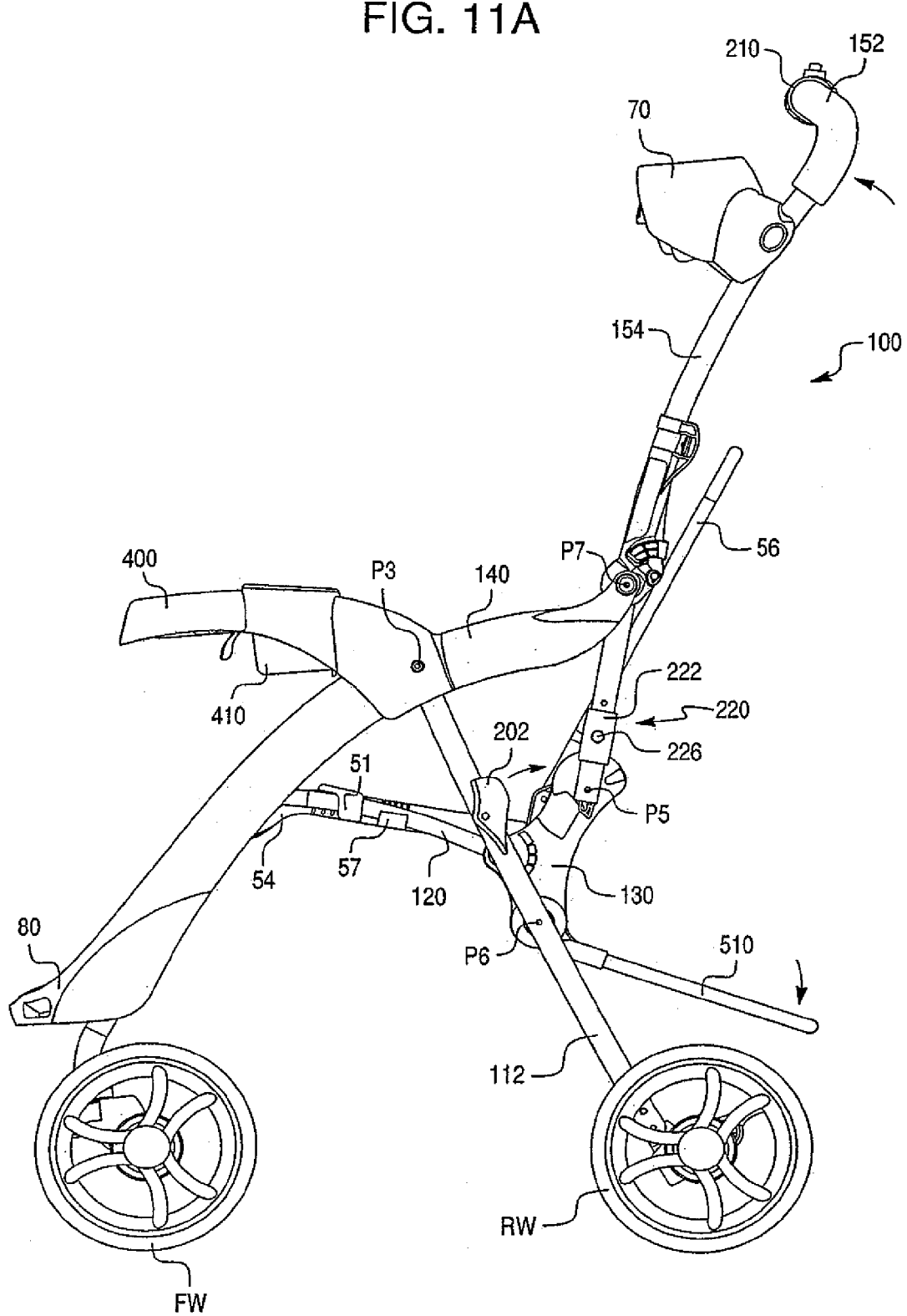
FIG. 11A is a side elevation view of the stroller shown in FIG. 4, in which the stroller is in an initial fold stage with the handlebar assembly pivoted substantially upright.
Figure 11B:
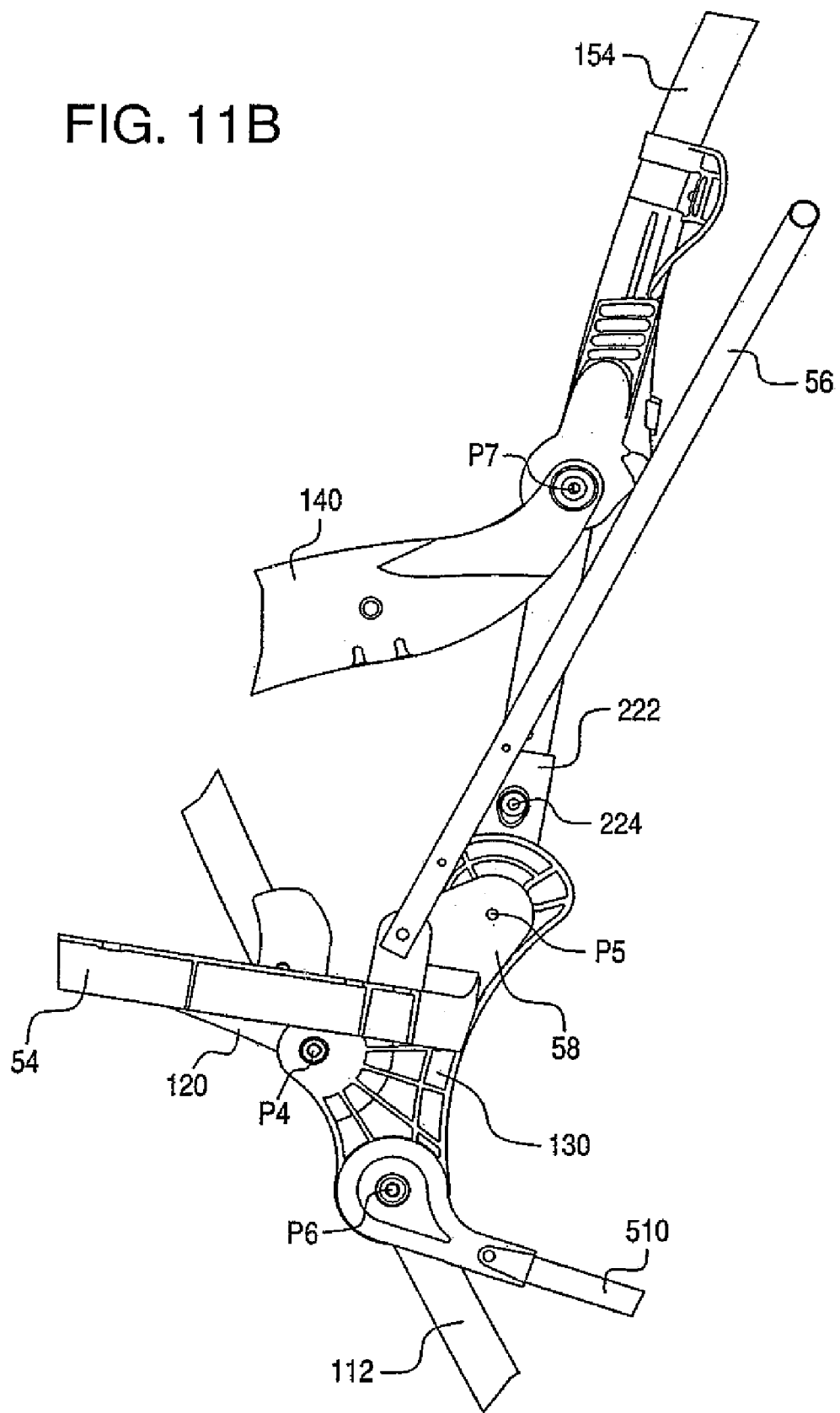
FIG. 11B is a side elevation view of the fold link and surrounding stroller components of the stroller of FIG. 11A, taken from an inboard side of the fold link.
Figure 11C:
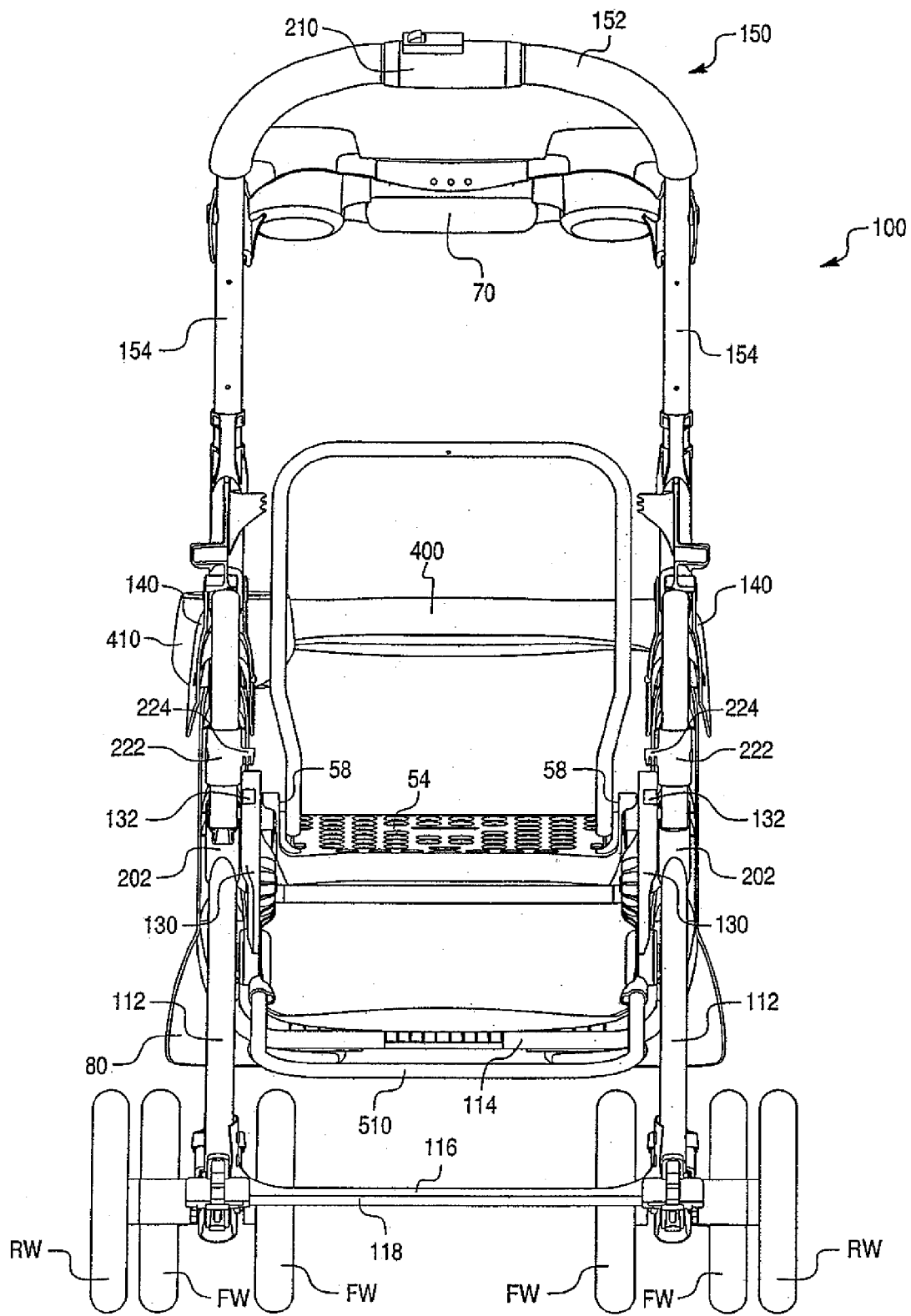
FIG. 11C is a rear elevation view of the stroller shown in FIG. 11A.

Folding of the stroller 10 will now be described with reference to FIGS. 11A-11C, 12A-12C, and 13A-13C. FIGS. 11A-11C illustrate the stroller 10 in an initial stage of folding. Arrows have been added to show the direction of movement of the handle bar assembly 150, the fold link 130, and the basket frame 510 from the in-use configuration. As can be seen by comparing FIG. 5 and FIG. 11A, the handle bar assembly, including handle bar 152 and push arms 154, has been rotated forward (counterclockwise) to a substantially upright position. As the handle bar assembly 150 rotates forward, the protuberances 224 of the right and left locks 220 can ride over surfaces 138 of the fold links 130 (see FIG. 9A), and fold links 130 rotate rearward (clockwise). As the fold links 130 rotate, the basket frame 510, which is connected to the fold links 130 at respective pivots P6, begins to drop toward rear wheels RW (clockwise). Rotation of the fold links 130 draws the seat support frame members 120 (connected to the fold links at pivots P4) and the seat support 54 (connected to the fold links 130 at pivots P5) rearward. As the seat support frame members 120 and the seat support 54 move rearward, the seat support 54 can translate relative to the seat support frame members 120. In this regard, brackets 51, 57 can slide rearward along the seat support frame members 120. This initial fold stage is smooth due to the minimal movement of the front and rear legs 110, 112 relative to each other.

Figure 12A:
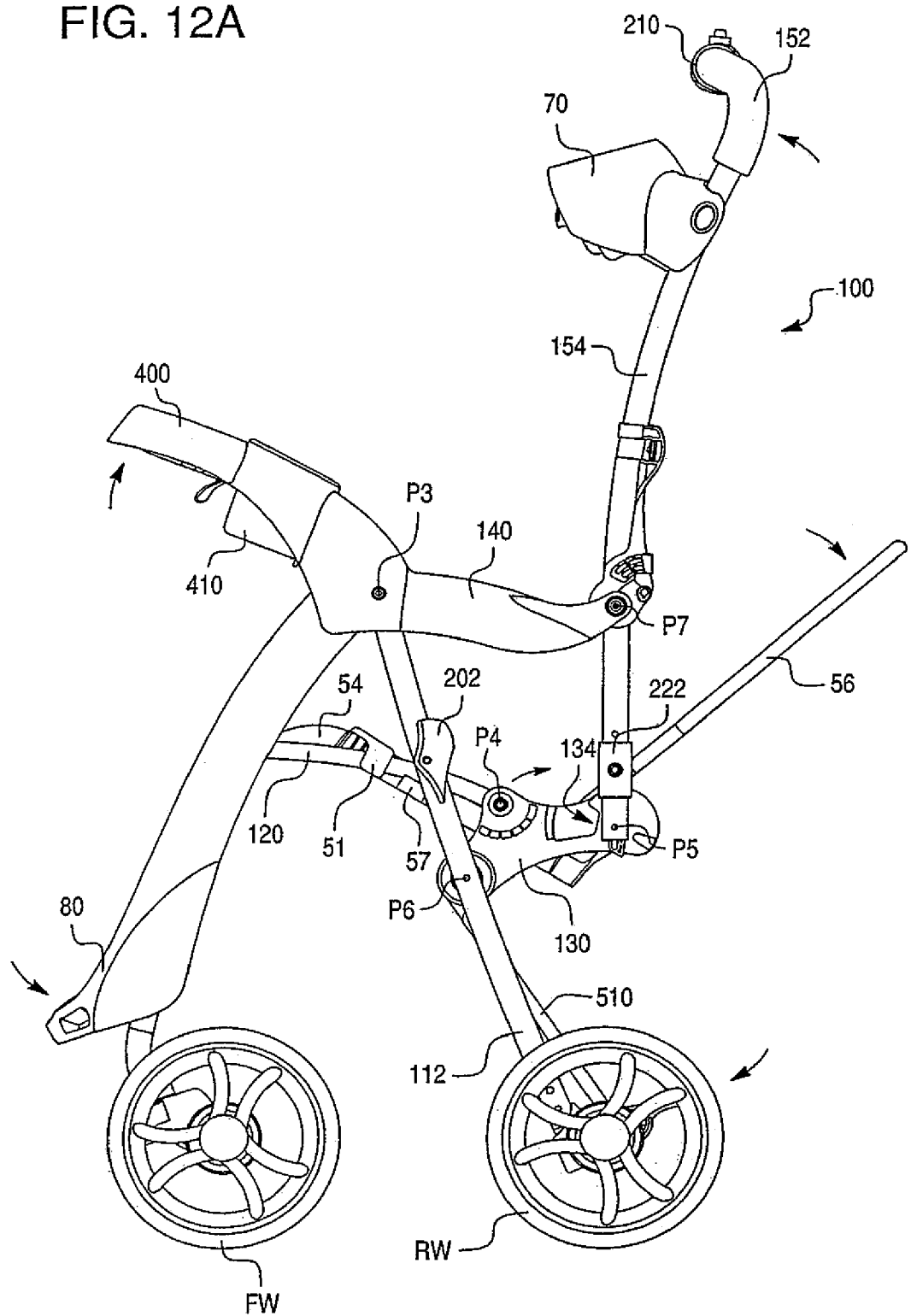
FIG. 12A is a side elevation view of the stroller shown in FIG. 4, in which the stroller is partially collapsed.
Figure 12B:
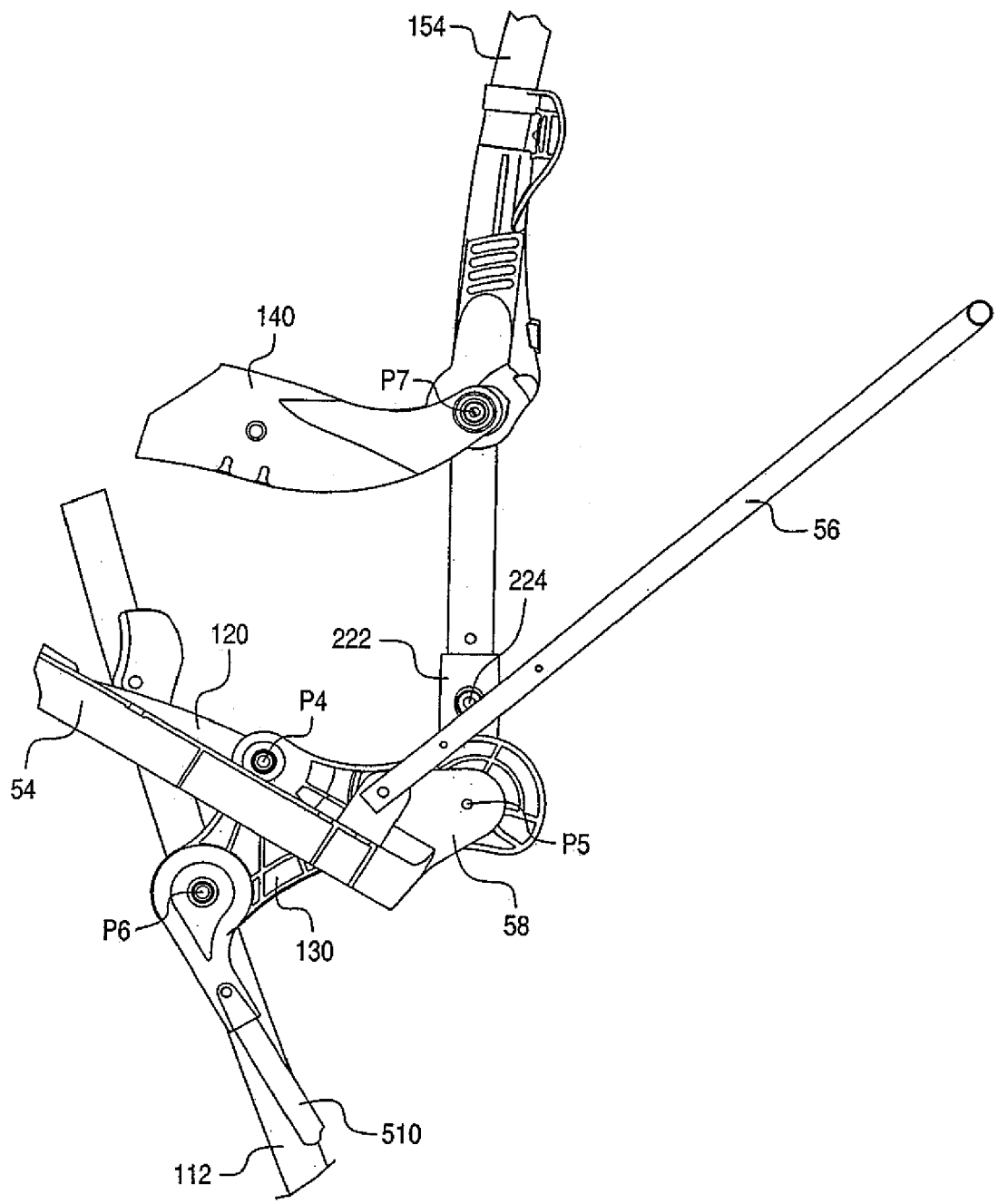
FIG. 12B is a side elevation view of the fold link and surrounding stroller components of the stroller of FIG. 12A, taken from an inboard side of the fold link.
Figure 12C:
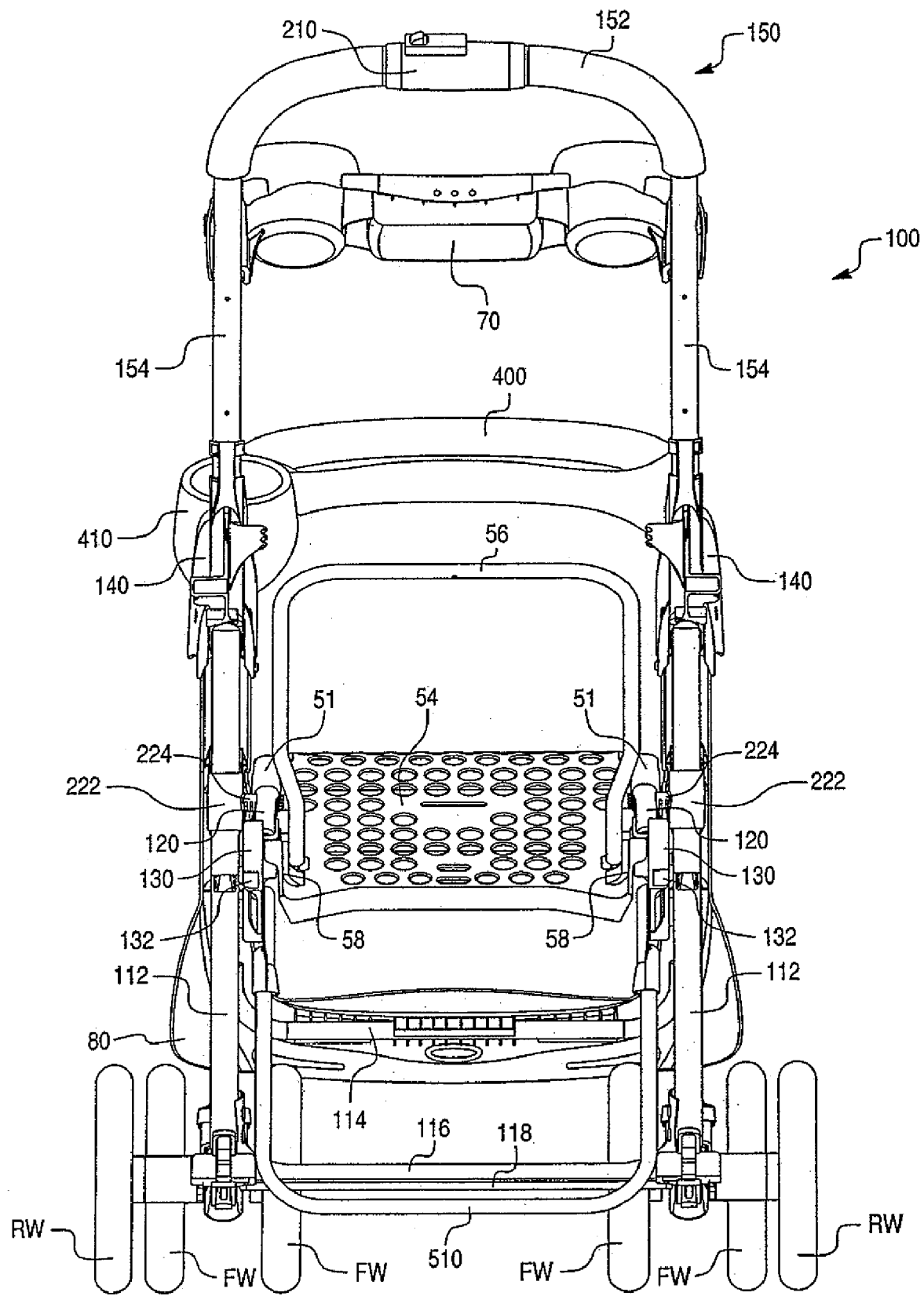
FIG. 12C is a rear elevation view of the stroller shown in FIG. 12A.

FIGS. 12A-12C illustrate the stroller 10 in a partially collapsed stage of folding. Arrows have been added to show the direction of movement of the handle bar assembly 150, the fold link 130, the seat back frame member 56, the child tray 400, the footrest 80/front legs 110, and the rear legs 112 from the initial fold stage. In this partially collapsed stage, the push arms 154 of the handle bar assembly 150 have been further rotated forward (counterclockwise), which further rotates the fold links 130 (clockwise). Rotation of the fold links 130 draws the seat support frame members 120 and the seat support 54 further rearward. The seat support 54 continues to translate relative to the seat support frame members 120. In this regard, the seat support 54 slides rearward along the seat support frame members 120 and also rotates relative to the seat support frame members 120 such that the front end of the seat support 54 is higher than shown in FIGS. 11A-11C and the rear end is lower. As seen in FIG. 12A, brackets 51, 57 partially lift off of the seat support frame members 120 during the rotation of the seat support 54 relative to the seat support frame members 120. In addition, the basket frame 510 rotates with the fold links 130 until the basket frame 510 comes into contact with the rear axle 218. The fold links 130 then can continue to rotate relative to the basket frame 510, which remains braced against the rear axle 118.

Translation of the seat support 54 relative to the seat support frame members 120 is possible in part due to the connection of the seat support 54 and the seat support frame members 120 to the fold links 130 at two different pivots P5 and P4, respectively. These pivots P4, P5 change relative orientation during the folding sequence. When the stroller is in the in-use configuration, as shown in FIG. 5, pivot P5 to which the seat support 54 and the push arms 154 are connected, is farther from the rear wheels RW than pivot P4, to which the seat support frame members 120 are connected. When the stroller is in the partially collapsed stage of folding, as shown in FIG. 12A, pivot P5 is closer to the rear wheels RW than pivot P4. Consequently, as the stroller 10 folds, the seat support 54 is drawn rearward and rotated into closer alignment with the rear legs 112 than the seat support frame members 120. As the stroller 10 is collapsed, the front and rear legs 110, 112 are drawn more closely together.

FIGS. 13A-13C show the stroller 10 in its-fully collapsed, folded configuration. As can be seen in FIG. 13A, when the stroller 10 is folded, the stroller 10 can stand upright on its wheels FW, RW. The push arms 154 of the stroller 10 have been pushed downward, toward the rear wheels RW and the ground surface on which the stroller 10 rests. As a consequence of the downward motion of the push arms 154, the fold links 130 further rotate (clockwise), which moves the seat support 54, the seat back frame member 56 attached to the seat support 54, and the seat support frame members 120 further rearward and downward. The seat support 54 in the illustrated embodiment thus can nest between the front legs 110 and the push arms 154 of the stroller 10. The fold links 130 also further rotate relative to the basket frame 510, which remains braced against the rear axle 118. In addition, FIG. 13A shows pivots P5, to which the seat support 54 and the push arms 154 are connected, in a position closer to the rear wheels RW than pivots P4, to which the seat support frame members 120 are connected. Because the push arms 154 are connected to the fold links 130 at different pivots than the seat support frame members 120, the push arms 154 can be pushed downward closer to the ground surface, providing for a more compact fold than available in conventional strollers of similar in-use size.

Figure 23A:
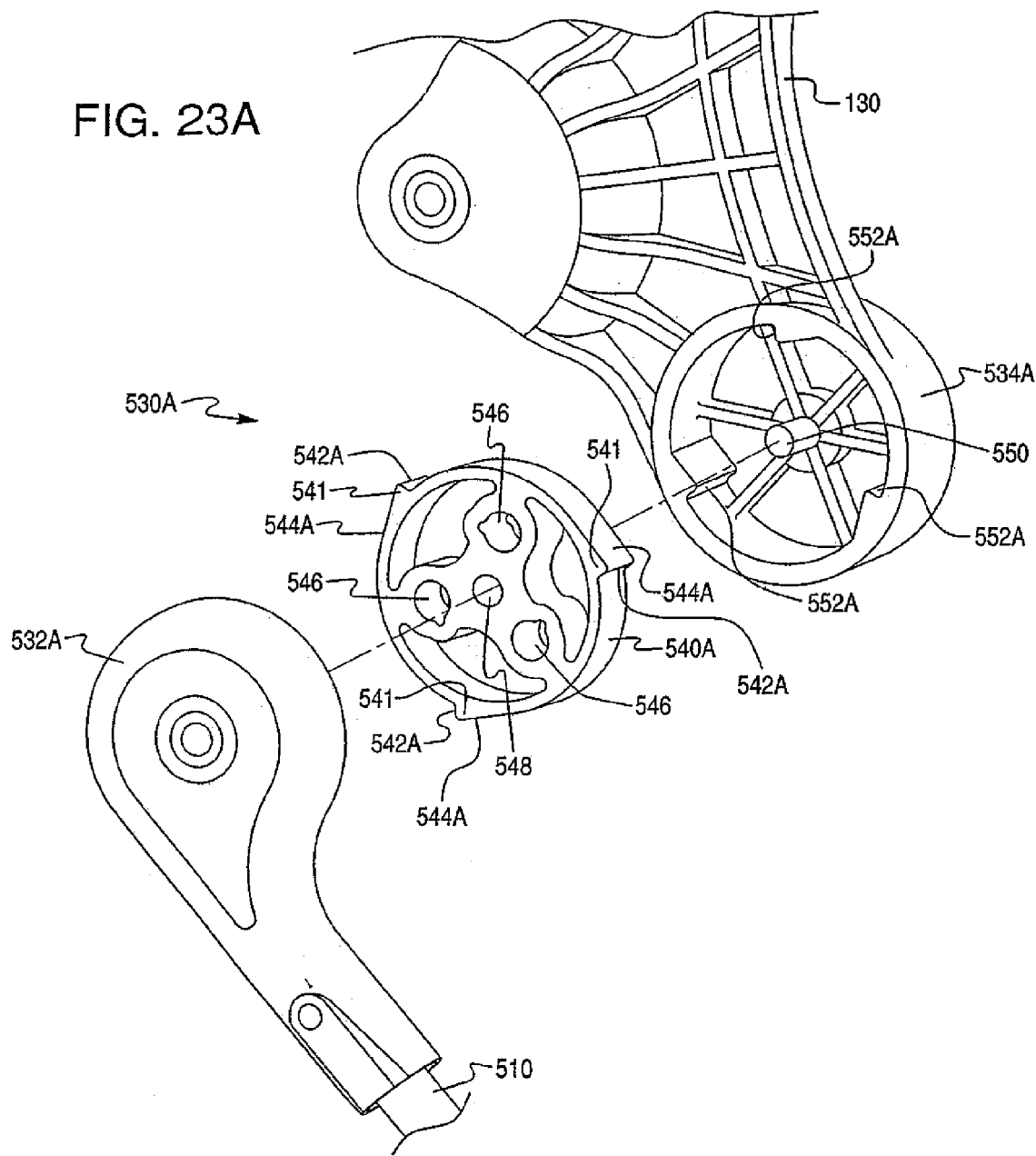
FIG. 23A is an exploded, perspective view of a first embodiment of a latch assembly by which the basket assembly may be connected to the stroller.

When the stroller 10 reaches the fully folded configuration, the protuberances 224 on the fold locks 220 engage the second notches 134 in the fold links 130, as shown in FIG. 13C. Accordingly, to open the stroller 10 from its folded configuration to its in-use configuration, the fold actuator 152 must be actuated to retract the protuberances 224 out of second notches 134. The handle bar assembly 150 then may be lifted vertically to rotate the fold links 130 (counterclockwise), thereby forcing the frame components of the stroller 10 to their in-use orientation. During movement of the stroller frame 100 to the in-use configuration, the basket frame 510 can reorient to its in-use position, as shown in FIG. 5. In one embodiment, for example, the basket frame 510 can be coupled to the fold links 130 by a latch assembly 530A at each side of the basket frame 510, as shown in FIG. 23A, and the structure of the latch assembly 530A enables the basket frame 510 to follow the fold links 130 as they rotate (counterclockwise) to open the stroller frame 100 to its in-use configuration.

It will be understood that fold links 130 can be employed on strollers having stroller frame configurations different from the illustrated embodiment. For example, the fold links 130 can be employed on a stroller having a pair of spaced push arms, with no branching handlebar 152; in such a stroller, each push arm can include a fold actuator assembly to initiate folding of the stroller. The fold links 130 can function on such alternative stroller frames to permit the seat support of the stroller to translate relative to associated seat support frame members of the stroller frame. The fold links 130 also can function on alternative stroller frames to provide three pivot locations for attachment of the seat support frame members, the push arms, and the rear legs of the stroller frame, so that the stroller can fold to a very compact size relative to its in-use size.

In addition, the fold links can be configured so that, instead of including pivots P4, P5, and P6, the fold links allow sliding movement of the seat support frame members, the push arms, and the rear legs of the stroller frame relative to the fold links during folding of the stroller. For example, the fold links can include curved or camming slots along which pins through the seat support frame members, the push arms, and the rear legs of the stroller frame can travel.

Figure 27:
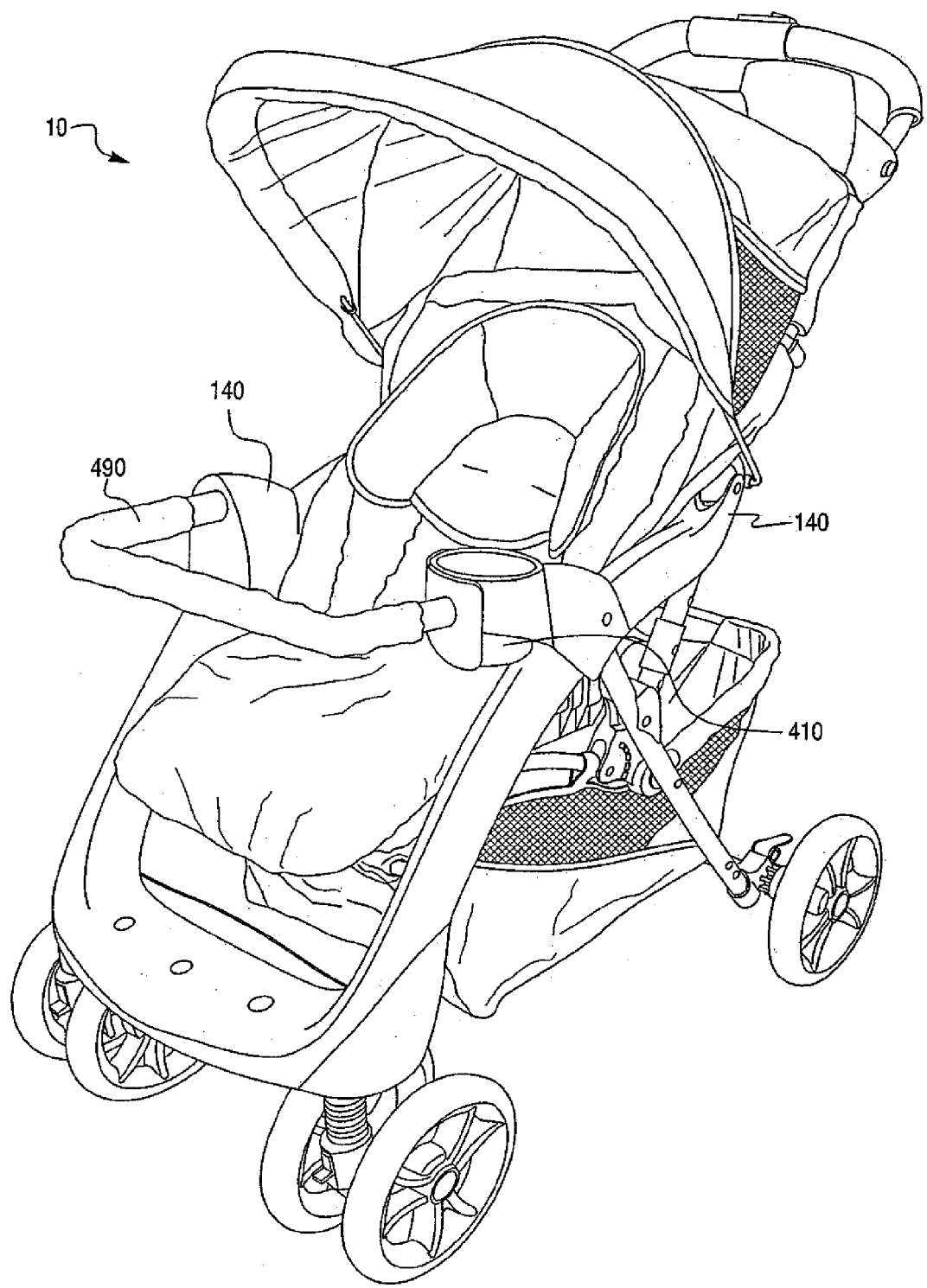
FIG. 27 is a front perspective view of a stroller according to another embodiment of the invention.

Another aspect of the invention relates to the arrangement of a child barrier, such as child tray 400, and a child's cup holder, such as cup holder 410, of stroller 10. The child barrier can be a child tray-type barrier or an arm bar-type barrier, such as arm bar 490 as shown in FIG. 27. The child barrier can be coupled to the stroller frame 100 forward of a seat bight SB of the child seat 52. It also is contemplated that the child barrier and cup holder of this invention can be coupled or mounted to many different types of strollers, including single and double strollers, and strollers with differently shaped frames or arm supports.

FIGS. 14A and 15-16B illustrate the stroller 10 including child tray 400 and cup holder 410 according to an embodiment of the invention. As mentioned above, the stroller 10 includes child tray 400, and the stroller frame 100 includes first and second arm supports 140, a child seat 52 positioned between the first and second arm supports 140, and a cup holder 410.

Figure 14A:
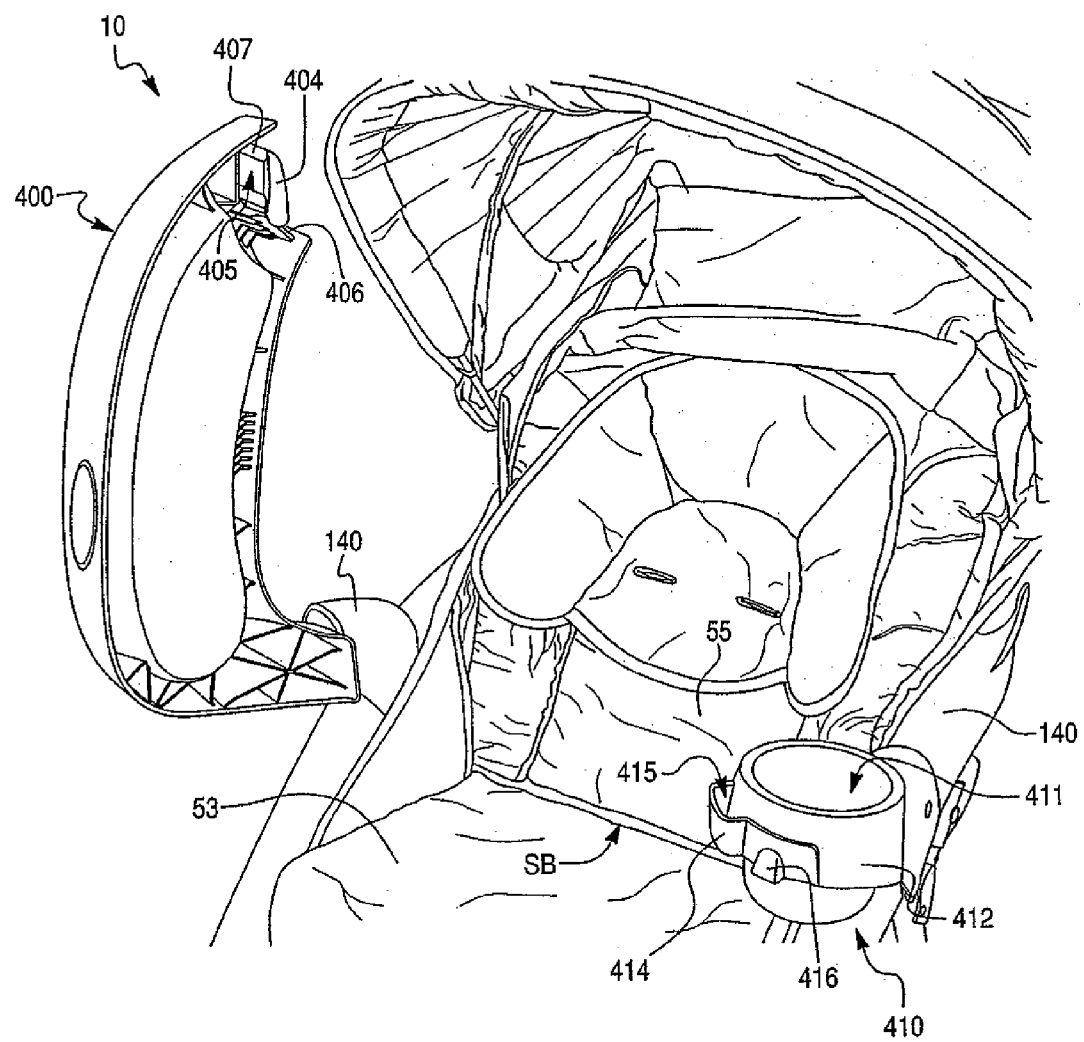
FIG. 14A is a front, perspective view of an embodiment of a child tray of the stroller shown in FIG. 1 in accordance with the invention, in which the child tray is in an open position.

The child seat 52 is positioned on the stroller frame 100 and includes the seat back 55 and the seat bottom 53. The child seat 52 also includes a seat bight. In the illustrated embodiment, in which the seat back 55 and the seat bottom 53 intersect, the seat bight is at the intersection of the seat back 55 and the seat bottom 53. As shown in FIG. 14A, the seat bight SB is the seamed intersection of the seat back 55 and the seat bottom 53. In an alternative embodiment, in which the seat back 55 and the seat bottom 53 of the child seat do not intersect, the seat bight is at the axis of rotation of the seat back 55 relative to the seat bottom 53. The seat back 55 may recline between a first, upright position and a second, fully-reclined position. In either position, the seat bight SB remains at the same location on the child seat 52, as defined above. When the stroller 10 is in the in-use configuration, the cup holder 410 is positioned forward of the seat bight SB so that the cup holder 410 is accessible by a child seated in the stroller 10. In another embodiment, the cup holder 410 also can be above the seat bight SB.

Each of the first and second arm supports 140 include a first end 420 and a second end 422, as shown in FIG. 2. The first end 420 is forward of the seat bight SB and the second end 422 is to the rear of the first end 420. The cup holder 410 can be mounted to the first arm support 140, for example, at the first end 420 of the first arm support 140. The cup holder 410 can be permanently mounted to the first arm support 140 by rivets, pins, bolts, and any other suitable conventional fasteners or by connecting the cup holder 410 and the first arm support 140 together in a snap fit, friction fit, or other suitable structural engagement. The cup holder 410 also can be mounted to the first arm support 140 by integrally forming the cup holder 410 and the first arm support 140 from one piece of material.

The cup holder 410 includes a sidewall 412 with a cavity 411. The cavity 411 provides a large capacity, deep, stable receptacle for child items. The cup holder 410 also includes a guide socket 414 and a latch 416. The guide socket 414 is formed on the exterior surface of the sidewall 412 of the cup holder 410 and juts out and forms an aperture 415 for receiving a guide pin 406 on the child tray 400. The latch 416 can be adjacent the aperture 415 and is configured to releasably connect with the child tray 400. The guide socket 414 and latch 416 can be molded integrally into the cup holder 410 or formed and attached by any other suitable mechanism.

The child tray 400, on a first end, includes a latch plate 407, a release tab 404 connected to the latch plate 407, and a guide pin 406. The latch plate 407 and the guide pin 406 are configured to releasably couple with the cup holder 410. The latch plate 407 can include two spaced legs and a lower section extending between the legs to define a slot 405 for receiving the latch 416 of the cup holder 410. The release tab 404 can be attached to or integrally formed with the lower section of the latch plate 407. The guide pin 406, which can be adjacent the latch plate 407, can be provided by a downward extending projection that slidably fits into the aperture 415 of guide socket 414. When the child tray 400 moves to a closed, in-use position shown in FIG. 16B, the guide pin 406 is inserted into the aperture 415, and the latch plate 407 snaps over the latch 416 so that the latch 416 fits into the slot 405. The guide socket 414 and guide pin 406 are configured to help align the child tray 400 and cup holder 410 for connecting the latch 416 and latch plate 407. In order to uncouple the child tray 400 and the cup holder 410, a caregiver can pull the release tab 404 away from the cup holder 410, which releases the latch plate 407 from the latch 416, and unlocks or unlatches the child tray 400 from the cup holder 410. The child tray 400 can then be moved to the open, access position, in FIG. 14A.

The child tray 400 is movably coupled to the stroller frame 100 such that the cup holder 410 remains stationary relative to the stroller frame 100 while the child tray 400 moves relative to the stroller frame 100. Accordingly, no spilling of a cup, juice box or other item in the cup holder 410 occurs when the child tray 400 moves.

To enable movement of the child tray 400 between the open, access position and the closed, in-use position, the child tray 400 is movably coupled to the second arm support 140. For example, the child tray 400 can be pivotally coupled to the second arm support 140. In the embodiment of FIGS. 14A-16B, the child tray 400 pivots about a generally horizontal axis. The child tray 400, as shown in FIG. 15, can include a boss 408 on the second end of the child tray 400. The boss 408 is configured to movably couple the child tray 400 to the second arm support 140 of the stroller frame 100. The boss 408 includes a flange portion 409 at a distal end of the boss 408. The boss 408 can be inserted into an aperture 424 on an end face 423 of the second arm support 140. The flange portion 409 is larger than the aperture 424 such that, after the boss 408 is inserted into the aperture 424, the flange 409 prevents the boss 408, and hence the child tray 400, from being removed from the second arm support 140.

Figure 14B:
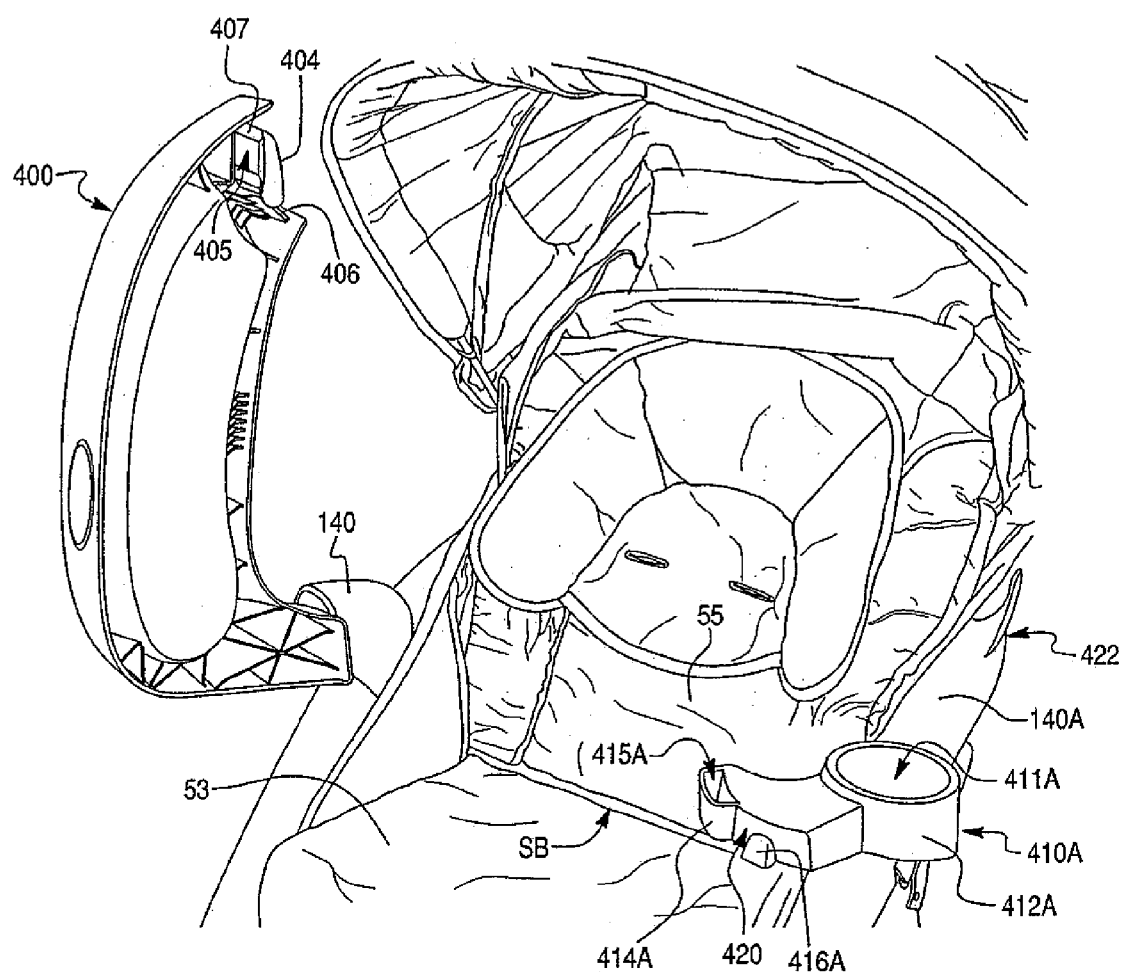
FIG. 14B is a front, perspective view of the child tray according to another embodiment, in which the child tray is in an open position.
Figure 15:
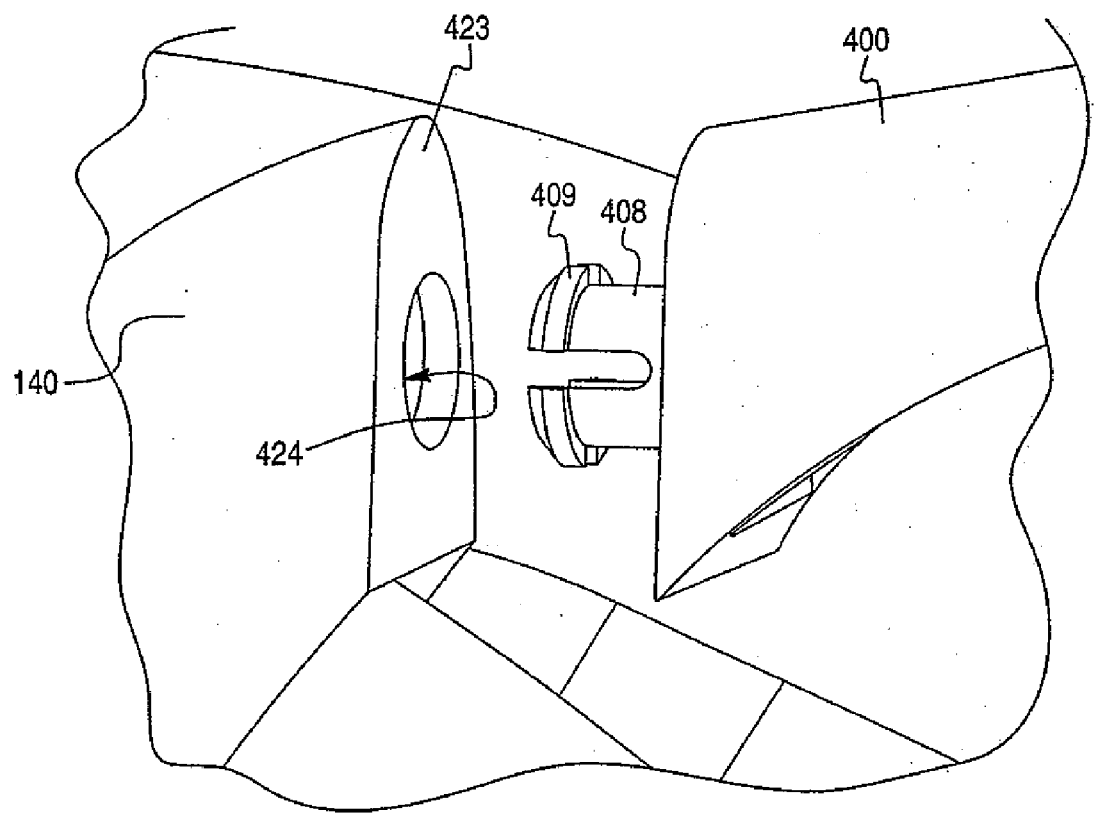
FIG. 15 is a detail perspective view of an attachment end of the child tray shown in FIG. 14A, in which the child tray is separate from the stroller.
Figure 16A:
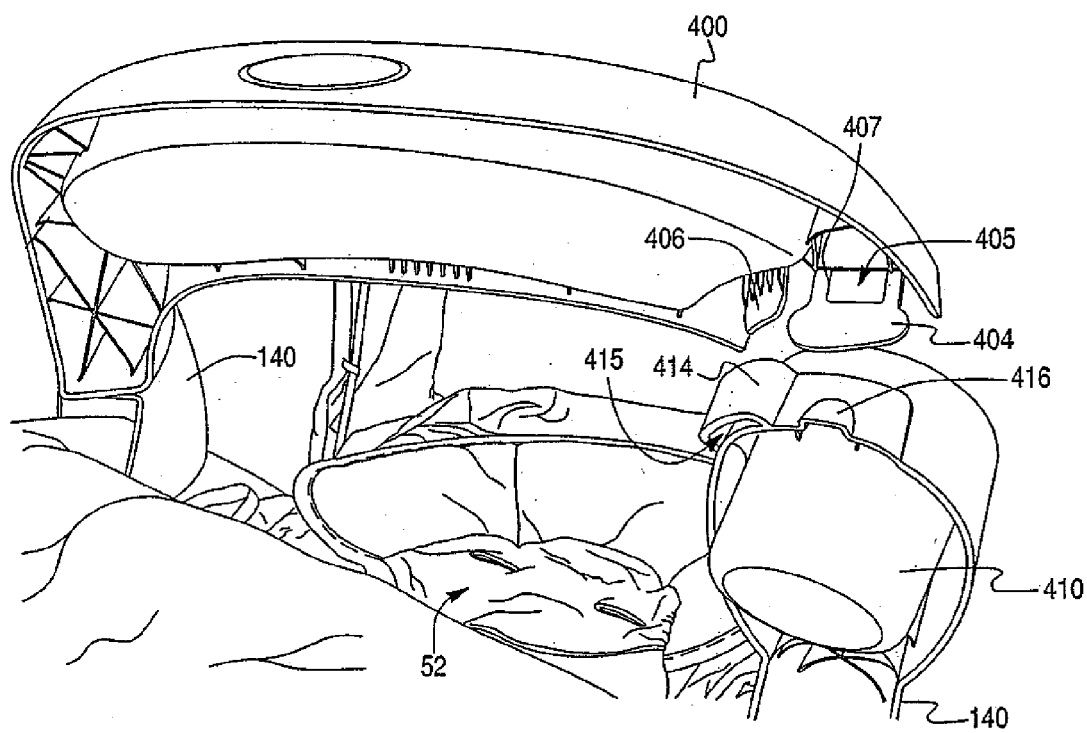
FIG. 16A is a bottom, perspective view of the child tray according to the embodiment shown in FIG. 14A, in which the child tray is in the open position.
Figure 16B:
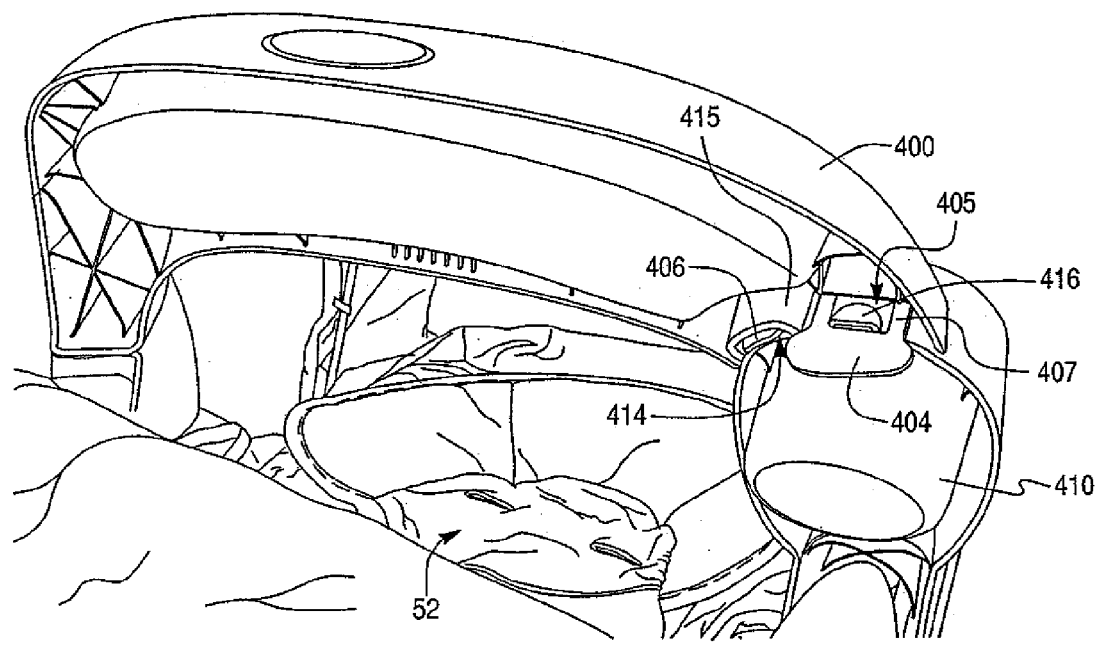
FIG. 16B is a bottom, perspective view of the child tray shown in FIG. 16A, in a closed, in-use position.

FIG. 14B illustrates a stroller 10 with a child tray 400 and a cup holder 410A according to another embodiment of the invention.

The cup holder 410A is mounted to the first arm support 140A between the first end 420 and the second end 422 of the arm support 140A. The cup holder 410A is positioned forward of the seat bight SB. In another embodiment, the cup holder 410A also can be positioned above the seat bight SB. The cup holder 410A can be mounted to the first arm support 140A by rivets, bolts, and any other suitable conventional fasteners, or by connecting the cup holder 410A and the first arm support 140A together in a snap fit, friction fit, or other suitable structural engagement. The cup holder 410A can also be mounted to the first arm support 140A by integrally forming the cup holder 410A and the first arm support 140A from one piece of material.

The cup holder 410A includes a sidewall 412A with a cavity 411A. The first end 420 of the first arm support 140A includes a guide socket 414A with an aperture 415A, and a latch 416A. The guide socket 414A and latch 416A are the same as that described above and shown in FIG. 14A.

The child tray 400 can be identical to the child tray 400 in the embodiment described above and shown in FIG. 14A. The child tray 400 is releasably coupled to the first arm support 140A and movably coupled to the second arm support 140. The child tray 400 includes a latch plate 407, a release tab 404 and a guide pin 406, which are configured to releasably couple with the first arm support 140A. The latch plate 407 includes a slot 405 for receiving the latch 416A of the first arm support 140A. The guide pin 406, which can be adjacent the release tab 404, can be provided by a downward extending projection that slidably fits into the aperture 415A on guide socket 414A.

FIGS. 17B-20B illustrate a stroller 10 with a cup holder 430 and child tray 440 according to another embodiment of the invention.

The cup holder 430 is mounted to the first end 420 of the first arm support 140. Like in the embodiments of FIGS. 14A-16B, the cup holder 430 is positioned forward of the seat bight SB. In another embodiment, the cup holder 430 also can be positioned above the seat bight SB.

The cup holder 430 can be mounted to the first arm support 140 by rivets, bolts, and any other suitable conventional fasteners or by connecting the cup holder 430 and the first arm support 140 together in a snap fit, friction fit, or other suitable structural engagement. The cup holder 430 also can be mounted to the first arm support 140 by integrally forming the cup holder 430 and the first arm support 140 from one piece of material. The cup holder 430 provides a main cup holder, and the child tray 440 includes an auxiliary cup holder 442 that is movably mounted to the main cup holder 430. The auxiliary cup holder 442 is positioned on a first end of the child tray 440. The cup holder 430 remains stationary relative to the stroller frame 100 while the child tray 440 moves relative to the stroller frame 100.

Figure 17A:
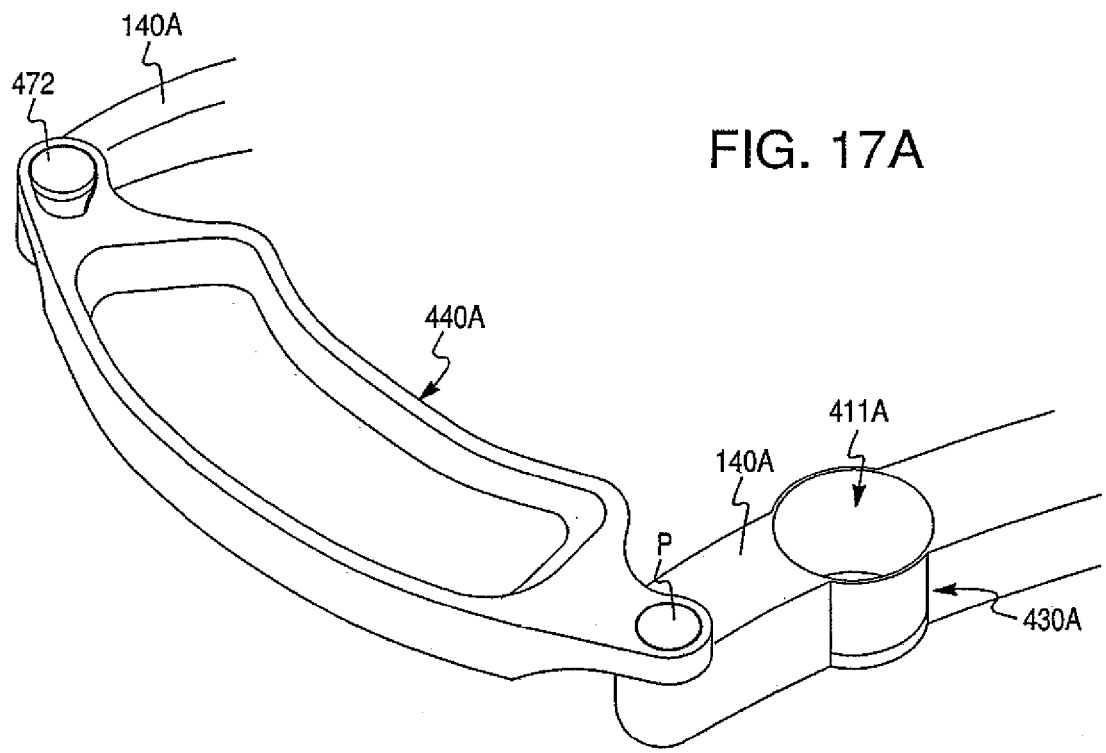
FIG. 17A is a perspective view of the child tray according to another embodiment of the invention.
Figure 17B:
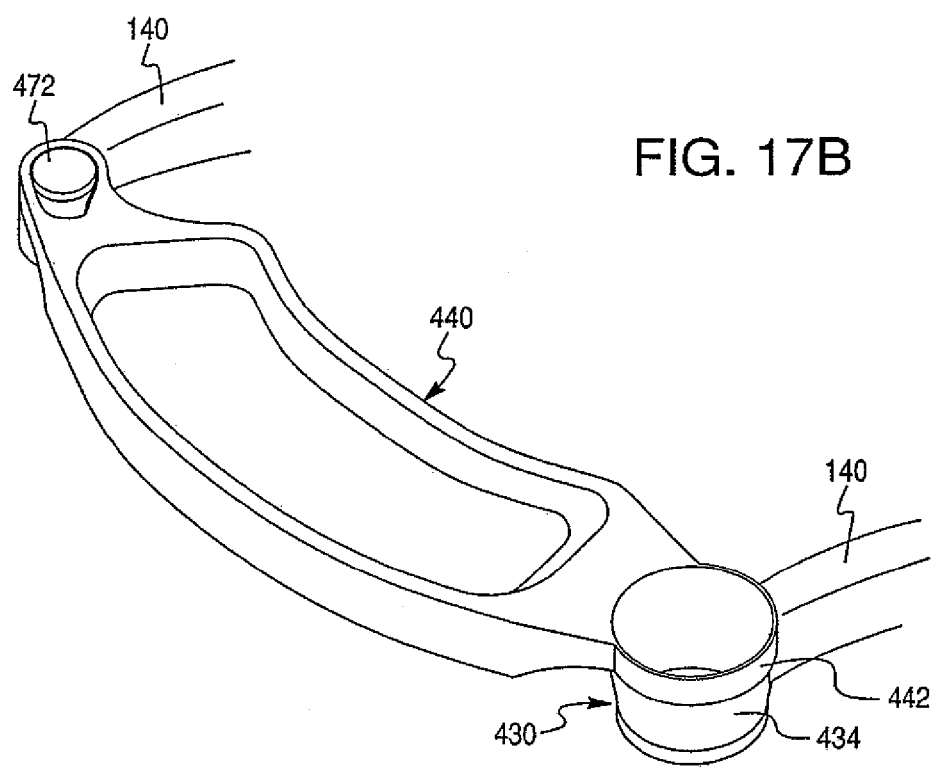
FIG. 17B is a perspective view of the child tray according to another embodiment of the invention.
Figure 18A:
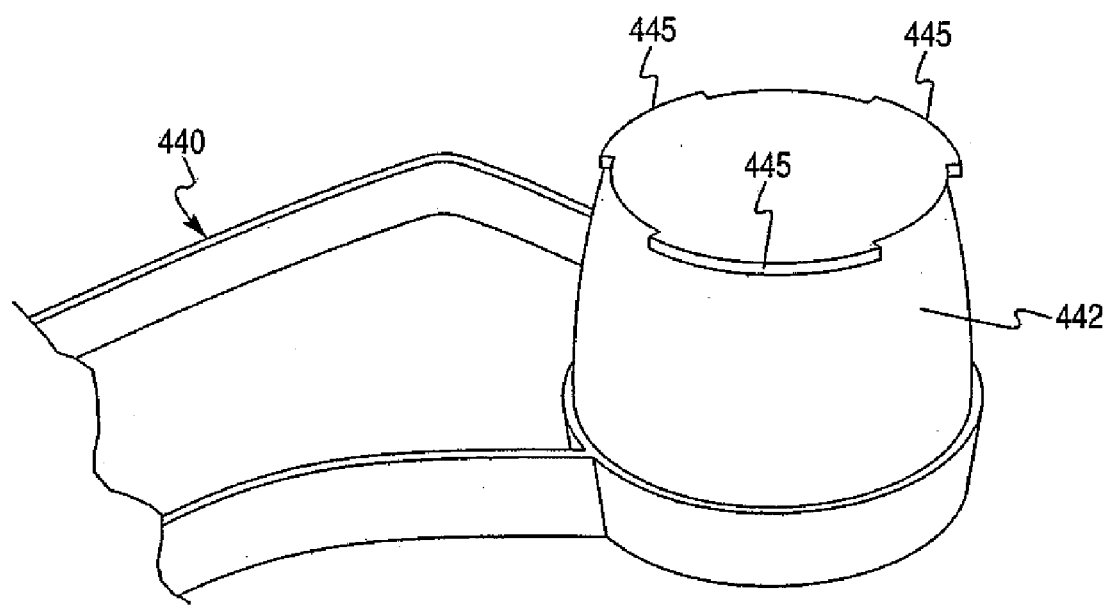
FIG. 18A is a detail view of an auxiliary cup holder according to the embodiment shown in FIG. 17A.
Figure 18B:
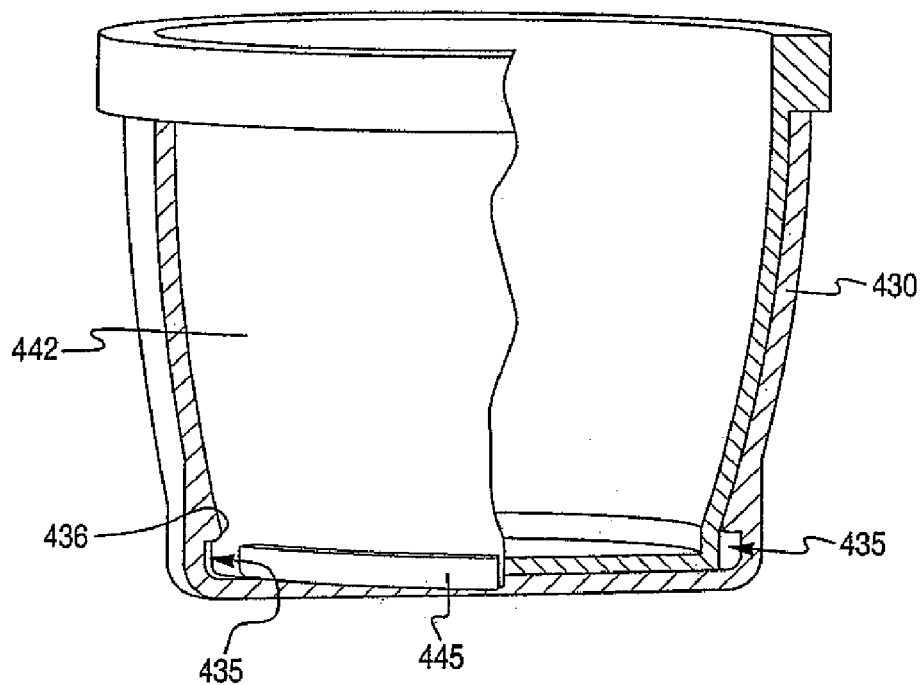
FIG. 18B is a cut away view in partial cross section, showing the auxiliary cup holder and a main cup holder according to the embodiment shown in FIG. 17A.

As shown in FIGS. 17B and 18B, the main cup holder 430 has a sidewall 434 and can include grooves 435 formed in an interior surface at side wall 434. The grooves 435 are configured to receive corresponding flanges 445 on the auxiliary cup holder 442 to mount the auxiliary cup holder 442 to the main cup holder 430. The flanges 445 extend out from a bottom surface of the auxiliary cup holder 442, as shown in FIG. 18A. In the illustrated embodiment, the main cup holder 430 includes three grooves 435, and the auxiliary cup holder 442 includes three flanges 445; more or fewer than three grooves/flanges are contemplated by this invention. The grooves 435 have a depth and height such that the flanges 445 on the auxiliary cup holder 442 can fit into the grooves 435. To position the auxiliary cup holder 442 in the main cup holder 430, the auxiliary cup holder 442 is slid into the main cup holder 430, with the flanges 445 out of alignment with the grooves 435. The auxiliary cup holder 442, and hence the flanges 445, are then rotated into alignment with the grooves 435 such that an upward force on the child tray 440 cannot dislodge the child tray 440. The attachment of the flanges 445 in the grooves 435 allow the auxiliary cup holder 442 to move within the main cup holder 430, such that the flanges 445 can slide in the grooves 435. The flanges 445 and the grooves 435 are configured such that, as the auxiliary cup holder 442 turns in the main cup holder 430, the flanges 445 can twist out of the grooves 435 and, in this alignment, the auxiliary cup holder 442 can be removed from the main cup holder 430. Hence, the child tray 440 can be removably mounted to the stroller 10.

Alternatively, the grooves 435 in the main cup holder 430 need not be configured to allow the flanges 445 to uncouple from the grooves and allow the auxiliary cup holder 442 to be removed from the main cup holder 430. In such a case, the auxiliary cup holder 442 can be mounted to the main cup holder 430 by forcing or snapping the flanges 445 past ramped surfaces 436 and into grooves 435. According to another embodiment, the main cup holder 430 may include a single, continuous annular groove, and the auxiliary cup holder 442 may include a single, continuous annular flange that can be forced or snapped into the continuous annular groove.

The child tray 440 includes first and second ends. The first end of the child tray 440 is movably coupled to the cup holder 430. The child tray 440 can move between an open, access position, in which the second end of the child tray 440 is detached and moved away from the stroller frame 100, and a closed, in-use position, in which the second end of the child tray 440 is coupled to the stroller frame 100. When the child tray 440 pivots between an open, access position and a closed, in-use position, the child tray 440 pivots about a generally vertical axis. When the child tray 440 pivots, the auxiliary cup holder 442 can pivot about its central longitudinal axis. Whereas the child tray 440 changes location relative to the stroller frame 100 when pivoted, the auxiliary cup holder 442 rotates on its own axis, and the axis does not change location relative to the stroller frame 100. Child items contained in the auxiliary cup holder 442, which undergo less displacement relative to the stroller frame 100 than the child tray 440, will not spill out of the auxiliary cup holder 442.

Figure 19:
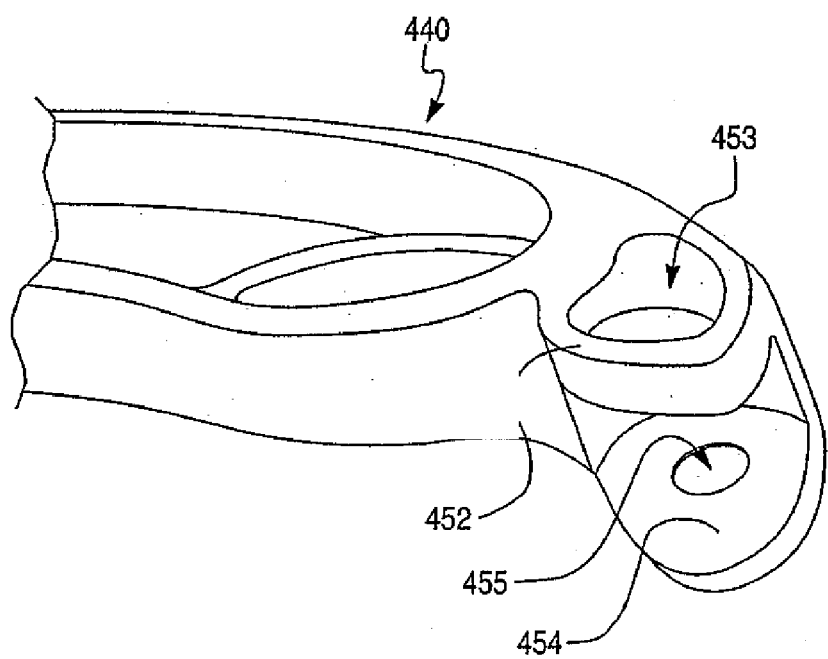
FIG. 19 is a detail perspective view of an attachment end of the child tray of the embodiment shown in FIG. 17A, in which the child tray is separated from the stroller frame.

The child tray 440 father includes a latching mechanism on the second end of the child tray 440. The second end of the child tray 440 is releasably coupled to the second arm support 140. The latching mechanism on the child tray 440 includes a first plate 452 and a second plate 454, as shown in FIG. 19. The first plate 452 can be positioned above and generally parallel with the second plate 454, and each plate 452, 454 can be generally perpendicular to the pivot axis of the child tray 440 (here, the central longitudinal axis of the auxiliary cup holder 442). The first plate 452 includes an opening 453 and the second plate 454 includes an opening 455.

Figure 20A:
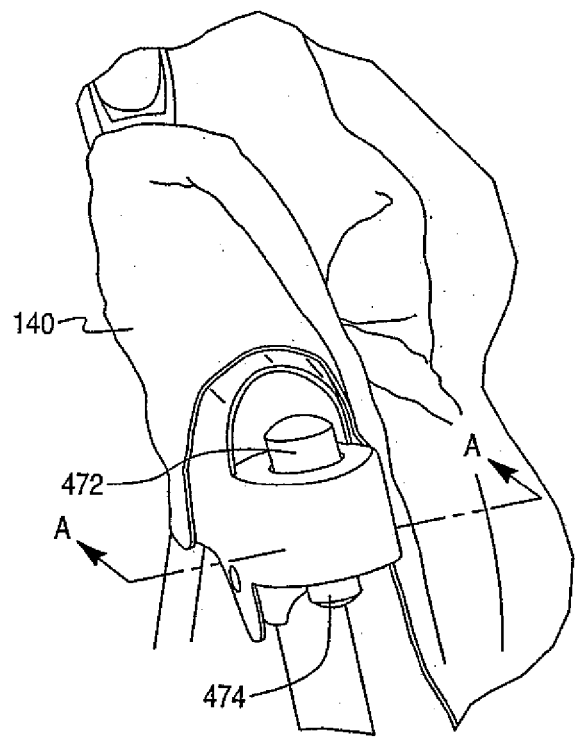
FIG. 20A is a front perspective view of a latching mechanism of the embodiment shown in FIG. 17A.
Figure 20B:
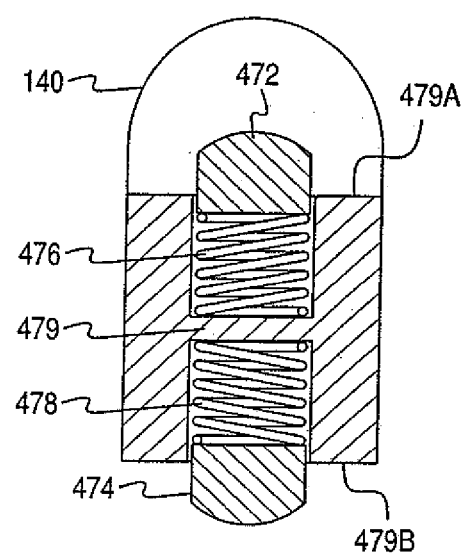
FIG. 20B is a cut away view of the latching mechanism taken along line A-A of FIG. 20A.

The second arm support 140, as shown in FIGS. 20A and 20B, includes first and second buttons 472, 474. The first button 472 extends up and out of the upper surface of the second arm support 140, while the second button extends below and out of the lower surface of the second arm support 140. The buttons 472, 474 are configured to move between a first, locked position and a second, unlocked position. The first button 472 includes a spring 476 with a first end attached to the first button 472 and a second end attached to a seat section 479. As the first button 472 is pressed down, the spring 476 retracts, allowing the button 472 to become generally flush with the upper surface 479A of the second arm support 140. Likewise, the second button 474 includes a spring 478 with a first end attached to the second button 474 and a second end attached to the seat section 479. When the second button is pressed, the spring 478 retracts, allowing the button 474 to move up and become generally flush with the lower surface 479B of the second arm support 140.

Alternatively, the second arm support 140 can include a first button and a second button narrower than the first button that can be directly coupled to the first button to slide relative to the first button. A spring can be positioned inside the second button, with a first end attached to the first button and a second end attached to the second button. As the first and second buttons are pressed, the second button slides within the first button and each button retracts and becomes generally flush with the upper and lower surfaces 479A, 479B of the second arm support 140, respectively.

To attach the child tray 440 to the second arm support 140, a caregiver can press in the first and second buttons 472, 474. The first plate 452 can then move past the first button 472 and the second plate 454 can move past the second button 474. When the buttons 472, 474 are released, the buttons 472, 474 can extend through openings 453, 455, respectively. As an alternative, the first and second plates 452, 454 can each have tapered leading surfaces. When the child tray 440 is to be coupled to the second arm support 140, the child tray 440 can be pivoted towards the second arm support 140. The tapered leading surfaces allow the first plate 452 to move past the first button 472, and the second plate 454 to move past the second button 474, with the plates 452, 454 compressing the respective buttons 472, 474 as the plates 452, 454 pass by the buttons 472, 474. To release the child tray 440 from the second arm support 140, the buttons 472, 474 can be pressed, and the first and second plates 452, 454 can be pulled away from the buttons 472, 474.

FIG. 17A illustrates a stroller 10 with a child tray 440A and a cup holder 430A according to an embodiment of the invention.

The cup holder 430A is mounted to the first arm support 140A between the first end and the second end of the arm support 140A. The cup holder 430A is positioned forward of the seat bight. In another embodiment, the cup holder 430A also can be positioned above the seat bight. The cup holder 430A can be mounted to the first arm support 140A by rivets, bolts, and any other suitable conventional fasteners, or by connecting the cup holder 430A and the first arm support 140A together in a snap fit, friction fit, or other suitable structural engagement. The cup holder 430A can also be mounted to the first arm support 140A by integrally forming the cup holder 430A and the first arm support 140A from one piece of material. The cup holder 430A includes a cavity 411A.

The child tray 440A is movably coupled to the first arm support 140A and is releasably coupled to the second arm support 140A. The child tray 440A is coupled to the first arm support 140A by a pivot P. The pivot P can be formed by any suitable conventional pivoting mechanism. The child tray 440A can be coupled to the second arm support 140A in the same manner as described above and shown in FIGS. 19, 20A, and 20B.

Figure 21A:
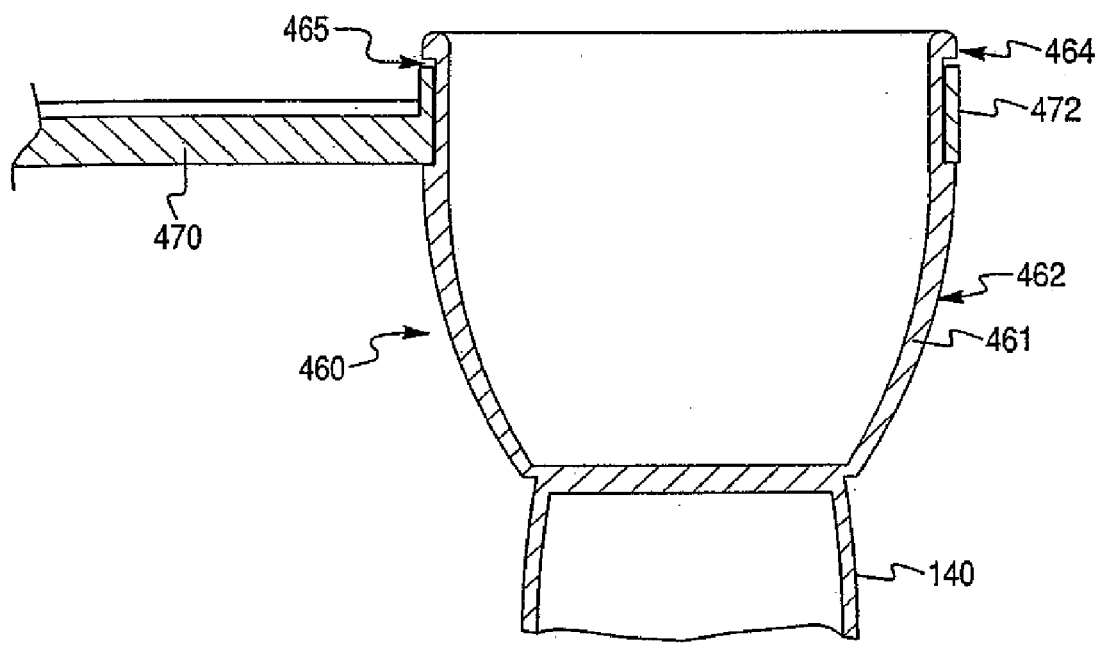
FIG. 21A is a front view, in cross section, of a child tray and cup holder according to another embodiment of the invention.
Figure 21B:
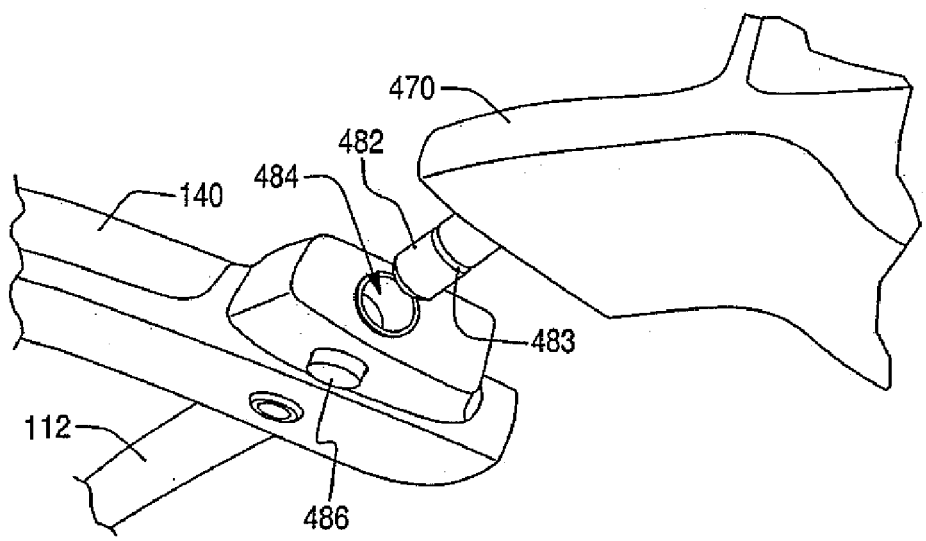
FIG. 21B is a detail perspective view of an attachment end of the child tray of the embodiment shown in FIG. 21A, in which the child tray is separated from the stroller frame.
Figure 21C:
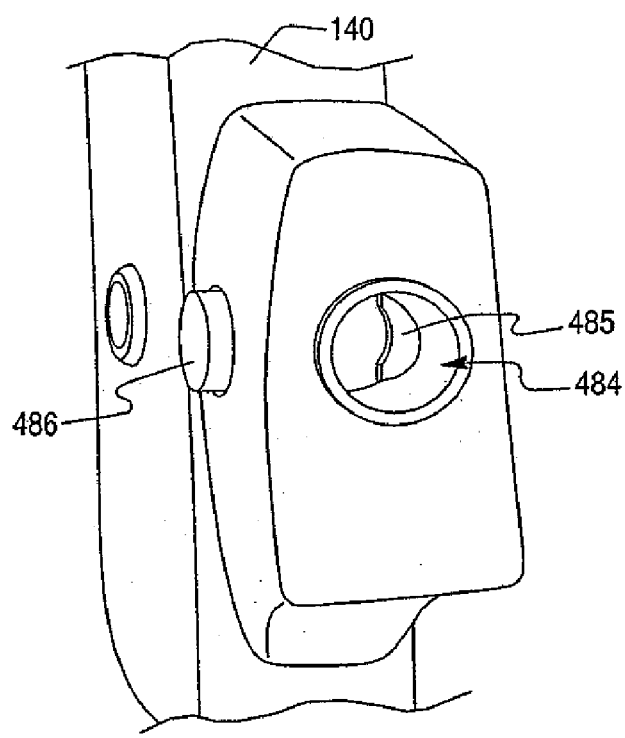
FIG. 21C is a front perspective view of an attachment end of the stroller frame of the embodiment shown in FIG. 21A.

FIGS. 21A-21C illustrate a stroller 10 with a cup holder 460 and child tray 470 according to another embodiment of the invention. The cup holder 460 of the illustrated embodiment can be mounted to the first arm support 140 of the stroller frame 100 by rivets, pins, bolts, and any other suitable conventional fasteners or by connecting the cup holder 460 and the stroller frame 100 together in a snap fit, friction fit, or other suitable structural engagement. The cup holder 460 also can be mounted to the first arm support 140 by integrally forming the cup holder 460 and the first arm support 140 from one piece of material. The cup holder 460 includes a lip 464 and a retention groove 465 on the outer surface 462 of the side wall 461 of the cup holder 460.

The child tray 470 has first and second ends. The first end of the child tray 470 is movably coupled to the cup holder 460 so that the child tray 470 can move between an open, access position, in which the second end of the child tray 470 is detached and moved away from the stroller frame 100, and a closed, in-use position, in which the second end of the child tray 470 is coupled to the stroller frame 100. In this regard, the child tray 470 includes a band 472 at its first end. The band 472 movably mounts to the cup holder 460. The band 472 can be positioned around the cup holder 460 in the retention groove 465 to fit underneath the lip 464. The lip 464 and retention groove 465 keep the band 472 mounted to the cup holder 460 and prevent the child tray 470 from being removed from the cup holder 460.

In the embodiment of FIGS. 21A-21C, the second end of the child tray 470 is releasably coupled to the second arm support 140. The child tray 470 can include a pin 482 with a locking groove 483, and the second arm support 140 can include a socket 484 for receiving the pin 482, as shown in FIGS. 21B and 21C. The socket 484 can include a locking clip 485 that is movable by a release button 486 on a side of the second arm support 140. By pressing the release button 486, the locking clip 485 retracts, thereby allowing the pin 482 to be inserted into the socket 484. Releasing the release button 486 allows the locking clip 485 to extend out and fit into the locking groove 483 on the pin 482.

Alternatively, the child tray 470 can be releasably coupled to the second arm support 140 by any other suitable mechanism. For example, the child tray 470 can be coupled to the second arm support 140 in the same manner as described above and shown in FIGS. 19, 20A, and 20B.

Figure 28:
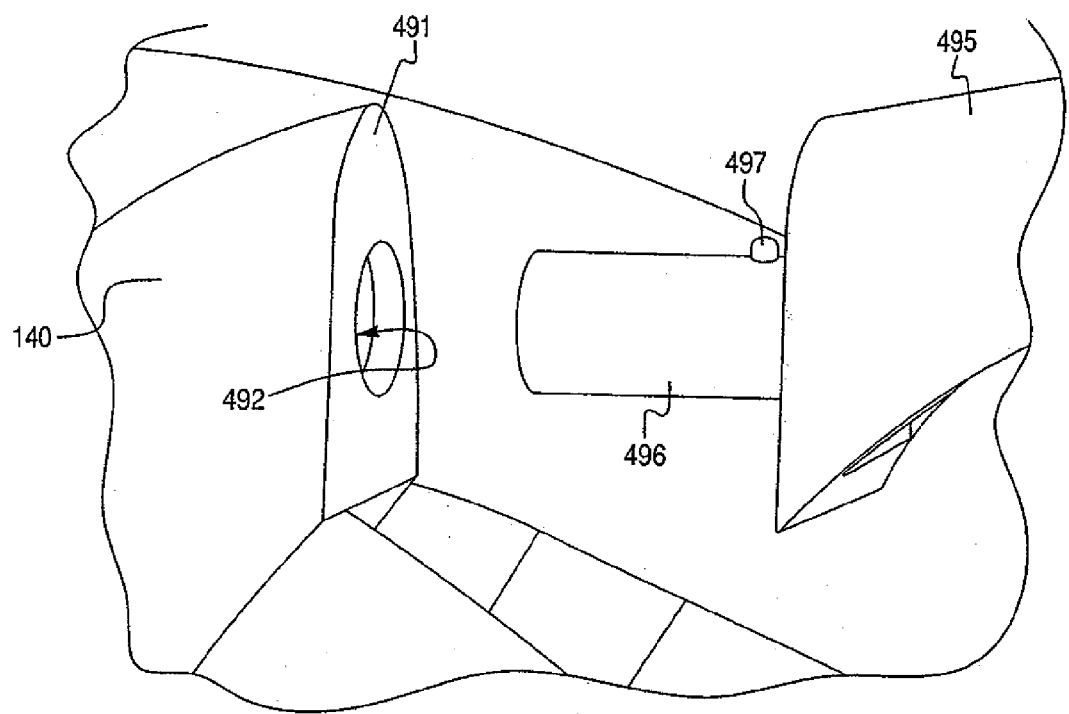
FIG. 28 is a detail perspective view of an attachment end of the child tray, in which the child tray is separate from the stroller.
Figure 29:
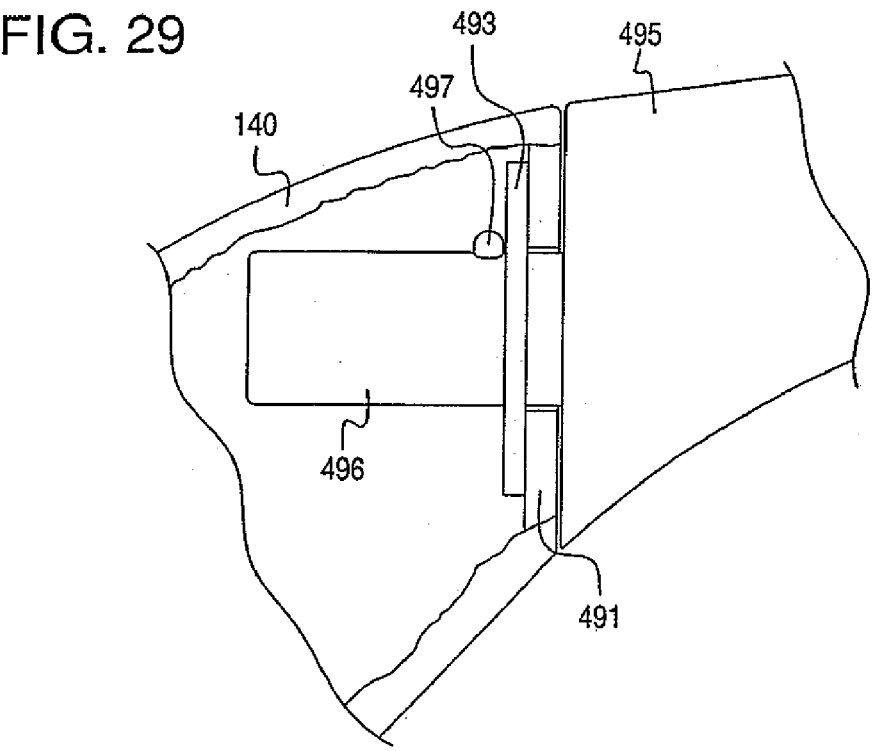
FIG. 29 is a cut-away, side view of the child tray attached to the stroller according to the embodiment shown in FIG. 28.

FIGS. 28 and 29 illustrate another mechanism for attaching a child tray 495 to an arm support 140 of a stroller frame 100. The child tray 495 of the illustrated embodiment is movably mounted to the second arm support 140 of the stroller frame 100 to enable movement of the child tray 495 between the open, access position and the closed, in-use position. The child tray 495 can include a boss 496. The boss 496 is configured to movably couple the child tray 495 to the second arm support 140. The boss 496 includes a snap button 497. The boss 496 can be inserted into an aperture 492 in an end wall 491 of the second arm support 140. The snap button 497 juts out of the boss 496 such that, after the boss 496 is inserted into the aperture 492, the snap button 497 prevents the boss 496, and hence the child tray 495, from being removed from the second arm support 140. A washer 493 can be positioned adjacent a rear side of the end wall 491, between the end wall 491 and the snap button 497.

Figure 30:
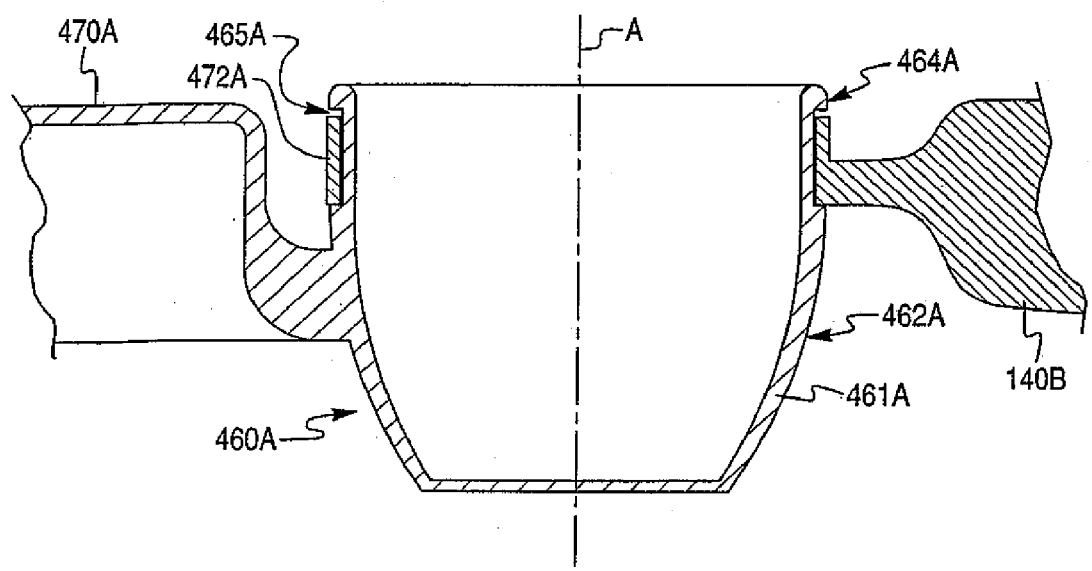
FIG. 30 is a front view, in cross section, of a child tray and a cup holder according to another embodiment of the invention.

FIG. 30 illustrates a stroller 10 with a child tray 470A and a cup holder 460A according to another embodiment of the invention. The cup holder 460A of the illustrated embodiment can be mounted to the child tray 470A by rivets, pins, bolts, and any other suitable conventional fasteners. The cup holder 460A also can be mounted to the child tray 470A by integrally forming the cup holder 460A and the child tray 470A from one piece of material. The cup holder 460A includes a lip 464A. The cup holder 460A also can include a retention groove 465A on the outer surface 462A of the side wall 461A of the cup holder 460A, similar to that shown in FIG. 21A.

The child tray 470A has first and second ends with the cup holder 460A mounted to the child tray 470A at the first end. The cup holder 460A can be movably coupled to the first arm support 140B so that the child tray 470A can move between an open, access position, in which the second end of the child tray 470A is detached and moved away from the stroller frame 100, and a closed, in-use position, in which the second end of the child tray 470A is coupled to the stroller frame 100. In this regard, the first arm support 140B can include a band 472A at its first end 420. The band 472A snaps over the cup holder 460A and into the retention groove 465A and is retained by lip 464A. The band 472A can be positioned around the cup holder 460A and fits underneath the lip 464A and in the retention groove 465A. The cup holder 460A can pivot within the band 472A about its central longitudinal axis "A" when the child tray 470A is moved relative to the stroller frame 100.

FIG. 27 illustrates a stroller 10 with an arm bar-type child barrier 490 according to another embodiment of the invention. The arm bar 490 extends from a first side of the child seat 52 to a second side of the child seat 52 to be in front of a child seated in the child seat 52. The arm bar 490 can be tubular in shape and can be entirely or partially surrounded by a soft padding, such as fabric, rubber, or any other suitable material. Additionally, the arm bar 490 can comprise any other suitable shape that allows the arm bar 490 to extend in front of a child and from one side of the child seat 52 to a second side of the child seat 52. A child can grab on and pull himself forward with the arm bar 490. The arm bar 490 can also define the boundary area for a child in the stroller 10. The arm bar 490 can be substituted for the child tray in any of the above-described embodiments. For example, the arm bar 490 can be movably coupled to the stroller 10 at the second arm support 140 and releasably coupled to the cup holder 410. The arm bar 490 can be coupled to the second arm support 140 and cup holder 410 by any suitable mechanism, such as described above and shown in FIGS. 14A-21C, or by engagement collars, such as disclosed in U.S. Pat. No. 5,855,384, which is hereby incorporated by reference herein in its entirety.

The child tray 400, the cup holder 410 and the arm supports 140 can be made of a plastic material, such as copolymer polypropylene, or any other suitable material. Additionally, the child tray 400, the cup holder 410 and the arm supports 140 can include reinforcement parts. For example, the boss 408 and the aperture 424 can include reinforcement parts or material to strengthen the coupling of the child tray 400 and the stroller 10. Further, the release tab 404 and/or guide pin 406 on the child tray 400 can be replaced by a separate, stiff part to releasably couple the child tray 400 to the cup holder 410.

The design of the child tray, the cup holder, and the arm supports can result in reduced part count compared to conventional strollers with child trays and cup holders. In addition, manufacturing assembly can be significantly simplified, which can result in reduced costs, labor and time.

It is understood that the child barrier, such as child tray 400, 440, 440A, 470, or 495 and arm bar 490, and the cup holder of the invention can be positioned forward of the seat back 55 of the child seat 52 when the stroller is in the in-use configuration. Even if the stroller includes a reclinable seat back, the child barrier and the cup holder remain forward of the seat back at each recline position of the seat back. Because the child barrier and the cup holder are located forward of the seat back, a child seated in the child seat can access both the child barrier and the cup holder.

Figure 22:
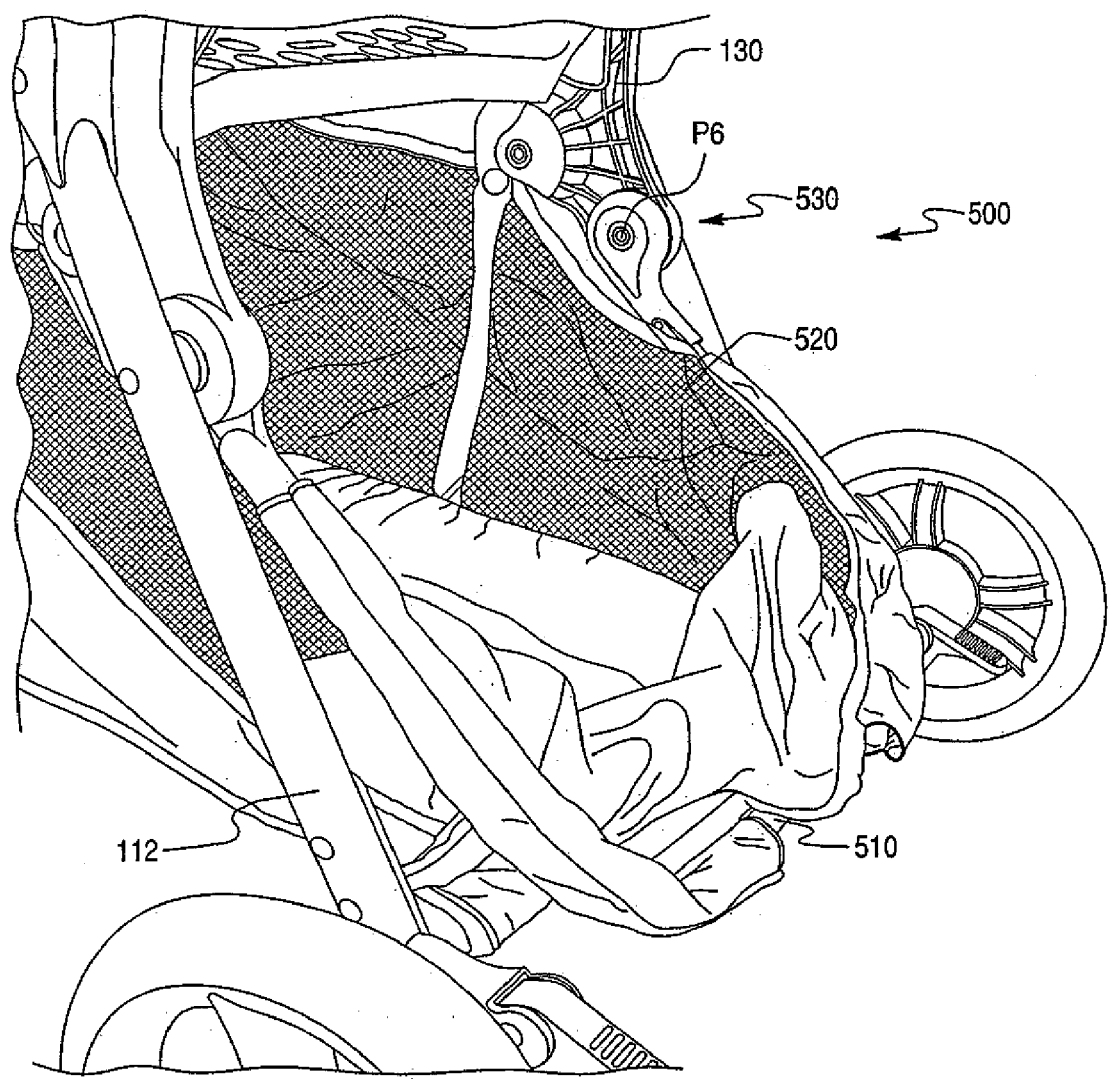
FIG. 22 is a perspective view of a basket assembly attached to the stroller shown in FIG. 1 by way of a latch assembly.

Another aspect of the invention relates to a basket assembly that can be moved by a caregiver between a first, in-use position and a second, access position. The basket assembly 500 now will be described with respect to FIGS. 22-26B. As shown in FIGS. 2 and 22 and as previously mentioned, the basket assembly 500 includes a basket frame 510 and a basket 520 supported by the basket frame 510. The basket assembly 500 can be connected to the stroller frame 100 by a latch assembly 530 at either or both ends of the basket frame 100.

The basket frame 510 is movable between a first, in-use position (shown in FIGS. 24A, 25A, 26A) and a second, access position (shown in FIGS. 22, 24B, 25B, 26B). The movement of the basket frame 510 will now be discussed with respect to three latch assembly embodiments of the invention, which are shown in FIGS. 23A-26B.

A first embodiment of the latch assembly 530A is shown in FIGS. 23A-24B. As shown in FIG. 23A, the latch assembly 530A includes a spring element 540A (which serves as a first engagement member), a spring carrier 532A, and a spring receiver 534A (which serves as a second engagement member). Although the spring receiver 534A is shown as being integrated into the fold link 130, this is not required and other embodiments of the invention contemplate the spring receiver 534A being separate from the fold link 130. Similarly, although the spring carrier 532A and the spring element 540A are shown as being separate elements, these elements may be integrally formed from a single piece of material.

Figure 23B:
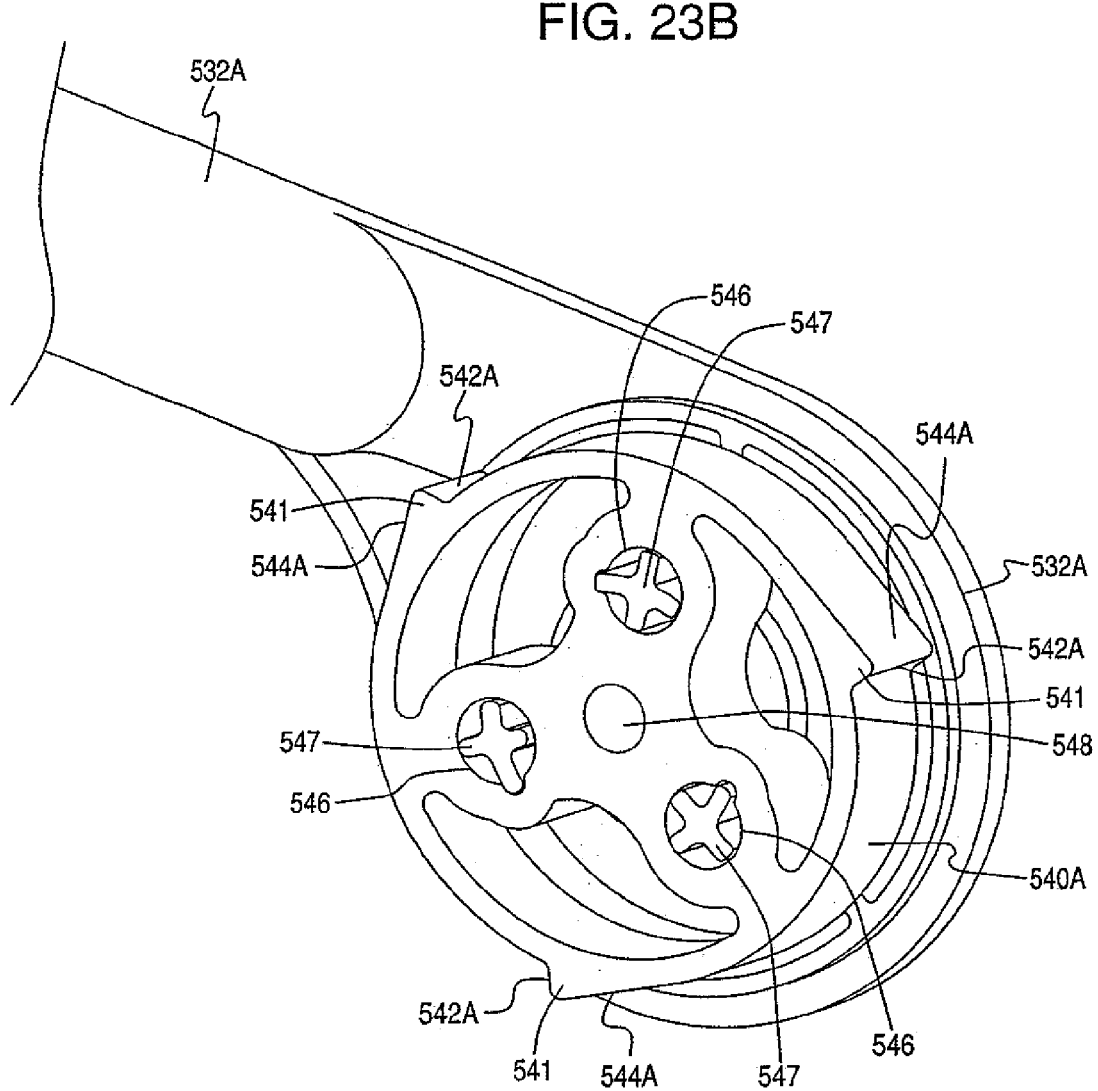
FIG. 23B is a perspective view of the latch assembly shown in FIG. 23A.

The spring carrier 532A is coupled to the basket frame 510 in any conventional manner (e.g., frictional fit, snap fit, fasteners, etc.). As shown in FIG. 23B, the spring carrier 532A includes bosses 547 that are sized to fit within holes 546 in the spring element 540A. In this regard, the holes 546 can be keyed to fit the bosses 547. Further, the keying of the holes 546 can be such that the spring member 540A can only be inserted into the spring retainer 532A in one orientation. As a result, the spring element 540A, which may also be referred to as a latch spring, is configured to be fixedly engaged with the spring carrier 532A such that a rotation of the spring carrier 532A causes a likewise rotation of the spring element 540A.

The spring element 540A also includes a hole 548 that is configured to receive a pivot pin 550, which for foldable strollers may be located at pivot P6, formed as part of the spring receiver 534A. The pivot pin 550, which may be, for example, a rivet, a dowel, a screw, or other suitable fastener on which the basket frame 510 can rotate, may secure the spring receiver 534 to the fold link 130 or other suitable part of the stroller 10. Accordingly, when the spring element 540A rotates (as a result of a rotation of the spring carrier 532A), the spring element 540A is configured to rotate within the spring receiver 534A.

Figure 24A:
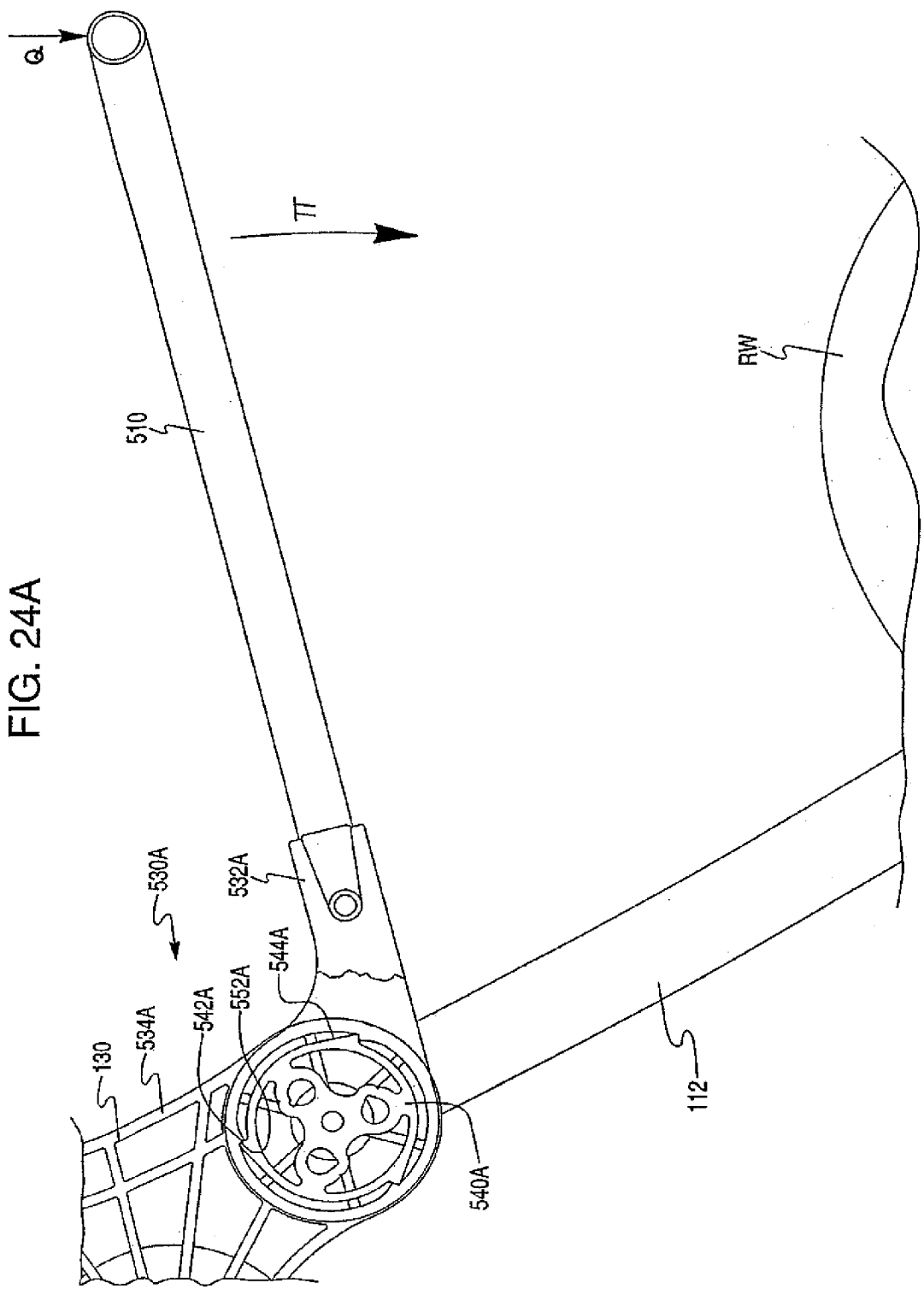
FIG. 24A is a cut-away side view of the latch assembly of FIG. 23A; the latch assembly is connected to the stroller frame of FIG. 1 and supports a basket frame of the basket assembly in an in-use position.

The rotation of the spring element 540A in the spring receiver 534A is controlled by a releasable engagement of the spring element 540A and the spring receiver 534A. Specifically, as shown in FIG. 24A, the spring element 540A includes a plurality of lobes 541 that are defined by engagement surfaces 542A and corresponding ramp surfaces 544A. The engagement surfaces 542A are configured to engage detents 552A in the spring receiver 534A. As a result of the engagement of the engagement surfaces 542A and the detents 552A, the basket frame 510 may be maintained in the in-use position, as shown in FIG. 24A.

The engagement of the engagement surfaces 542A and the detents 552A may be overcome, however, by application of a downward force Q to the basket frame 510. When the downward force Q is applied, the engagement surfaces 542A are forced to ride along the detents 552A such that the lobes 541 bend radially inward. When the engagement surfaces 542A pass the tips of the detents 552A, the spring element 540A is free to rotate around pivot pin 550 and, therefore, the basket frame 510 can rotate downward along an arc .pi. from the in-use position shown in FIG. 24A to the access position shown in FIG. 24B.

Figure 24B:
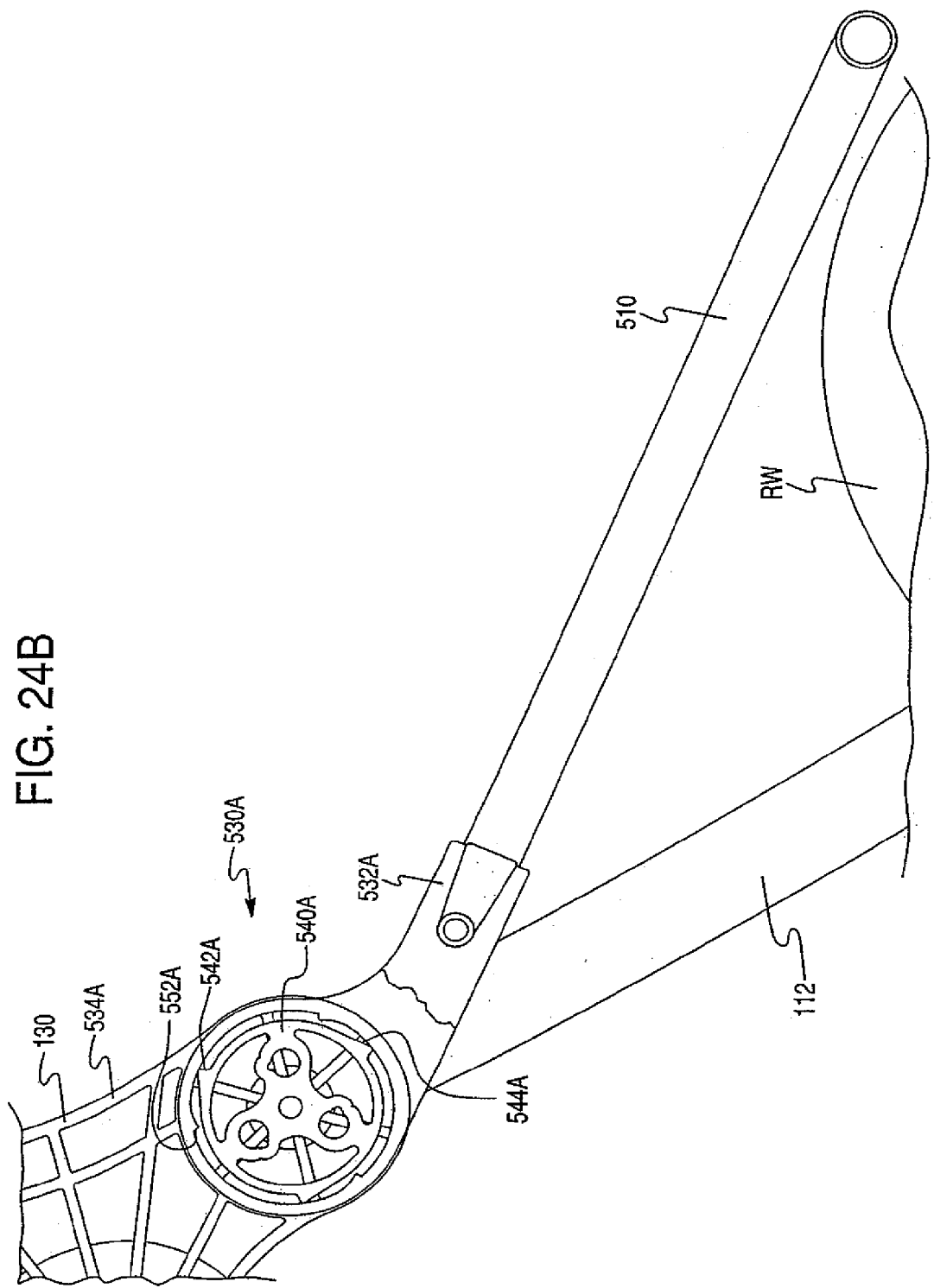
FIG. 24B is a cut-away side view of the latch assembly of FIG. 24A supporting the basket frame in an access position.

To return the basket frame 510 from the access position of FIG. 24B to the in-use position of FIG. 24A, a caregiver can lift the basket frame 510 upward, thereby causing the spring carrier 532A (and the spring element 540A) to rotate opposite arc .pi. As the spring element 540A rotates, ramp surfaces 544A, which abut the engagement surfaces 542A, will contact the detents 552A. A continued rotation of the spring element 540A toward the in-use position will cause the lobes 541 to bend radially inward, until the ramp surfaces 544A clear the detents 552A. When the ramp surfaces 544A clear the detents 552A, the spring element 540A will spring radially outward such that the engagement surfaces 542A once again are adjacent the detents 552A, thereby maintaining the basket frame 510 in the in-use position.

In the above-described embodiment it should be readily recognized that the spring element 540A may have any number (i.e., one or more) of engagement surfaces 542A that may engage a like number of detents 552A formed in the spring receiving member 534A. As shown, however, in some embodiments it may be preferable to have two or more, for example, three, pairings of engagement surfaces 542A and detents 552A.

The second embodiment of the latch assembly 530B now will be described with respect to FIGS. 25A-25B. Similar to the first embodiment of the latch assembly 530A, the latch assembly 530B includes a spring element 540B, a spring carrier 532B (which serves as a first engagement member), and a spring receiver 534B (which serves as a second engagement member). Although the spring receiver 534B is shown as being integrated into the fold link 130, this is not required and other embodiments of the invention contemplate the spring receiver 534B being separate from the fold link 130.

In this embodiment, the spring carrier 532B is in the form of a spring-biased plunger. The plunger 532B circumscribes and is connected to an end of the basket frame 510 via a pivot pin 560 that passes through opposed slots (not shown) in the spring carrier 532B. Although the slots in the spring carrier 532B are wide enough to receive the axis portion of the pivot pin 560, the slots are narrower than a head portion of the pin 560 and, therefore, the head portion retains the spring carrier 532B alongside the basket frame 510.

The pivot pin 560, which for foldable strollers may be located at pivot P6, may be, for example, a rivet, a dowel, a screw, or other suitable fastener on which the basket frame 510 can rotate. The pivot pin 560 also serves to connect the basket frame 510 to the fold link 130. The spring element 540B may be housed within the basket frame 510 and may extend between the pivot pin 560 and the plunger 532B.

The spring element 540B serves to bias the plunger 532B away from the pivot pin 560. As a result, when in the in-use position shown in FIG. 25A, the spring element 540B biases the plunger 532B into a lower detent 552B formed in the spring receiver 534B. To move the basket frame 510 from the in-use position shown in FIG. 25A to the access position shown in FIG. 25B, a downward force is applied to the basket frame 510. As a result of the downward force, an upper engagement surface 542B of the plunger 532B rides against the lower detent 552B, thereby causing the plunger 532B to retract along the outer wall of the basket frame 510. Movement of the plunger 532B is not inhibited by the pivot pin 560 because of the opposed slots (not shown) in the plunger 532B in which the pivot pin 560 can slide.

As a result of the movement of the plunger 532B along the basket frame 510, the spring element 540B is compressed against the pivot pin 560. When the upper engagement surface 542B of the plunger 532B clears the lower detent 552B, the basket frame 510 is free to rotate downward, toward the access position, on an axis of rotation defined by the pivot pin 560. When the basket frame 510 reaches the access position, the plunger 532B can spring, under the force of the spring element 540B, into an upper detent 562B formed in the spring receiver 534B, thereby maintaining the basket frame 510 in the access position.

Figure 25A:
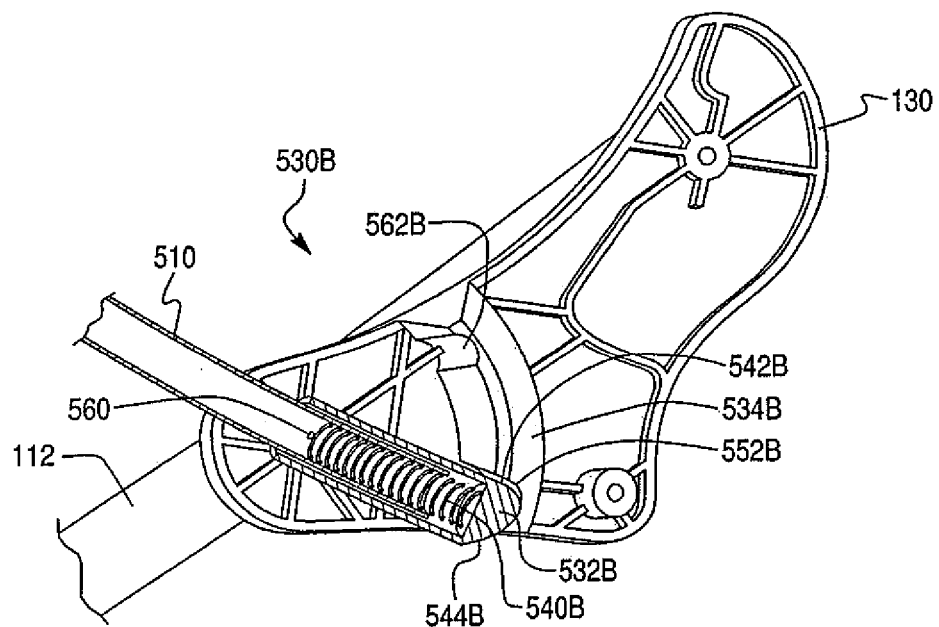
FIG. 25A is a cross sectional side view of a second embodiment of a latch assembly by which a basket assembly may be connected to a stroller; the latch assembly is shown supporting the basket frame in an in-use position.
Figure 25B:
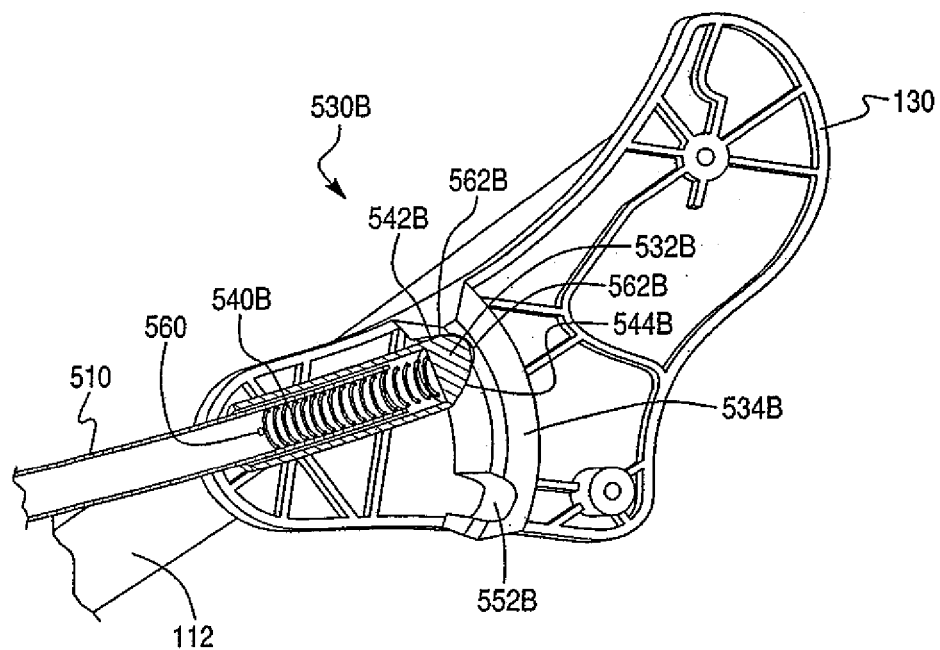
FIG. 25B is a cross-sectional side view of the latch assembly of FIG. 25A supporting the basket frame in an access position.

To return the basket frame 510 from the access position shown in FIG. 25B to the in-use position shown in FIG. 25A, a caregiver can upwardly lift the basket frame 510. As a result, a lower engagement surface 544B of the plunger 532B can ride along the wall of the upper detent 562B, thereby compressing the spring element 540B and causing the plunger 532B to retract along the basket frame 510. Once the lower engagement surface 544B clears the upper detent 562B, the basket frame 510 is free to move to the in-use position. Moreover, when the basket frame 510 reaches the in-use position, the spring element 540B will cause the plunger 532B to spring outwardly into the lower detent 552B, thereby maintaining the basket frame 510 in the in-use position.

In the above-described embodiment, it should be readily recognized that the spring receiver 534B may have any number (i.e., one or more) of detents 552 that may engage the plunger 532B. As a result, the basket frame 510 may be releasably locked in a plurality of positions between the in-use position and the access position; this functionality may be particularly helpful when the size of large items placed in the basket 520 would otherwise prevent the basket frame 510 from being returned to the in-use position. In other words, by returning the basket frame 510 to an intermediate position, a large item may be more readily secured as compared to the situation in which the basket 520 must, as a result of the item's size, remain in the access position.

It also should be recognized that the spring element 540B and the spring carrier 532B may be integrally formed. For example, the spring element 540B and the spring carrier 532B may be integrally formed as a unitary compressible member (e.g., compressible acetal). Alternatively or additionally, the spring element 540B and the spring carrier 532B may be integrally formed as a unitary retractable member.

The third embodiment of the latch assembly 530C now will be described with respect to FIGS. 26A-26B. The latch assembly 530C includes a rigid basket frame end 540C (which serves as a first engagement member) and a deformable receiver 534C (which serves as a second engagement member). Although the receiver 534C is shown as being integrated into the fold link 130, this is not required and other embodiments of the invention contemplate the receiver 534C being separate from the fold link 130.

Figure 26A:
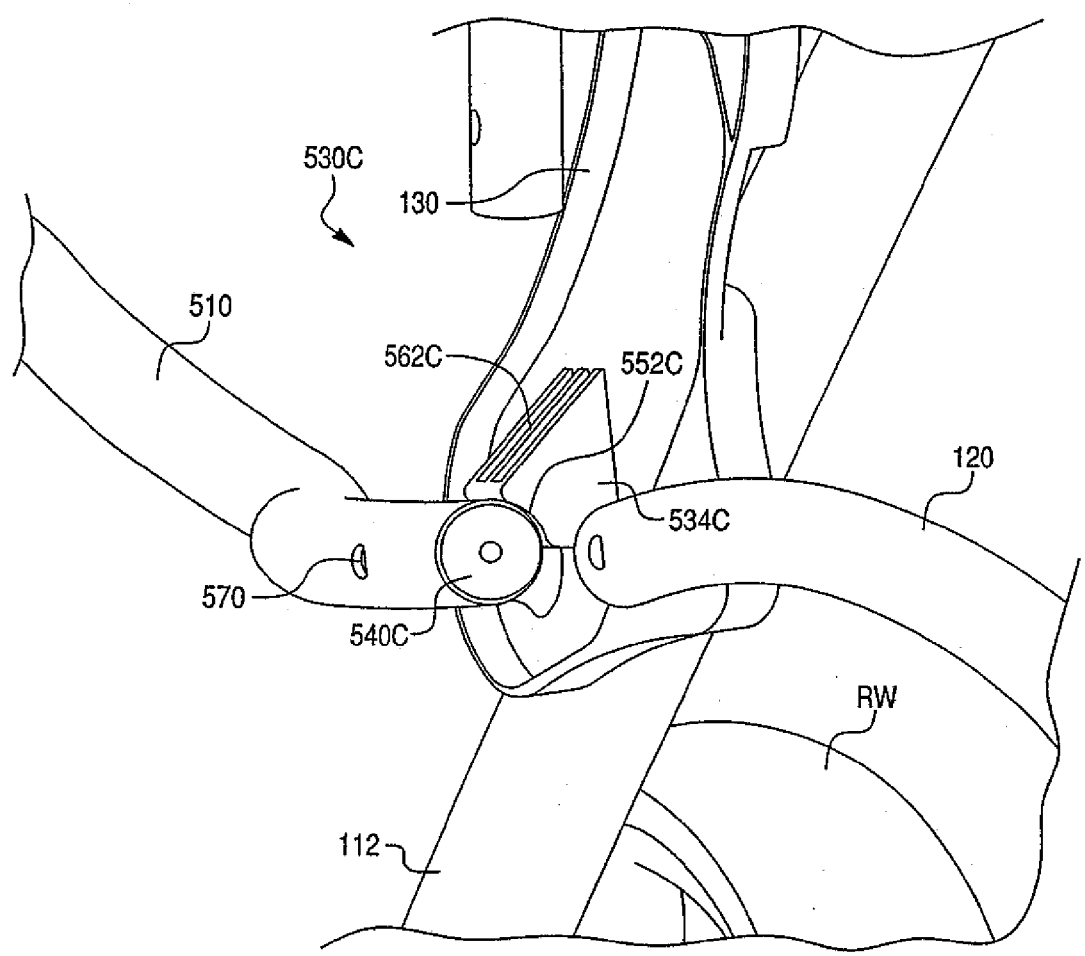
FIG. 26A is a front perspective side view of a third embodiment of a latch assembly by which a basket assembly may be connected to the stroller; the latch assembly is shown supporting the basket frame in an in-use position.

In this embodiment, the basket frame 510 is releasably maintained in the in-use position of FIG. 26A by engagement of the basket frame end 540C with a lower detent 552C. To move the basket frame 510 to the access position of FIG. 26B, a downward force is applied to the basket frame 510. As a result of the downward force, the receiver 534C deforms. As a result of the deformation of the receiver 534C, the basket frame end 540C is freed from lower detent 552C. When the basket frame end 540C is free from the lower detent 552C, the basket frame 510 will readily rotate on a pivot pin 570, which for foldable strollers may be located at pivot P6, to the access position. The pivot pin 570, which may be, for example, a rivet, a dowel, a screw, or other suitable fastener on which the basket frame 510 can rotate, may secure the basket frame 510 to the fold link 130 or other suitable part of the stroller 10. When the basket frame 510 reaches the access position, the receiver 543C will substantially return to its original position and will maintain the basket frame end 540C on an upper detent 562C, thereby releasably locking the basket frame 510 in the access position.

To return the basket frame 510 from the access position of FIG. 26B to the in-use position of FIG. 26A, a caregiver upwardly lifts the basket frame 510. The upward movement of the basket frame 510 causes the receiver 534C to deform such that the basket frame end 540C is able to clear the upper detent 562C. When the basket frame end 540C clears the upper detent 562C, the basket frame 510 readily rotates on the pivot pin 570 to the in-use position. Moreover, when the basket frame 510 reaches the in-use position, the receiver 534C will substantially return to its original position and will maintain the basket frame end 540C in the lower detent 552C, thereby releasably maintaining the basket frame 510 in the in-use position.

With respect to this latch assembly 530C, it should be recognized that the force necessary to move the basket frame 510 between the in-use position and the access position can be varied by varying the size of the receiver 534C. Specifically, by increasing the size of the detents 552C, 562C, the amount of force necessary to free the basket frame end 540C from the detents 552C, 562C will correspondingly increase. Similarly, the force necessary to move the basket frame 510 between the in-use position and the access position can also be varied by varying the stiffness of the basket frame end 540C and/or the receiver 534C, i.e., by increasing the stiffness of either the basket frame end 540C and/or the receiver 534C, the force necessary to disengage the basket frame end 540C from the detents 552C, 562C will correspondingly increase.

This latch assembly 530C includes fewer parts as compared to the first and second latch assemblies 530A, 530B. As a result, the cost of this latch assembly 530C may be less than that of the first and second latch assemblies 530A, 530B. Moreover, the assembly time for this latch assembly 530C may be shorter than that of the first and second latch assemblies 530A, 530B.

In each of the above-described embodiments, the basket frame 510 may be moved from the in-use position to the access position by a caregiver merely pushing (with either a hand or a foot) on the basket frame 510, i.e., a separate locking mechanism need not be undone to enable the basket frame 510 to move from the in-use position to the access position. Moreover, in some embodiments, the basket frame 510 may fall under the force of gravity to the access position after the force applied by the caregiver exceeds a predetermined minimum force (e.g., 10 pounds) to disengage the first engagement member 540A, 532B, 540C from the second engagement member 534A, 534B, 534C.

If the basket frame 510 is in the access position and the stroller 10 is in the collapsed configuration, opening the stroller 10 to the in-use configuration may automatically return the basket frame 510 to the in-use position. However, if the stroller 10 is already in the in-use configuration and the basket frame 510 is in the access position, the basket frame 510 may be returned to the in-use position by the caregiver simply by lifting the basket frame 510.

The basket frame 510 will be releasably maintained in the in-use position when the basket frame 510 is lifted with a predetermined force, which may be less than the force necessary to move the basket frame 510 from the in-use position to the access position. In other words, the force necessary to move the basket frame 510 from the access position to the in-use position need only be sufficient to cause the first engagement members 540A, 532B, 540C to engage the second engagement members 534A, 534B, 534C. Moreover, when the first engagement members 540A, 532B, 540C engage the second engagement members 534A, 534B, 534C, an audible clicking sound may be generated, thereby notifying the caregiver that the basket frame 510 is secured in the in-use position.

It should be readily recognized that in each of the above-described latch assembly embodiments 530A, 530B, 530C, the upward movement of the basket frame 510 (i.e., toward the in-use position) may be limited by the soft goods basket 520. Similarly, the downwards movement of the basket frame 510 (i.e., toward the access position) may be limited by the rear axle 118.

It also should be readily recognized that, after the basket frame 510 is moved from the in-use position of FIGS. 24A, 25A, 26A to the access position of FIGS. 24B, 25B, 26B, the basket frame 510 may remain in the access position without additional force being applied to basket frame 510 by the caregiver. As a result, the caregiver is able to use both hands to place items in (or to remove items from) the basket 520.

Finally, it also should be readily recognized that although the latch assemblies 530A, 530B, 530C are shown as being used in conjunction with folding strollers, this is not required. Rather, the latch assemblies 530A, 530B, 530C may be used to couple basket assemblies 500 to non-folding strollers and/or to other wheeled transports.

The above-described stroller embodiments can be formed of many suitable materials. In particular, the stroller frame 100 (including the handle bar 152, push arms 154, front legs, 110, rear legs 112, etc.) and/or the basket frame 510 may be molded, for example, from steel, metal, plastic, or other suitably rigid material. The fold link 130 may, for example, be molded from nylon, acetal, reinforced plastic, rigid plastic, metal (e.g., die cast metal or aluminum), or other suitable material. The child tray 400, the cup holder 410, and/or the arm supports 140 may, for example, be formed from a plastic material (e.g., copolymer polypropylene) or any other suitable material. The spring retainers 532A, 532B may, for example, be molded from nylon, acetal, or other suitable material. The spring member 540A of the first latch assembly embodiment 530A may, for example, be formed of a relatively rigid plastic such as acetal, or other suitable material. The spring member 540B of the second latch assembly embodiment 530B may, for example, be formed of music wire, metal, or other suitable material. The spring receivers 534A, 534B of the first and second latch assemblies 530A, 530B, may, for example, be formed of nylon, rigid plastic, metal, or other suitable material. The receiver 534C of the third latch assembly 530C may, for example, be formed of nylon, plastic, or other suitable material.

The preferred embodiments have been set forth herein for the purpose of illustration. This description, however, should not be deemed to be a limitation on the scope of the invention. Various modifications, adaptations, and alternatives may occur to one skilled in the art without departing from the claimed inventive concept. The true scope and spirit of the invention are indicated by the following claims.

What is claimed is:

1. A stroller comprising:
  a stroller frame;
  a child seat positioned on the stroller frame and including a seat back, a seat bottom, and a seat bight; and
  a child barrier movably coupled to the stroller frame forward of the seat bight,
  wherein the child barrier includes a cup holder with a central longitudinal axis, and
  wherein when the child barrier moves relative to the stroller frame, the cup holder pivots about the central longitudinal axis.

2. The stroller of claim 1, wherein the child barrier comprises a child tray.

3. The stroller of claim 1, wherein the child barrier comprises an arm bar that extends from a first side of the child seat to a second side of the child seat.

4. The stroller of claim 1, wherein the stroller frame includes first and second arm supports on either side of the child seat.

5. The stroller of claim 4, wherein the cup holder is movably coupled to the stroller frame at one of the first and second arm supports.

6. The stroller of claim 4, wherein the first arm support includes a band configured to movably mount to the cup holder.

7. The stroller of claim 6, wherein the cup holder includes a lip and a retention groove, and wherein the band snaps into the retention groove and is retained by the lip.

8. The stroller of claim 6, wherein the cup holder includes a lip and the band mounts under the lip.

9. The stroller of claim 1, wherein the first end of the child barrier includes an auxiliary cup holder, and the first arm support includes a main cup holder movably mounted to the auxiliary cup holder.

10. The stroller of claim 9, wherein the auxiliary cup holder includes a flange, and the main cup holder includes a groove for receiving the flange to mount the auxiliary cup holder to the main cup holder.

11. The stroller of claim 9, wherein the auxiliary cup holder pivots about the central longitudinal axis when the child tray pivots relative to the stroller frame.

12. A stroller comprising:
  a stroller frame;
  a child seat positioned on the stroller frame and including a seat back; and
  a child barrier movably coupled to the stroller frame forward of the seat back;
  wherein the child barrier includes a cup holder with a central longitudinal axis, and
  wherein when the child barrier moves relative to the stroller frame, the cup holder pivots about the central longitudinal axis.

13. The stroller of claim 12, wherein the child barrier comprises a child tray.

14. The stroller of claim 12, wherein the stroller frame includes first and second arm supports on either side of the child seat.

15. The stroller of claim 14, wherein the cup holder is movably coupled to the stroller frame at one of the first and second arm supports.

16. The stroller of claim 14, wherein the first arm support includes a band configured to movably mount to the cup holder.

17. The stroller of claim 16, wherein the cup holder includes a lip and a retention groove, wherein the band snaps into the retention groove and is retained by the lip.

18. The stroller of claim 12, wherein the first end of the child barrier includes an auxiliary cup holder, and the first arm support includes a main cup holder movably mounted to the auxiliary cup holder.

19. The stroller of claim 18, wherein the auxiliary cup holder includes a flange, and the main cup holder includes a groove for receiving the flange to mount the auxiliary cup holder to the main cup holder.

20. The stroller of claim 18, wherein the auxiliary cup holder pivots about the central longitudinal axis when the child tray pivots relative to the stroller frame.

* * * * *